US012227975B1

(12) United States Patent
Schmutter

(10) Patent No.: US 12,227,975 B1
(45) Date of Patent: Feb. 18, 2025

(54) SYSTEM AND METHOD FOR SHELTERING IN PLACE WITH ADVANCED RESPONDER NOTIFICATION AND READY ACCESS

(71) Applicant: Bruce Schmutter, Long Island City, NY (US)

(72) Inventor: Bruce Schmutter, Long Island City, NY (US)

( * ) Notice: Subject to any disclaimer, the term of this patent is extended or adjusted under 35 U.S.C. 154(b) by 0 days.

(21) Appl. No.: 18/777,125

(22) Filed: Jul. 18, 2024

Related U.S. Application Data

(60) Provisional application No. 63/528,503, filed on Jul. 24, 2023.

(51) Int. Cl.
*E05B 53/00* (2006.01)
*E05C 19/00* (2006.01)
*E05C 19/18* (2006.01)

(52) U.S. Cl.
CPC .......... *E05C 19/005* (2013.01); *E05B 53/001* (2013.01); *E05C 19/188* (2013.01)

(58) Field of Classification Search
CPC ...... Y10S 292/15; E05C 17/44; E05C 17/446; E05C 17/48; E05C 19/003; E05C 19/028;
(Continued)

(56) References Cited

U.S. PATENT DOCUMENTS 49,296 A * 8/1865 Parker ..................... E05B 63/20
292/181
361,693 A * 4/1887 Guild .................. E05B 65/0864
292/153
(Continued)

FOREIGN PATENT DOCUMENTS

CN 107939192 A * 4/2018 ............ E05C 17/48
CN 209419020 U 9/2019
(Continued)

OTHER PUBLICATIONS

"How to Choose the Perfect Door Lock", Latham's Hardware, © 2024, retrieved on Jul. 18, 2024 from https://www.lathamshardware.co.uk/blog/how-to-guides/how-to-choose-the-perfect-door-lock/.
(Continued)

*Primary Examiner* — Carlos Lugo
(74) *Attorney, Agent, or Firm* — Caesar Rivise, PC

(57) ABSTRACT

A system and method for a universal locking system that mounts to any type of door, clamping and reinforcing the door from both sides. The system and method is compliant with the intent of CMS, NFPA, TJC codes & standards, allowing the occupant to participate in his own decision to run, hide or fight. Wall-mounting the locking device and allowing the occupant to remove the device and install it at the door complies with the ANSI "Knowing Act" and requires the occupant to activate the locking device. Removal of the device from the wall mounting, immediately alerts first responders of potential sheltering-in-place while providing a remote audio/visual alarm, while identifying location of the device. Alert locations include nurse stations, staff locations, building securing desk/offices and fire command. A key override is provided so that responders/authorities can gain entry without requiring any special knowledge of the locking configuration.

30 Claims, 35 Drawing Sheets

(58) Field of Classification Search

CPC ................. Y10T 292/19; Y10T 292/65; Y10T 292/0999; Y10T 292/1002; Y10T 292/1003; Y10T 292/0834; Y10T 292/096; E05B 53/001; E05B 17/2053

See application file for complete search history.

(56) References Cited

U.S. PATENT DOCUMENTS

| | | | | | |
|---|---|---|---|---|---|
| 459,676 | A * | 9/1891 | Daniel | E05B 15/0053 292/156 |
| 475,368 | A * | 5/1892 | Welch | E05C 7/06 292/179 |
| 618,818 | A * | 2/1899 | Adams | E05B 63/20 292/181 |
| 670,854 | A * | 3/1901 | Deibel | E05B 37/20 292/180 |
| 922,083 | A * | 5/1909 | Campbell | E05B 63/20 292/201 |
| 982,136 | A * | 1/1911 | Hanson | E05C 17/446 292/DIG. 16 |
| 1,057,995 | A * | 4/1913 | Bull | E05C 17/446 292/193 |
| 1,654,221 | A * | 12/1927 | Kline | E05B 63/06 292/159 |
| 3,239,261 | A * | 3/1966 | Knox | E05C 17/48 292/341.18 |
| 3,989,286 | A * | 11/1976 | Cleff | E05C 17/446 292/201 |
| 5,525,963 | A * | 6/1996 | Purssey | A62C 2/24 49/31 |
| 5,664,812 | A * | 9/1997 | Marinoni | E05C 17/48 292/153 |
| 6,629,713 | B1 * | 10/2003 | Duffy | E05B 65/087 292/335 |
| 7,965,178 | B1 | 6/2011 | Schmuttor et al. | |
| 9,435,147 | B1 | 9/2016 | Giandomenico et al. | |
| 9,871,399 | B2 | 1/2018 | Mittleman et al. | |
| 10,174,532 | B2 * | 1/2019 | Couturier | E05C 19/184 |
| 10,614,687 | B2 | 4/2020 | Rehfeld et al. | |
| 11,649,661 | B2 | 5/2023 | Fischer | |
| 2011/0291426 | A1 * | 12/2011 | Gibson | E05C 19/188 292/137 |
| 2020/0071960 | A1 * | 3/2020 | Wadlow | E05B 53/001 |

FOREIGN PATENT DOCUMENTS

| | | | | |
|---|---|---|---|---|
| GB | 2359335 A * | 8/2001 | E05B 47/0002 |
| KR | 200410054 Y1 | 3/2006 | |
| WO | WO-2017191449 A1 * | 11/2017 | E05B 45/04 |

OTHER PUBLICATIONS

"The Anchor—Create a Safe Zone During a Crisis—The Only Patented Device on the Market", Anchorman, Inc., © 2024, retrieved on Jul. 18, 2024 fro https://www.anchormaninc.com.

"What is the Safety Act?", Department of Homeland Security, Jan. 2020.

Anchorman, Inc., "Installation", Apr. 2023.

International Search Report for related PCT Application No. PCT/US2024/038730 dated Oct. 28, 2024.

* cited by examiner

SYSTEM AND METHOD FOR SHELTERING IN PLACE WITH ADVANCED RESPONDER NOTIFICATION AND READY ACCESS

CROSS-REFERENCE TO RELATED APPLICATIONS

This non-provisional application claims the benefit under 35 U.S.C. § 119 (e) of Application Ser. No. 63/528,503 filed on Jul. 24, 2023 entitled SYSTEM AND METHOD FOR A UNIVERSAL TAMPER-RESISTANT SHELTER-IN-PLACE BARRICADE LOCKING DEVICE and whose entire disclosure is incorporated by reference herein.

BACKGROUND OF THE INVENTION

This present invention relates to barriers, and more particularly, to a universal tamper-resistant shelter-in-place system including a locking device, with total control by users, and an advanced responder notification system.

Currently analysis from the Federal Bureau of Investigation (FBI) and from the National Threat Assessment Center at the Department of Homeland Security indicate a continuous rise in active shooter and workplace violence events. This fact mandates the need for personnel to be able to defend/secure in a particular room at a moment's notice has. While there are an abundant number of current ways to "close", "lock" and/or "lock" a door, it is the "how" that is of prime concern.

The industry offerings include mechanical and electrical devices that can be operated individually or remotely and include:

- Door chains or other means to secure the door from the inside
  - Cannot be overridden and impede Emergency Responder entry
  - Do not provide remote alarm
- Retrofit complications
  - Significant machining
  - Violate fire rating
  - Too configuration specific, e.g., the locking mechanism is subject to the exact contour of the frame, molding and wall construction; undercut (e.g., gap from floor to the bottom of the door) discrepancies-See FIG. 13. Undercuts can vary from 0.25 inches to as much as 1.5 inches.
- Powered Solutions
  - Dependent on battery/electrical power
- Remote systems
  - Do not comply with ANSI "Knowing Act"
  - Can be potentially hacked
- Keyed systems
  - Do not allow for general occupant usage
  - Require special training and/or carrying of a credentialing device (Physical key or other)
  - Can be easily circumvented
- Traditional approach devices:
- Rod/Pipe manually "dropped" into the floor
- Hook-n-eye device
- General limitations of the traditional approach devices:
  - No means of Emergency Responder access
  - Can be used by anyone without generating an alarm
  - Require special knowledge or key access
  - Can be triggered unknowingly and/or by prankster/perpetrator
  - Can be hacked by prankster/perpetrator The following scenario depicts the use of one proposed traditional locking device to mitigate the threat of perpetrators on the premises but demonstrates several areas of failure with today's current solutions.

In any town U.S.A. there is a middle-school gymnasium with occupancy load of 180 and having 3 main double door exits to the main corridor and 2 single door exits to a courtyard. All doors are outswing. It is halftime at a girls basketball game and the gymnasium is near capacity with students, teachers, friends and family members.

The middle-school's protocols for credential general access to students and faculty is via key-fob or card access. Every lock has an additional key override. Key access is limited to responders and senior-trained leadership. During a lockdown event, an unrestricted panic button in the inside of the room/area is depressed. This in turn sends an alarm to the proprietary software which will then inhibit the lock's card access. As a general rule, this system once triggered will inhibit card access to all other associated doors, thereby locking out all other individuals. However, such an action violates the ANSI Knowing Act because it takes away the occupants' ability to decide whether to Run, Hide or Fight.

The general premise of this proposed system is to limit the number of individuals that are authorized entry during an alarm event. This system does not physically lock the door to the floor or frame. The system is predicated on implemented credentialed access, where each individual entering the facility has an issued swipe-card that he/she keeps on their personage throughout the day. It will only work on doors that lock from one or both sides of the door each time it is closed. However, it cannot work on a passage or general entry/exit doors since it has no additional locking/securing provisions.

In view of this, the following scenario plays out:

1. One of perpetrators depresses the panic alarm on the closest exit door to him.
2. Entry is immediately inhibited to all doors and no one except Police, Fire and senior-trained individuals are in the possession of the special override key.
3. General staff including teachers and security can no longer enter the space;
4. One or more of the perpetrators takes out an automatic weapon and open(s) fire
5. Students/Families/Staff may attempt to flee, however, while students can get out, no assistance from outside the gymnasium can be provided, since general entry was inhibited on all doors.
6. Substantial general populace confusion would be encountered since the occupants did not "participate knowingly" in the "lockout" which contradicts the ANSI Knowing Act.
7. Once the alarm has been triggered, the occupants could not selectively control/govern any/all doors.
8. It should be noted that this system does NOT physically lock the door(s) in place; rather, it only inhibits general access from the corridor or other outside areas. If a key were to be used from the outside, an occupant could not inhibit the door from being opened due to the outswing door configuration.

Current Need-Design Criteria

Workplace violence, active shooter, student pranksters and standalone perpetrator acts of aggression are on a rise. This affects all facility types ranging from schools, hospitals, airports, shopping malls, theaters, nightclubs, houses of worship or other venues. The individuals who commit these atrocities can be anyone from a troubled student, disgruntled employee, family member with a vengeance or other individual looking for "popularity" and/or radical "fame". Workers and visitors to these venues require the ability to mitigate the threat by denying access to specific locations within the venue.

The Run, Hide, Fight strategy has been standardized and is implemented in many of the facilities mentioned. Tactical training exercises include building occupants utilizing a variety of approaches for impromptu shelter-in-place drills. The standard operation procedure (SOP) for these drills is to utilize furniture or "anything-on-hand" to gain an advantage and allow any given door to remain closed in an effort to deter the assailant.

There is an abundance of scenarios that would cause an occupant to "take command" of a door to ensure their safety. These include hiding in a patient room, office or classroom that is not normally locked during the day. It can also include an improvised emergency area of refuge like a gymnasium or other larger area, such as conference room.

The key fundamental goal is to allow the occupant total control of their life-saving decision to barricade when running is not an option. The second goal is to let the appropriate Responders and senior staff know of their decision that has taken place so that others can be alerted and Emergency Responders notified.

While there are a variety of barricade systems on the market, these systems fall into two general categories:

1. Stand-alone locking devices.
   - Once deployed, cannot be opened from the other side of the door (for Responder or other emergency usage)
   - These devices can become a complete unintentional entrapment of the occupant
2. Remote control applications and/or devices
   - Limit the individual occupant's ability to "master" their own destiny . . .
   - Complete violation of the ANSI "Knowing Act" as the occupant is not knowingly involved in and/or aware of any/all remote actions.

Another proposed solution are multi-point locking systems which comprise installing a locking system to the door body for bolting the door into the frame and locking it at a plurality of locations. However, the problem with such multi-point locking systems is that if any of the deadbolt members fails to align with its respective lock bore, none of them can extend into their respective lock bores and the end result is that the door cannot be secured. Furthermore, such bolts only extend a fixed amount so if the door frame is misaligned, which generally occurs as infrastructure ages, there will only be partial engagement of the deadbolt but, again, the door cannot be secured.

See also U.S. Pat. Nos. 9,435,147 (Giandomenico, Jr., et al.) and 11,649,661 (Fischer).

Thus, there remains a need for an apparatus and method that can address all of the foregoing. The present invention solves these problems.

All references cited herein are incorporated herein by reference in their entireties.

BRIEF SUMMARY OF THE INVENTION

A shelter-in-place door locking apparatus that can be releasably coupled to a door of a room on a floor at a moment's notice by persons sheltering in place and which accommodates for varying door undercuts (e.g., 0.25 inches-1.5 inches, etc.) and wherein the apparatus is in total control by those persons sheltering in place in the room is disclosed. The apparatus comprises: a locking pin carrier comprising a plurality (e.g., four) of locking pins whose lower ends are configured to be positioned in a floor strike located in the floor, wherein the locking pin carrier is slideable on support rods fixed between an upper flange and a lower flange both of which are fixedly secured to a body plate that is configured for releasable coupling to the door, wherein the locking pin carrier comprises a projection, and wherein the locking pin carrier is biased in an unlocked position when the locking pin carrier is in contact with the upper flange; a releaseable brake is positioned between the upper flange and the lower flange, wherein the releasable brake comprises a plurality of teeth over which the projection slides when the locking pin carrier slides on the support rods away from the upper flange against the bias and towards the lower flange, wherein the teeth form a plurality of locked positions to accommodate the varying door undercuts, wherein the projection releasably locks into one of the plurality of teeth when the locking pin carrier stops sliding; the locking pin carrier comprises an upper member and a lower member, each of the locking pins is slideable through the lower member and the lower flange and wherein an upper end of each locking pin is biased against the lower member by a spring positioned between the upper member and the upper end of the locking pin, wherein the upper end of each locking pin is prevented from passing through the lower member; and a release member movably coupled to the locking pin carrier that can be activated by the persons to release the locking pin carrier from the one of the plurality of locking positions to automatically return the locking pin carrier to the unlocked position.

A system for providing at a moment's notice a universal tamper-evident, shelter-in-place door locking device at a door to a room on a floor for at least one user in the room and wherein the door locking device accommodates for varying door undercuts while providing the at least one user with total control of the device while automatically providing precise location notification to authorities is disclosed. The system comprises: a door assembly that comprises a first portion configured to mount to an inside surface of the door and a second portion configured to be positioned on an outside surface of the door, wherein the second portion includes a key cylinder comprising a lock cam; a floor strike, positioned within the floor underneath the door when the door is in a closed position; wherein the door locking device is portable to be moved from a first location within the room to the first portion and configured for coupling to the first portion, and wherein the door locking device comprises: a locking pin carrier comprising a plurality of locking pins whose lower ends are configured to be positioned in the floor strike, wherein the locking pin carrier is slideable on support rods fixed between an upper flange and a lower flange both of which are fixedly secured to a body plate that is configured for releasable coupling to the door, wherein the locking pin carrier comprises a projection, the locking pin carrier being biased in an unlocked position when the locking pin carrier is in contact with the upper flange; a releaseable brake positioned between the upper flange and the lower flange, wherein the releasable brake comprises a plurality of teeth over which the projection slides when the locking pin carrier slides on the support rods away from the upper flange against the bias and towards the lower flange, wherein the teeth form a plurality of locked positions to accommodate the varying door undercuts (e.g., 0.25 inches-1.5 inches, etc.), and wherein the projection releasably locks into one of the plurality of teeth when the locking pin carrier stops sliding; the locking pin carrier comprising an upper member and a lower member, each of the locking pins slideable through the lower member and the lower flange and wherein an upper end of each locking pin is biased against the lower member by a spring positioned between the upper member and the upper end of the locking pin, wherein the upper end of each locking pin is prevented from passing through the lower member; and a release member movably coupled to the locking pin carrier that can be activated by the persons to release the locking pin carrier from the one of the plurality of locked positions to automatically return the locking pin carrier to the unlocked position; and a storage unit at the first location, having a transmitter, that is secured in the room, wherein the storage unit contains the door locking device initially therein, wherein the transmitter is activated to alert authorities when the storage unit is opened to remove the locking device from the storage unit and automatically provides authorities with location data of the transmitter.

A method for providing at least one user in a room with the ability to shelter-in-place by installing on a door of the room on a floor, at a moment's notice, a portable door locking apparatus that accommodates for varying door undercuts (e.g., 0.25 inches-1.5 inches, etc.) and wherein the at least one user has total control of said door locking apparatus is disclosed. The method comprises: mounting a door assembly to the door that comprises a first portion mounted to an inside surface of the door and a second portion positioned on an outside surface of the door and wherein the second portion includes a key cylinder comprising a lock cam; forming a floor strike in the floor adjacent the inside surface of the door for receiving a free end of at least one of a plurality of locking pins from a portable door locking apparatus therein; closing the door;

releasably coupling the portable door locking apparatus to the first portion, wherein the portable door locking apparatus comprises: a locking pin carrier comprising a plurality of locking pins whose lower ends are configured to be positioned in the floor strike, wherein the locking pin carrier is slideable on support rods fixed between an upper flange and a lower flange both of which are fixedly secured to a body plate that is configured for releasable coupling to the door, wherein the locking pin carrier comprises a projection, wherein the locking pin carrier is biased in an unlocked position when the locking pin carrier is in contact with the upper flange; a releaseable brake positioned between the upper flange and the lower flange, wherein the releasable brake comprises a plurality of teeth over which the projection slides when the locking pin carrier slides on the support rods away from the upper flange against the bias and towards the lower flange; wherein teeth form a plurality of locked positions to accommodate the varying door undercuts, wherein the projection releasably locks into one of the plurality of teeth when the locking pin carrier stops sliding; wherein the locking pin carrier comprises an upper member and a lower member, each of the locking pins being slideable through the lower member and the lower flange and wherein an upper end of each locking pin is biased against the lower member by a spring positioned between the upper member and the upper end of the locking pin, wherein the upper end of each locking pin is prevented from passing through the lower member; and a release member movably is coupled to the locking pin carrier that can be activated by the at least one person to release the locking pin carrier from the one of the plurality of locked positions to automatically return the locking pin carrier to the unlocked position; and applying a downward force on the locking pin carrier to displace the carrier downward to releasably lock the locking pin carrier with the releasable brake while positioning lower ends of the plurality of locking pins within the floor strike to prevent the door from being opened.

A method for providing at a moment's notice a universal tamper-evident, shelter-in-place portable door locking device at a door to a room on a floor for at least one user in the room and wherein the door locking device accommodates for varying door undercuts while providing the at least one user with total control of the device while automatically providing precise location notification to authorities is disclosed. The method comprises: releasably stowing the portable door locking device within a storage unit secured in the room, wherein the storage unit comprises a transmitter associated with a releasable cover of the storage unit such that when the cover is opened or removed the transmitter generates an alert signal to authorities, and wherein the portable door locking device comprises: a locking pin carrier comprising a plurality of locking pins whose lower ends are configured to be positioned in a floor strike formed in the floor, wherein the locking pin carrier is slideable on support rods fixed between an upper flange and a lower flange both of which are fixedly secured to a body plate that is configured for releasable coupling to the door, wherein the locking pin carrier comprising a projection, and wherein the locking pin carrier is biased in an unlocked position when the locking pin carrier is in contact with the upper flange; a releaseable brake positioned between the upper flange and the lower flange, wherein the releasable brake comprises a plurality of teeth over which the projection slides when the locking pin carrier slides on the support rods away from the upper flange against the bias and towards the lower flange, wherein the teeth form a plurality of locked positions to accommodate the varying door undercuts, and wherein the projection releasably locks into one of the plurality of teeth when the locking pin carrier stops sliding; the locking pin carrier comprising an upper member and a lower member, each of the locking pins being slideable through the lower member and the lower flange and wherein an upper end of each locking pin is biased against the lower member by a spring positioned between the upper member and the upper end of the locking pin, wherein the upper end of each locking pin prevented from passing through the lower member; and a release member movably coupled to the locking pin carrier that can be activated by the at least one user to release the locking pin carrier from the one of the plurality of locked positions to automatically return the locking pin carrier to the unlocked position; and mounting a door assembly to the door that comprises a first portion mounted to an inside surface of the door and a second portion positioned on an outside surface of the door and wherein the second portion includes a key cylinder comprising a lock cam; forming the floor strike in the floor adjacent the inside surface of the door for receiving a free end of at least one of said plurality of locking pins from the portable door locking device therein; closing the door by the at least one user; opening up or removing the cover of the storage unit, by the at least one user, causing the transmitter to immediately emit the alert signal to authorities, and removing the portable door locking device from the storage unit by the at least one user; releasably coupling the portable door locking device to the first portion by the at least one user; and applying a downward force on the locking pin carrier to displace the carrier downward to releasably lock the locking pin carrier with the releasable brake while positioning lower ends of the plurality of locking pins within the floor strike to prevent the door from being opened.

Facilitator Technologies™ has invented the Occupant Preserver™, a system and method for sheltering-in-place and including a universal locking device, referred to as a "door shelter lock (DSL)" to secure virtually any door in place. This device is stored in a wall or door mounted tamper evident storage unit. The DSL is capable of withstanding several thousand pounds of impact force in a reliable and reusable fashion. Once the DSL is removed, the system is capable of sending a remote signal to alert personnel of its deployment. Depending on the level of infrastructure within the facility, the system can be integrated into various existing building systems including fire and card-access. As an option the system could work on its own independent Bluetooth, WiFi or other mesh network. In the event it is not feasible to have an overall system and/or the installation site/type is of a limited scale, the system has merit as a complete stand-alone with local and remote hard-wired audio/visual indicators.

The nature of this DSL is to be universal with flexible applications on doors that open in/out, pivot, rotate or slide. The DSL/approach does not require any type of interaction with preinstalled mechanical or electric locking hardware. The device can be used on general push/pull doors. The device can be used on fire compartmentation or privacy doors with locking hardware only. The device can be used to augment and provide additional event security on doors with one or more mechanical and/or electrical locking components.

The fundamental design criteria are to allow a single occupant to make those critical split second decisions to Run, Hide, Fight when confronted with an active assailant. The occupant must be able to secure his/her perimeter in an immediate and reliable fashion. One of the key tenets of the National Fire Protection Agency (NFPA) Codes is that an individual must be able to determine whether it's safer to shelter-in-place or evacuate. That said, if responders can't get in, the occupant can't get out. Accordingly, not only must the deployment of the DSL be known upon responder arrival to the scene, there must be provisions for responder override of the DSL device. The DSL device design is predicated upon its deployment during a violent event. Accordingly, the occupant must have the ultimate and final ability to remain sheltered.

The device is intended to be a component of a facility's Active-Shooter & Workplace Violence policy and must be incorporated into ongoing and continual staff training. Training models to be developed in concert with government agencies and industry specific organizations. A national network of trained installers, integrators and distributors shall ensure product availability and reliable consistent application.

Moreover, the Occupant Preserver™ was designed based on a request of the Chair of Emergency Management at Jacobi Medical Center as a result of a shooting event at the facility. Coming off that event, the Emergency Management Chair was looking for a product that would help enhance how staff felt both emotionally and physically in their work environment and quell safety fears. As such, the creation of the Occupant Preserver™ was purposely designed to meet those needs and has merit for any occupancy type.

The DSL of the Occupant Preserver™ system and method is not a secondary locking device and poses no impedance to daily ingress/egress. Rather, the present invention is an emergency event management system whereby the DSL is deployed at the sole discretion of the occupant(s).

Highlights of the Occupant Preserver™ System and Method the DSL can neither be accidently deployed nor can it be removed from its storage unit without signaling remote alarms.

Provides advanced situational knowledge to all responders with the exact geolocation of each and every room where the Occupant Preserver™ was deployed.

Provides "ready access" for responders to gain entry to the occupied space for potential rescue.

Restricts unauthorized usage by bullies, pranksters or others and ensures daily uninhibited pedestrian traffic flow due to its tamper evident storage unit.

As mentioned previously, potential victims that shelter in place during an active shooter event are limited to barricading with chairs, furniture or other room contents. That said, if the door were to be "secured" in this manner there is no guarantee it would withstand the assailant's efforts to gain entry. Additionally, the occupant(s) may become entrapped. And responders may not be aware of potential sheltering occupants. In contrast, the Occupant Preserver™ system and method includes a DSL that provides the assurance to withstand forces associated with historical active shooter events and provides remote situational awareness and allows for authorized ready access.

Facility Requirements:

Active-shooter defend-in-place scenarios include relevant assumptions regarding the potential threat and describe the meaning of the assailant event in terms that can be understood by the facility owner.

Facility management shall provide for initial and annual inspection of each room designated for sheltering including the door, the DSL and the remote alarm. This includes maintaining the door in accordance with relevant codes and visual/physical inspection of the DSL. Remote alarms shall be triggered to validate system integrity.

Staff shall be trained in accordance with the Run-Hide-Fight model as well as the DSL itself.

The training shall be clear and understandable to all received. Part of the training shall include initial and periodic drills.

Since the required training shall both be provided as well as clearly displayed in the storage unit of the DSL, the occupant shall be deemed as fully informed and therefore no "special knowledge" required to engage or disengage the device. The DSL is not capable of being activated/engaged either remotely of from the outside so the device can never be locked without occupant knowledge. Designated staff and responders shall/will have "ready access" via a universal key.

Establishing "the need" for protection is determined by the occupant with his/her own initiation of the deployment and dynamic installation of the DSL.

Up until the occupants knowingly safeguard themselves, there is no impedance to egress due to the fact there is simply no locking device installed on the door.

Thus, in view of all of the foregoing, the DSL of the Occupant Preserver™ system and method is not a daily lock. The DSL is not permanently-mounted to the door. It is initially-housed in an easy-to-reach storage unit, typically mounted on the wall. It can only be placed onto the door and secured thereat by a trained occupant. The Occupant Preserver™ system and method automatically alerts authorized staff/responders of its deployment. Once the occupant(s) has installed the DSL, no "special knowledge" is required to egress the space. And the Occupant Preserver™ system and method is responder ready-access.

BRIEF DESCRIPTION OF SEVERAL VIEWS OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE PREFERRED EMBODIMENTS

Figure 1:
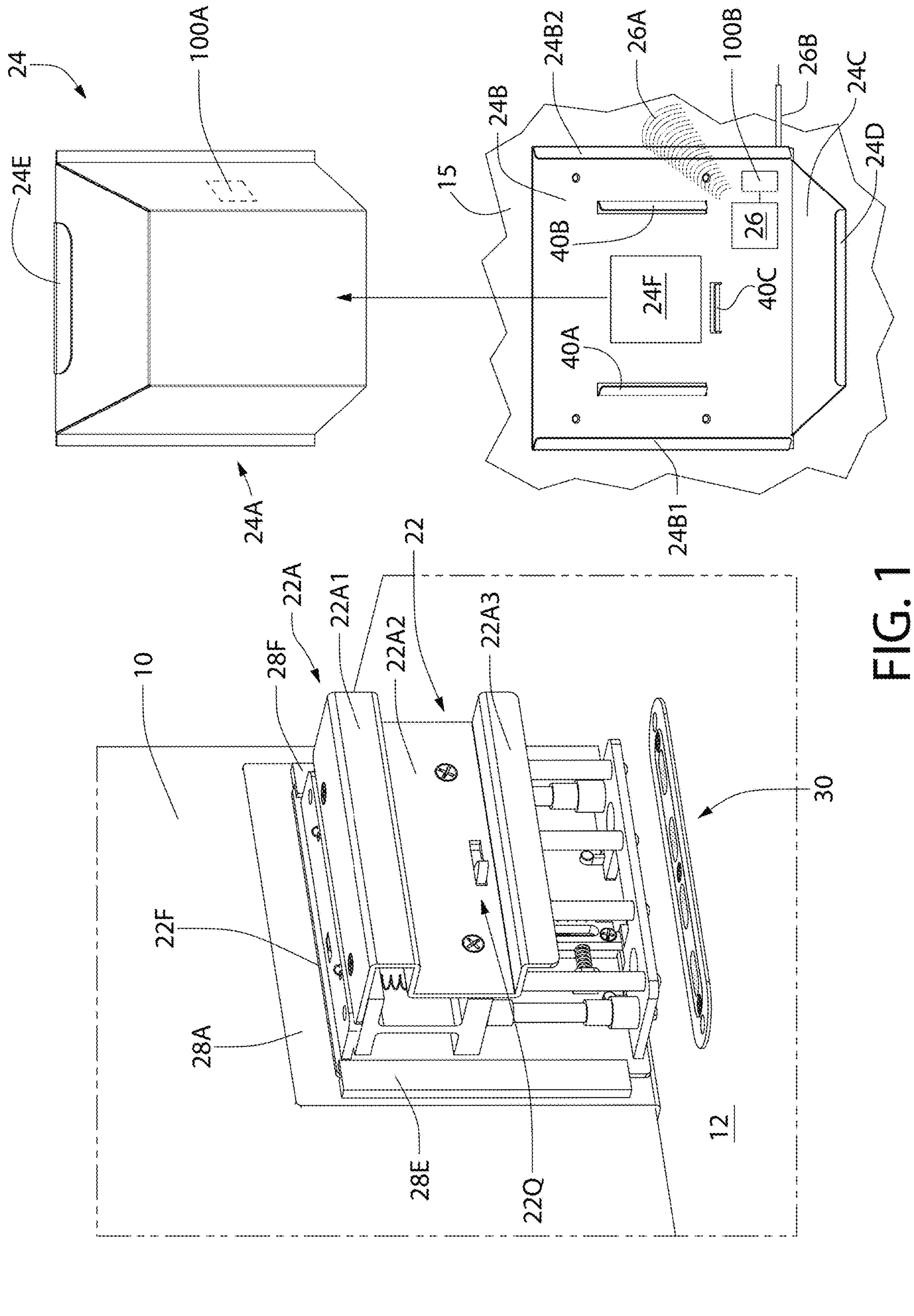
FIG. 1 is a system diagram depicting the main components of the universal tamper-evident shelter-in-place system and method of the present invention, wherein a door shelter lock assembly (DSL) has been removed from a storage unit and installed at the inside and lower portion of a door.

Referring now to the figures, wherein like reference numerals represent like parts throughout the several views, exemplary embodiments of the present disclosure will be described in detail. Throughout this description, various components may be identified having specific values, these values are provided as exemplary embodiments and should not be limiting of various concepts of the present invention as many comparable sizes and/or values may be implemented.

It should be understood that the "universal" feature of the present invention is that it can be used at any type of "access point" (e.g., a door, an inswing door, sliding door, a gate, etc.) for a room (e.g., an enclosure, a fenced-in courtyard, etc.). As such, the term "door" and "room" as used throughout this Specification is meant to cover any of access point and enclosure, respectively.

It should also be understood that for high security environments (e.g., diplomat agencies) or private residences, the door shelter lock (DSL) could be mounted such that the locking pins move horizontally, rather than vertically. In those situations the "strike" member would be located in the door jamb, rather than the floor.

The present invention, which is also referred to as Occupant Preserver™ system and method 20, addresses all of the concerns of the current state of the art by including the following features:

Design Criteria of the Present Invention

The challenges to creating a true shelter in place environment are among the following:

1. Must be obvious to a diverse population set
2. Must be able to be opened from the corridor side without the use of "Special Knowledge"
3. Must be universal for all door types
4. Must be invulnerable to:
    a. Any forms of unauthorized deployment
    b. Multiple door locking
        i. Must adhere to the ANSI "Knowing Act"
        ii. Individual occupant has the sole determination of sheltering-in-place or not as per the Run-Hide-Fight guidelines.
        iii. Hacking and/or other area-wide blockade
            1. For example, unauthorized "lock-in" for a gymnasium or other area of public assembly.
5. Must allow:
    a. Remote silent/audible alert security, police, fire or other responders
    b. Interfaced with existing facility security infrastructure
    c. Exterior/corridor access by authorized personnel The present invention is a universal tamper-resistant shelter-in-place system including a door shelter lock (DSL) designed to allow the occupant total control in the Run-Hide-Fight response plan.

The present invention is designed for rapid deployment from tamper-evident wall-mounted storage unit. Once the storage unit is opened, it signals a remote alarm, alerting fire and security staff. Once slid into place and activated, the DSL has locking pins that "engage" the floor by over 1 inch and be capable of withstanding up to approximately 19,000 pounds of pressure with multiple impacts.

The DSL of the present invention can be mounted to any sliding, swinging, folding, hinged/pivoted or revolving door. The standard mounting kit will accommodate door thicknesses of 1⅜"-2¼", additional options will be available for virtually any door thickness.

The remote indicator feature serves as a silent or audible panic alarm ensuring effective response by the building's security and/or police staff. This is especially significant when the present invention is triggered by a prankster or perpetrator during a localized event. During larger scale fire or violent events, the alarm will serve as an indicator-map showing exactly which rooms/areas are being utilized for shelter.

If an unauthorized individual were to attempt deployment of the present invention at any time, security and/or police would be notified immediately. This is a significant benefit to the response time to random acts of violence/individuals being accosted.

The DSL of the present invention can be opened via a high-security override key from the corridor side. This key will be utilized exclusively by police/security and fire responders. General building staff will not have access to the key.

If an occupant chose to remain "sheltered", the individual could continue depressing the activator portion of the DSL (to be discussed in detail later) and negate the override. In all instances, the occupant is intimately involved in the decision making of his/her own destiny.

There are no electronic or remote activation signals for the DSL.

There are no specialized keys or activation methodologies that the occupant would use with the DSL.

On a door-by-door, case-by-case basis, each individual can determine their own ability to Run, Hide, Fight.

Present Invention Usage

The present invention can be utilized for either of the following scenarios:

1. Event initiated as a means to shelter the general populace due to one or more assailants entering the building or an internal situation including patient, staff or other individual.

2. Event initiated as a remote panic alarm from the unscheduled and/or unauthorized use of the present invention Scenario examples:

1. Entrapment of one or more building occupants
    a. Perpetrator enters a room and utilizes the DSL of the present invention as a means to lock in their potential victim(s) as well as lock out any potential responding personnel.
    b. Once the DSL portion of the Occupant Preserver™ is deployed, they will proceed with their intended motive under the assumption that they will be undisturbed.

c. Unbeknownst to the assailant, the tamper-resistant DSL of the present invention housing was initially stowed in a tamper-evident storage unit, tied into the building's card swipe system and triggered a tamper alarm.

d. By incorporating the existing infrastructure, the exact location of the event was instantaneously known providing the response team the "element-of-surprise".

e. Security/Police can develop a proportionate response plan based upon recent/adjacent video and/or other factors.

f. Security/Police will determine the appropriate time to utilize the corridor override function of the DSL (as will also be discussed later) and gain entry to the space 2. Shelter-in-place one or more building occupants:

a. One or more individuals will seek refuge within an Occupant Preserver™ system and method protected room.

b. The occupant(s) will determine their need to secure themselves and prevent unauthorized entry to the room.

c. Present Invention deployment i. Remove the DSL from the tamper-evident storage unit 1. This action of opening the housing/cover/lid of the storage unit will trigger a remote alarm alerting emergency responders ii. Slide the DSL into door mounted receiver channel iii. Step down on the DSL activator as indicated iv. The DSL of the Occupant Preserver™ system and method will secure the door.

d. Shelter-in-Place i. For the duration of the event ii. Evacuation

1. Directed by security/police or others

2. Situation changes i.e., smoke or other apparent factors iii. Unauthorized use of override key 1. Occupant can inhibit the override and still maintain effective security.

e. Occupant Preserver™ system and method usage to be incorporated into ongoing active-shooter training.

In view of the foregoing, the present invention, and as mentioned previously, also referred to as "Occupant Preserver™ ", is a system and method 20 for sheltering in place with advanced responder notification and ready access. As shown most clearly in FIG. 1, the system and method 20 comprise a door shelter lock (DSL) assembly 22, a storage unit 24 having a transmitter 26 for issuing an alert 26A, an inside door mounting plate 28A, and a floor strike 30, as shown most clearly in FIG. 1; see also FIGS. 10-10B for detail of the floor strike 30. The storage unit 24 can be mounted to a wall 15 within a room having a door 10 that controls access into or out of the room. The storage unit 24 comprises the initial location of the door shelter lock assembly (DSL) 22 and a transmitter 26. An inside mounting plate 28A is attached to the lower portion of the door 10 whose opening/closing is now controlled by the DSL 22, as will be discussed in detail later. Furthermore, a floor strike 30 is installed in the floor 12 inside the room closely adjacent the door 10. As such, the DSL 22 is a portable device that can be removed from the storage unit 24 and installed at the lower portion of the door 10 during use; the DSL 22 can also be removed from the lower portion of the door 10, as also will be discussed later. Thus, the term "removable" as used throughout this Specification also encompasses the ability of the DSL 22 to be transported from one location to another (e.g., from the storage unit 24 to the door 10 and from the door 10 to the storage unit 24, or even held in the hand of the user as a weapon), installed at the door 10 and removed from the door 10, if necessary.

As also will be discussed in detail later, when an emergency situation arises in the building or facility where an immediate lockdown is required, a user will remove the DSL 22 from the storage unit 24. This removal of the DSL 22 triggers the transmitter 26 to emit an alert signal 26A to alert authorities that the DSL 22 has been removed, as well informing the authorities of the exact location of the storage unit 24 from where the DSL 22 was removed. The user will then couple the DSL 22 to the inside mounting plate 28A at the bottom of the door 10 and then activate the DSL 22 by stepping or using his/her hands with a downward force (e.g., 5 lbs. of force) to depress an activator 22A (e.g., a foot pedal, or any other type of grip, handle, surface, etc.) on the DSL 22. The depression of the activator 22A positions the lower ends of a plurality (e.g., four) of locking pins 22B down into the floor strike 30. The door 10 is now unable to be opened except by the user or authorities, as will also be discussed in detail later. In fact, in view of all of the foregoing, it should be understood that the thrust of the DSL 22 design it to provide the user with full control of the DSL 22 and the user can never be "entrapped" within the room should he/she want to exit. As such, the DSL 22 provides the user with the "ultimate control".

Activation of the transmitter 26 can be through the opening of the storage unit 24 in order to remove the DSL 22. The preferred method of activating the transmitter 26 is by opening the storage unit 24. Alternatively, or in addition, the actual removal, or even just movement, of the DSL 22 can be detected and that action can activate the transmitter 26. The transmitter 26 can emit a signal 26A on any conventional fire, security, meshed, WiFi or other conventional building management system (BMS). Thus, it should be understood that the wireless communication methodology, or a wired communication methodology (including a telephone system, etc.) should not form any limitation on the present invention 20. A critical feature of the present invention 20 is that removal of the DSL 22, whether by detecting the opening of the storage unit 24, or the movement of the DSL 22 itself from the storage unit 24, (or both) will immediately alert authorities of the exact location of this DSL 22/storage unit 24.

Storage Unit 24

Figure 1A:
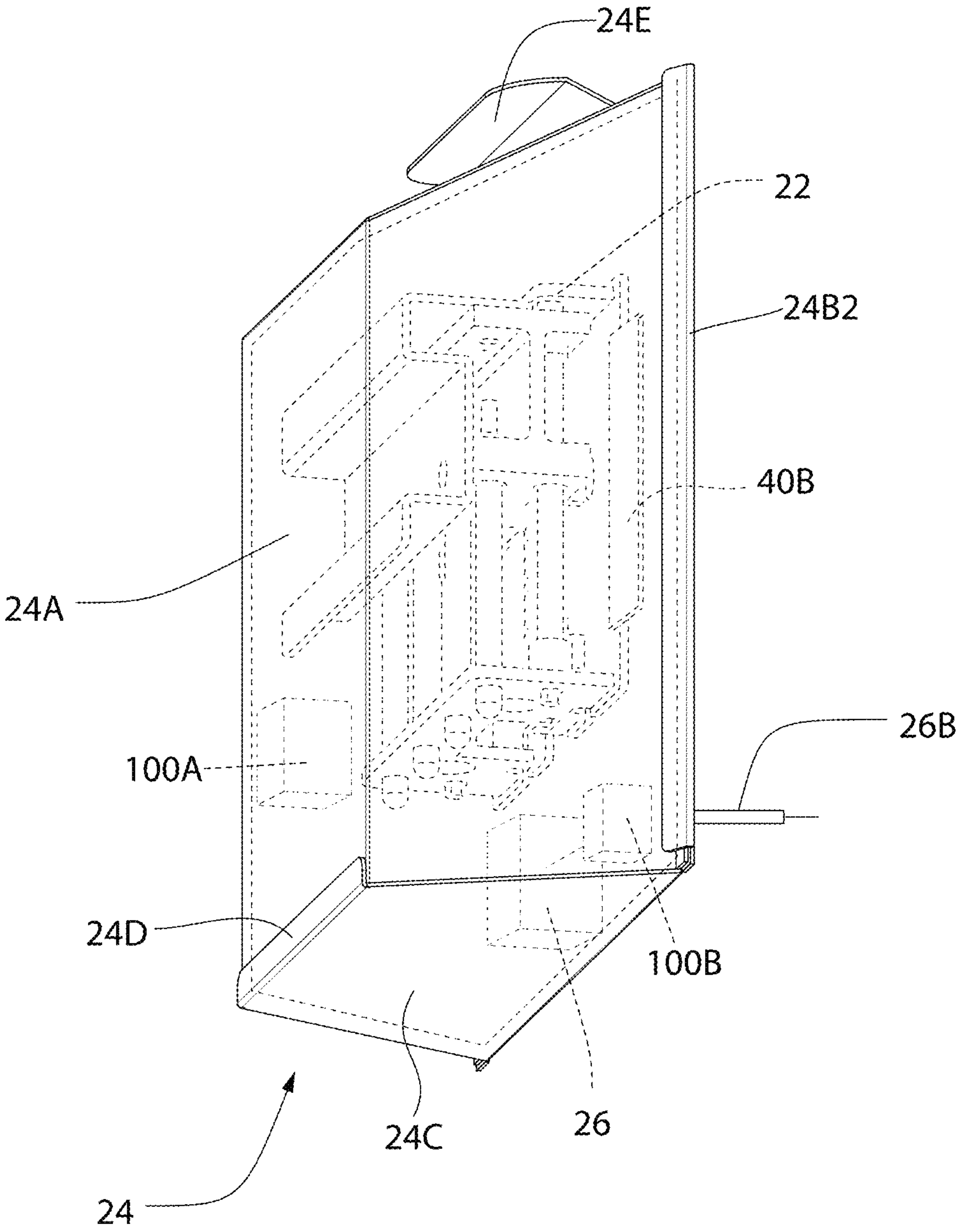
FIG. 1A shows the storage unit in a closed position with the door shelter lock (DSL), shown in phantom, stored therein.

As shown most clearly in FIG. 1A, the storage unit 24 comprises a support member 24B for mounting the storage unit 24 onto a wall 15 (e.g., 30-42 inches above the floor 12). A cover/lid 24A is slidably engaged with the support member 24B so that the cover 24A can be slid upward and away to provide the user with access to the DSL 22. The support member 24B comprises a left track 24B1 and a right track 24B2 to receive the respective sides of the cover 24A therein and a cantilevered bottom 24C having a forward catch 24 for holding the cover/lid 24A thereon. With the lid 24A secured within those tracks 24B1/24B2 and the bottom 24C with the catch 24D, the lid 24A is secured against any movement other than upward as shown by arrow 41 in FIG. 1B.

The support member 24B also comprises a left track 40A, a right track 40B and a bottom catch 40C into which the DSL lock body or backplate 22F is releasably secured. Since an emergency situation is not the norm, the DSL 22 typically is stowed in the storage unit support member 24B (FIG. 1B) and with the cover/lid 24A installed thereat.

The opening of the cover/lid 24 immediately causes the transmitter 26 to transmit the alert signal 26A. Alternatively, the removal of the DSL 22 from the storage unit 24 could also activate the transmitter to immediately transmit the alert signal 26A. It is within the broadest scope of the present invention 20, that either of those actions can immediately transmit the alert signal 26A. As such, the following discussion on the detection scheme for these actions does not form any limitation whatsoever on the invention 20; the critical feature is detecting the opening of the storage unit 24 (and/or removal of the DSL 22) which immediately provides authorities (including building security) with the exact location of the storage unit 24 opened.

The following discussion are just examples of various detection schemes for generating the alert signal 26A and is not a limitation to those discussed; it is within the broadest scope of the present invention 20 to include a wide variety of detection schemes for detecting the opening of the storage unit lid 24A (or lid 124A as discussed below) and automatically alerting building security personnel, authorities (e.g., fire department, police department, etc.). For example, coupled to the support member 24B is a magnetic contact 100B (e.g., a reed switch). The magnetic contact 100B can be hard-wired 26B directly to the building's building management system (BMS), fire system, security system, or to a wireless transmitter 26 (as such, the hard-wired 26B can be considered an alternative to the wireless transmitter 26, or vice versa). The item 100A in the cover/lid 24A may be a magnet. Alternatively, item 100B could be a radio-frequency identification (RFID) reader (e.g., Vulcan RFID Iron USB reader, HID Contactless multiclass SE R40 & Prox card reader, etc.) and item 100A can be an RFID label (storing a wide variety of data, including DSL identification, room location, the open or closed status of the cover 24A, etc.), with the RFID reader 100A being hard-wired 26B directly to the building's building management system (BMS), fire system, security system, or to a wireless transmitter 26.

Figure 1B:
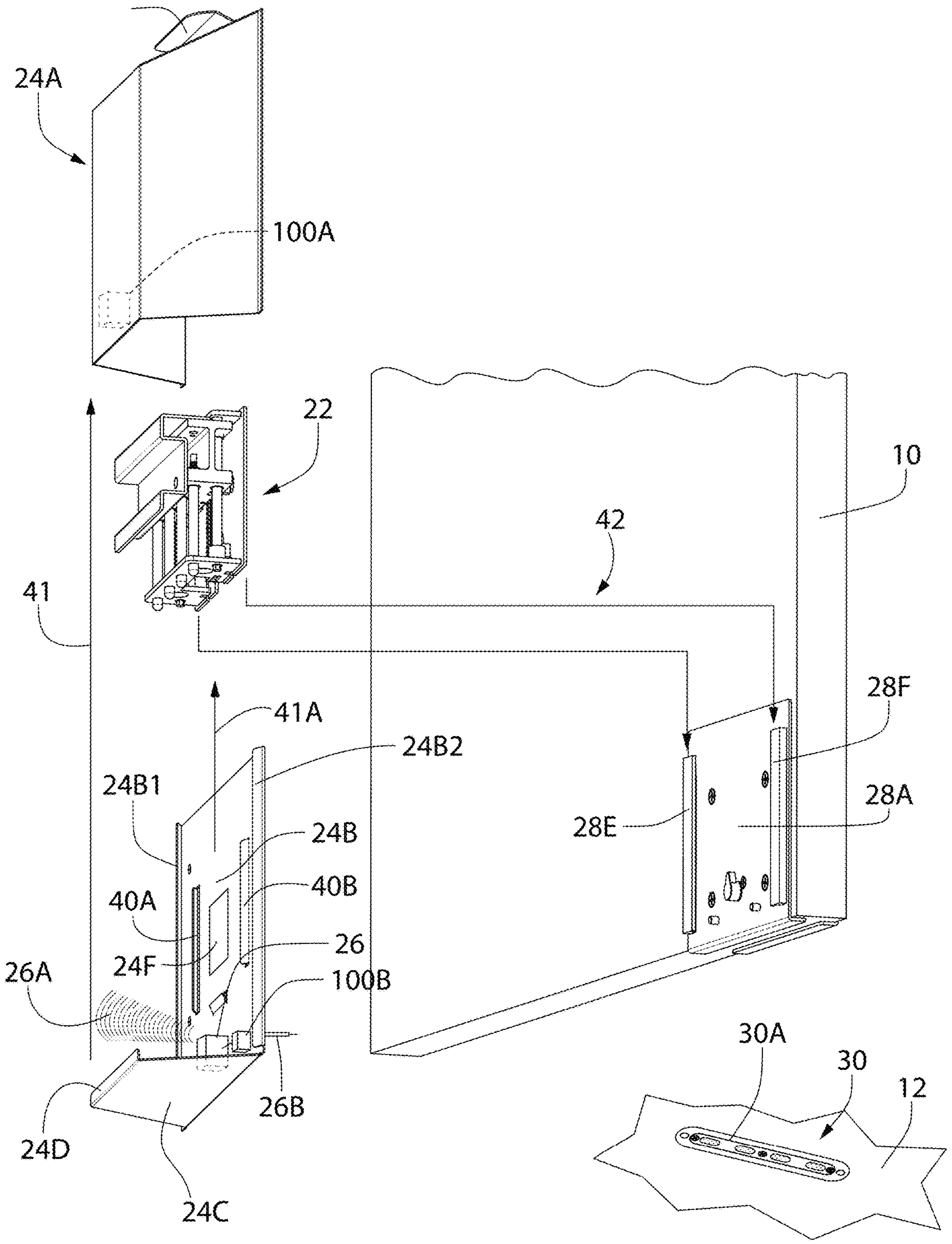
FIG. 1B is an exploded view of the system of the present invention showing how the DSL is removed from the storage unit, which automatically alerts authorities to the exact location of the storage unit, and how the DSL is installed at the lower portion of the inside of the door and positioned over a floor strike underneath the closed door.

It should be understood that the transmitter 26 identified in FIGS. 1-1B is meant to identify a wide variety of reliable transmitters used in security or other detection systems (e.g., wireless transmitter WNC-965, WiFi modem, Bluetooth modem, etc.).

Whichever detection scheme is implemented, once the cover/lid 24A is slid upward (or the DSL 22 removed from the storage unit 24), the transmitter 26 (or RFID reader 100B) immediately activates to emit the alert signal 26A.

In an emergency situation, as shown in FIG. 1B, the user pulls up on a handle 24E of the cover 24A in the direction of arrow 41 and once the cover 24A has been slid upward and away, exposing the DSL 22, the DSL 22 is then also slid upward, in the direction of arrow 41A, out of the tracks 40A/40B and then the DSL 22 is brought over to the door 10 and installed in the inside door assembly mounting plate 28A, in the direction of arrows 42, as will be discussed in detail farther below.

It should be noted that the DSL 22 can be installed in the door assembly 28 and activated to lock the door closed in under 10 seconds.

As mentioned previously, the option of wire harness 26B may provide power and/or communication cables for the transmitter 26/reader 100B. It should be understood that it is within the broadest scope of the present invention 20 that the transmitter 26/reader 100B can be battery-powered so that there is no need to provide power from the building and that any data from the transmitter 26/reader 100B can be accomplished via wireless communication.

It is also within the broadest scope of the present invention that the term "transmitter" as used throughout this Specification is meant to cover any device or devices or networks that generate an alert signal 26A/126A either wired or wirelessly that provides precise location data of the storage unit 24/124 and is activated whenever the storage unit 24/124 is opened. Alternatively, the trigger event may be the removal of the DSL 22 from the storage unit 24/124. In either case, the term "transmitter" includes any configuration for immediately generating the signal 26A/126A which may also access a database or global computer networks (e.g., Internet) or GPS (global positioning system) for precise location data and/or storage unit identification or DSL 22 identification. The signal 26A/126A can be electrical or optical and wherein the data conveyed within is automatically provided to "authorities." As used throughout this Specification, the term "authorities" covers any entity that can quickly render assistance to save and rescue (e.g., security officers on site, fire department, police department, FBI, etc.) the users of the DSL 22 as well as apprehend or neutralize an assailant or perpetrator. The term "authorities" also covers entities that can communicate (e.g., building management systems, central stations of security monitoring entities, etc.) with entities that can save and rescue the users of the DSL 22. Besides precise location data, the signal 26A/126A can convey other information, e.g., on/off states, open/close states, location, identification, etc. and as such can even be a switch that operates with an on and off state.

It should be further noted that system and method 20 of the present invention have been designed with correlated motions, as will be seen later with the installation/removal of the DSL 22 at the bottom portion of the door 10. In particular, upward movement of the storage unit lid 24A permits for the upward removal of the DSL 22 from the storage unit 24. This corresponds to the upward movement of the DSL 22 from the door assembly mounting plate 28A, corresponding to an "unlocked" or "open" condition of the door 10, as will be discussed in detail below. Conversely, downward movement of the DSL 22 into the door assembly 28 is in preparation for DSL 22 activation into a "locked" or "closed" door condition, just as a downward movement of the DSL 22 in the support member 24B of the storage unit 24 and then downward movement of the storage unit cover/lid 24A is to secure the DSL 22 within the storage unit 24. Similarly, and as will be discussed later, the upward movement of the locking pin carrier (also referred to as the "main block") 22C is an "unlocked" condition of the DSL 22 whereas a downward movement of the locking pin carrier 22C comprises a plurality of locked conditions of the DSL 22. As such, upward movement alludes to an "open" or "unlocked" condition whereas downward movement alludes to a "closed" or "locked" condition.

Figure 1C:
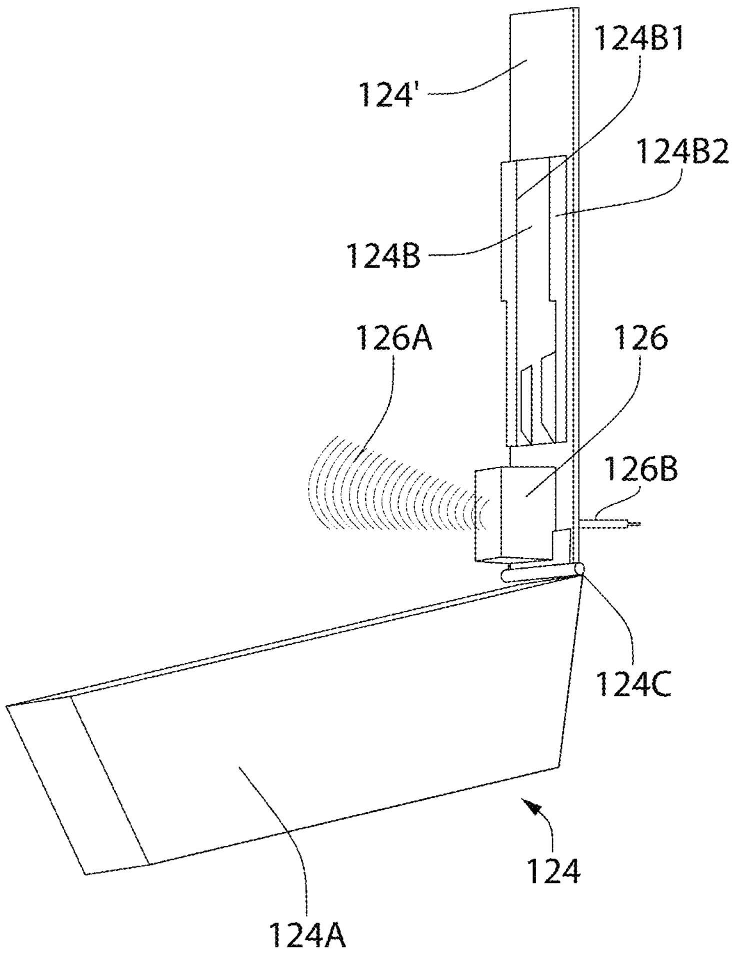
FIG. 1C is an isometric view of an alternative storage unit using a hinged lid shown with the lid in an open condition and the transmitter emitting the alert signal, and with the DSL having been already removed therefrom.
Figure 1D:
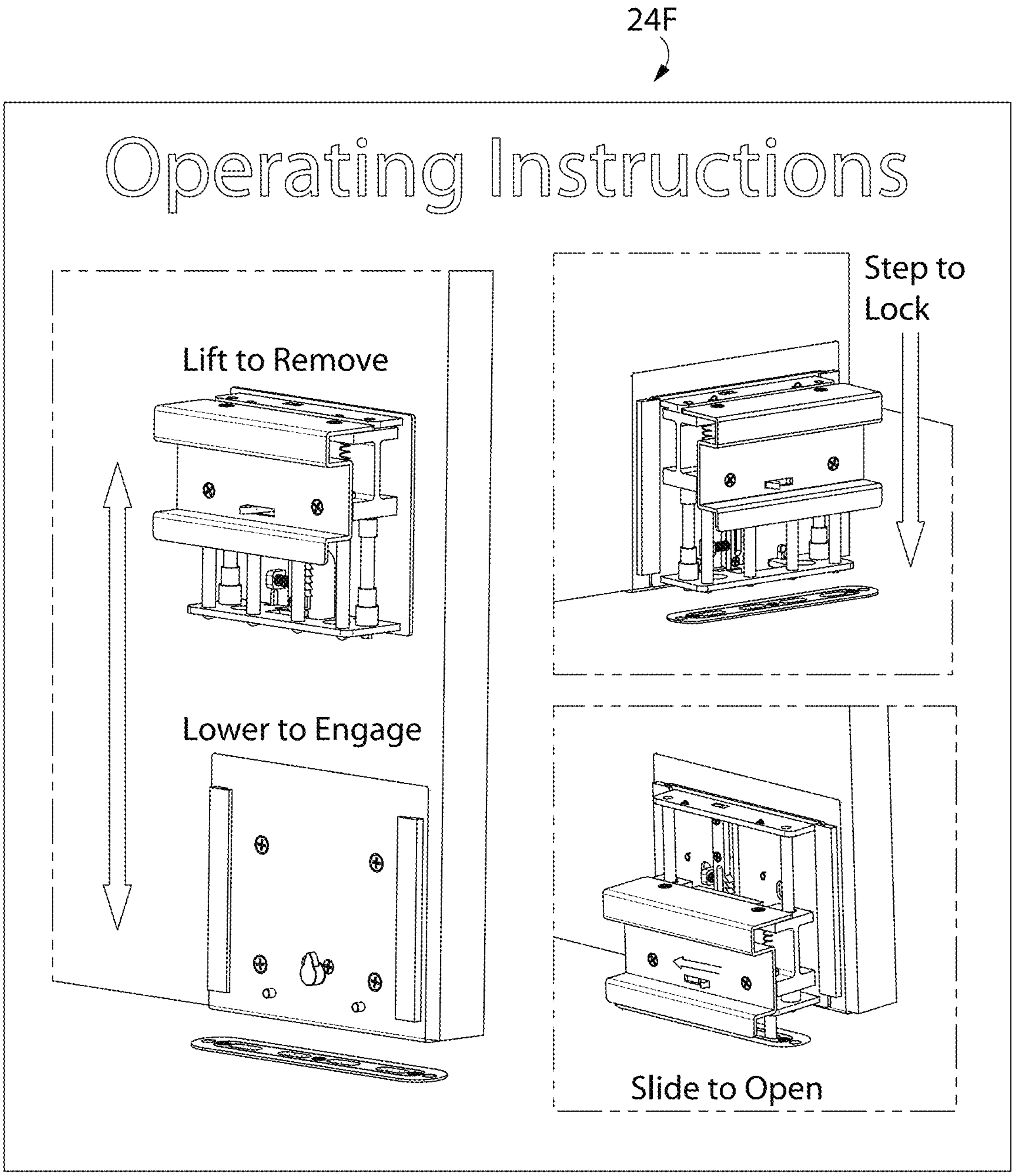
FIG. 1D is an operating instructions label that is positioned on the storage unit backplate for assisting users during an emergency situation on what to do and how to install the DSL.

This is also shown in FIG. 1D which depicts an operation instructions label 24F that is secured on the storage unit backplate 24B (FIGS. 1 and 1B). Thus, once the user removes/opens the cover/lid 24, the user is provided with easy-to-use clear instructions on what to do with the DSL 22, once it is removed from the storage unit 24/124, namely, take it over to the door 10 and slide it into the mounting plate 28A (left image on label 24F), and once slid into mounting plate 28A, to step downward on it to lock the DSL), as well as the door 10 closed 22 (upper right image on label 24F. Should the user need to open the door 10 to allow a trusted person to enter, the lower right image shows the brake release 22Q being moved to the left, as will be discussed in detail later. Alternatively, rather than use the brake release 22Q, the user can simply lift up the entire DSL 22 to remove it from the mounting plate 28A (as also will be discussed in detail later). Thus, even though users are trained beforehand on how to use the storage unit 24/124 and DSL 22, the operating instructions label 24F provides clear instructions for users during an actual emergency situation when they could be under immense stress and forget their previous training. Alternative Storage Unit 124

Instead of using a cover 24A that can be slid upward to expose the DSL 22, an alternative storage unit 124 uses a hinged cover/lid 124A, which is shown in FIG. 1C. In particular, the cover/lid 124A is hinged 124C to a support member 124' (which is also secured to the wall 15, like 24B) so that the cover 124A can be opened to provide the user with access to the DSL 22, which is typically stowed in a storage unit mounting plate 124B. Attached to the mounting plate 124B are storage flanges 124B1 and 124B2 for receiving the DSL lock body/backplate 22F therein. The storage tracks 124B1 and 124B2 are similar to the tracks 28E/28F on the inside mounting plate 28A in the door assembly 28, as will be discussed in detail below. Transmitter 126 corresponds to transmitter 26, alert signal 126A corresponds to alert signal 26A, and optional wire harness 126B corresponds to optional wire harness 26A. Moreover, the discussion regard magnetic contact/RFID reader 100B and magnet/RFID label 100A, although not shown in FIG. 1C, also apply as discussed previously with regard to the storage unit 24.

All of the previous discussion pertinent to detecting the opening of the cover/lid 24A, and/or removing the DSL 22 from the storage unit 24, and immediately transmitting the alert signal 26A pertaining to the storage unit 24 also applies to the alternative storage unit 124 and is not repeated here.

An observation window (not shown) may be provided in the cover 24A/124A to allow a user to see or inspect the DSL 22 if the DSL 22 is present inside the storage unit 24/124 or not. Either storage unit 24 or 124 is typically mounted on the wall 15 at 30-42 inches above the floor 12.

Door Assembly 28

Figure 2A:
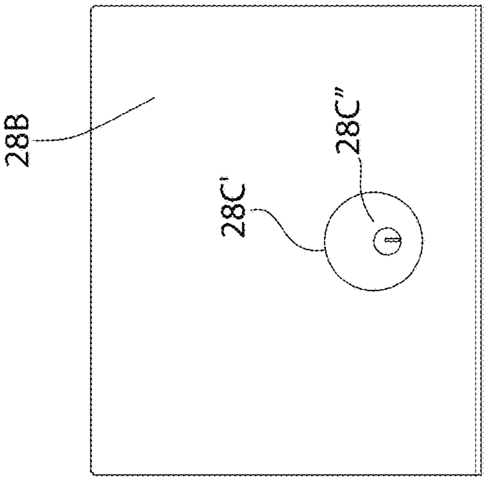
FIG. 2A is a plan view of the outdoor plate of the door assembly showing the faceplate of the key cylinder and key aperture therein.
Figure 2:
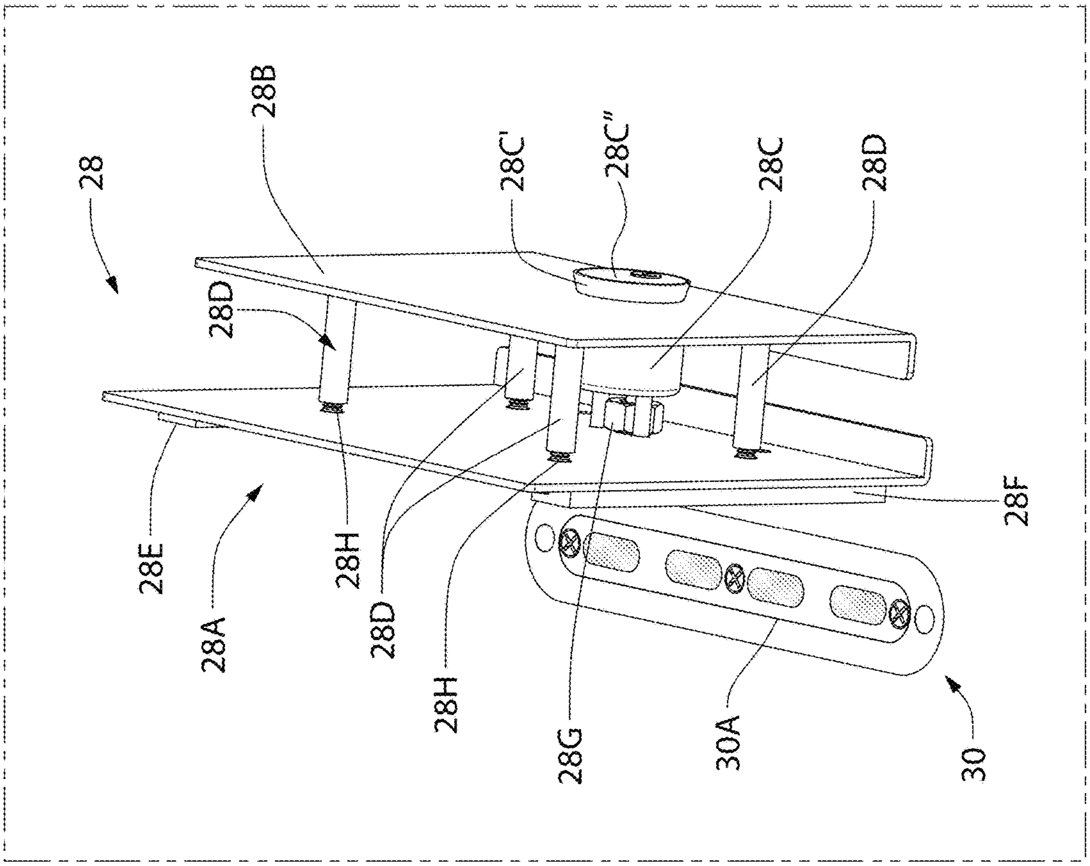
FIG. 2 is an isometric view of the door assembly as it would appear when installed on the door, which is not shown for clarity purposes, and with the floor strike and cover shown located in the floor.

FIG. 2 depicts the entire door assembly 28 as it would be positioned at the bottom of the door which is omitted for clarity purposes. The door assembly 28 comprises the inside mounting plate 28A which, as discussed previously is mounted on the lower end of the inside surface (i.e., the side facing the interior of the room) and an outdoor plate 28B having a key cylinder 28C having a cylinder ring 28C' and a faceplate 28C" with key insertion aperture (FIGS. 2 and 2A) for insertion of a key (not shown but for example, a "1620 key" which is a general purpose key for New York City fire personnel and first responders, also referred to as an "elevator recall key"). The cylinder ring 28C' is installed with its bevel (FIG. 2) facing outward to provide authorities with the ability to grasp the cylinder 28C during servicing. When the key is inserted into the insertion aperture, the key can be rotated in either direction to release the locked condition of the DSL 22, as will be discussed in detail later. As such, the door assembly 28/DSL 22 allow first responders to gain entry into the room from the outside without having to resort to forceable entry means. As way of example only, individual municipalities will create their own tactical response plans and procedures such as in NYC despite a multitude of responder agencies having the key, only the police department ESU (emergency service unit) personnel would open any closed door.

It should also be noted that there are no fasteners visible on the outdoor plate 28B to avoid giving a perpetrator any means of disengaging the door assembly 28 from the outside of the door 10. The key cylinder 28C is mounted through the door 10 and interacts with the DSL 22 as will be discussed later. The outdoor plate 28B is connected to the door assembly 28 through studs 28D (e.g., welded stainless steel ¼ 20 female threaded stand-off, etc.) that are also mounted through the door 10. Fasteners (e.g., screws, bolts, etc., the heads of which most clearly shown in FIG. 4) are inserted into the apertures 28H (FIG. 3) and into the studs 28D; as such, all fasteners are only accessible on the inside of the door 10. Vertically-oriented tracks 28E and 28F act as sleeves to allow the lock body (22F, FIGS. 3-3A) of the DSL 22 to be quickly and securely attached to the inside mounting plate 28A; these tracks 28E/28F may be welded to respective sides of the inside mounting plate 28A. A lock cam 28G is provided at the end of the key cylinder 28C and which protrudes through the inside mounting plate 28A; a cutout 22X (FIG. 3B) in the DSL lock body 22F allows for proper positioning of the cam 28G with respect to a sawtooth brake 22L. The function of the lock cam 28G will be discussed below.

Figure 4:
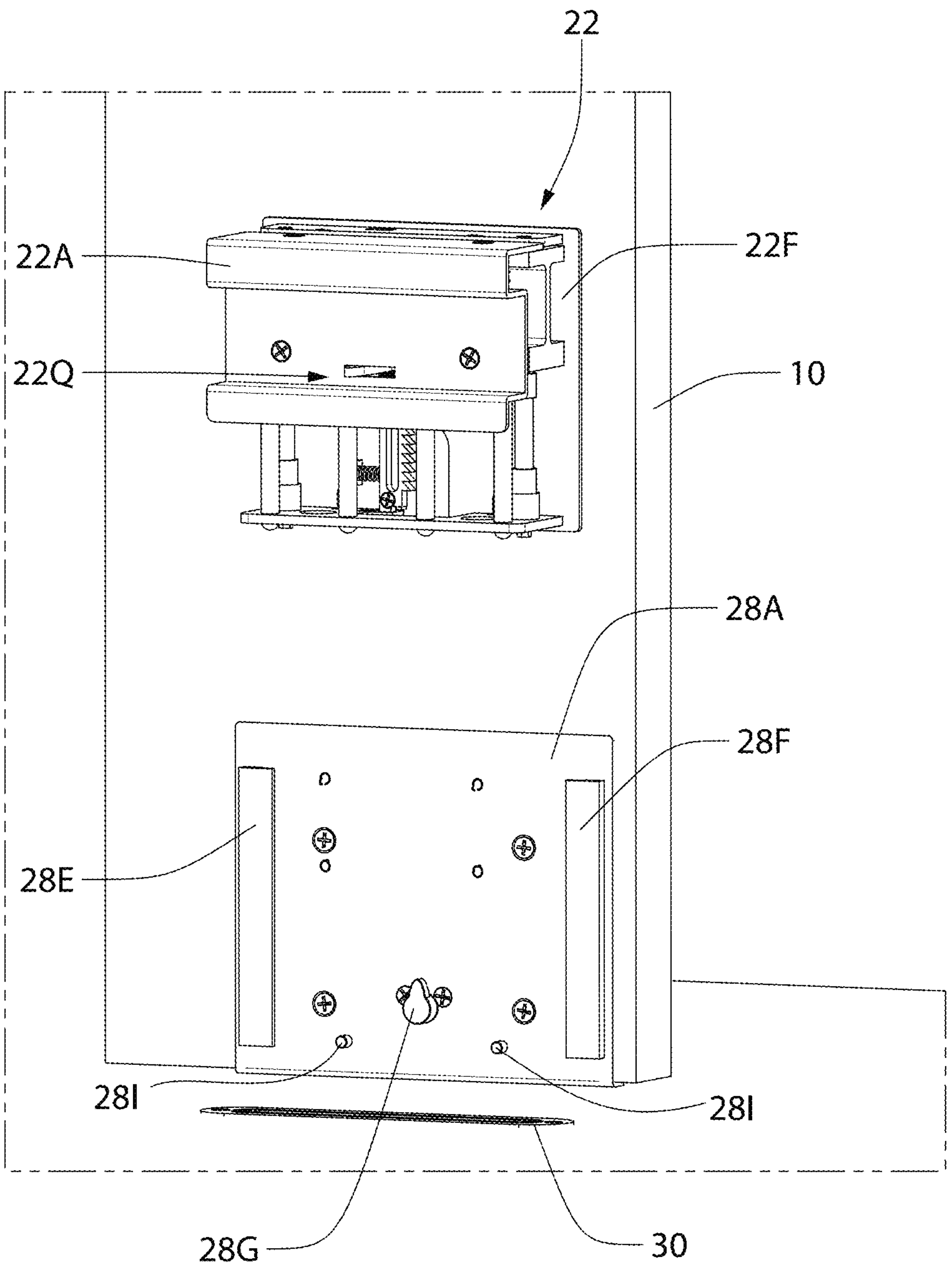
FIG. 4 is an isometric view of the DSL about to be installed into the inside door mounting plate.
Figure 4A:
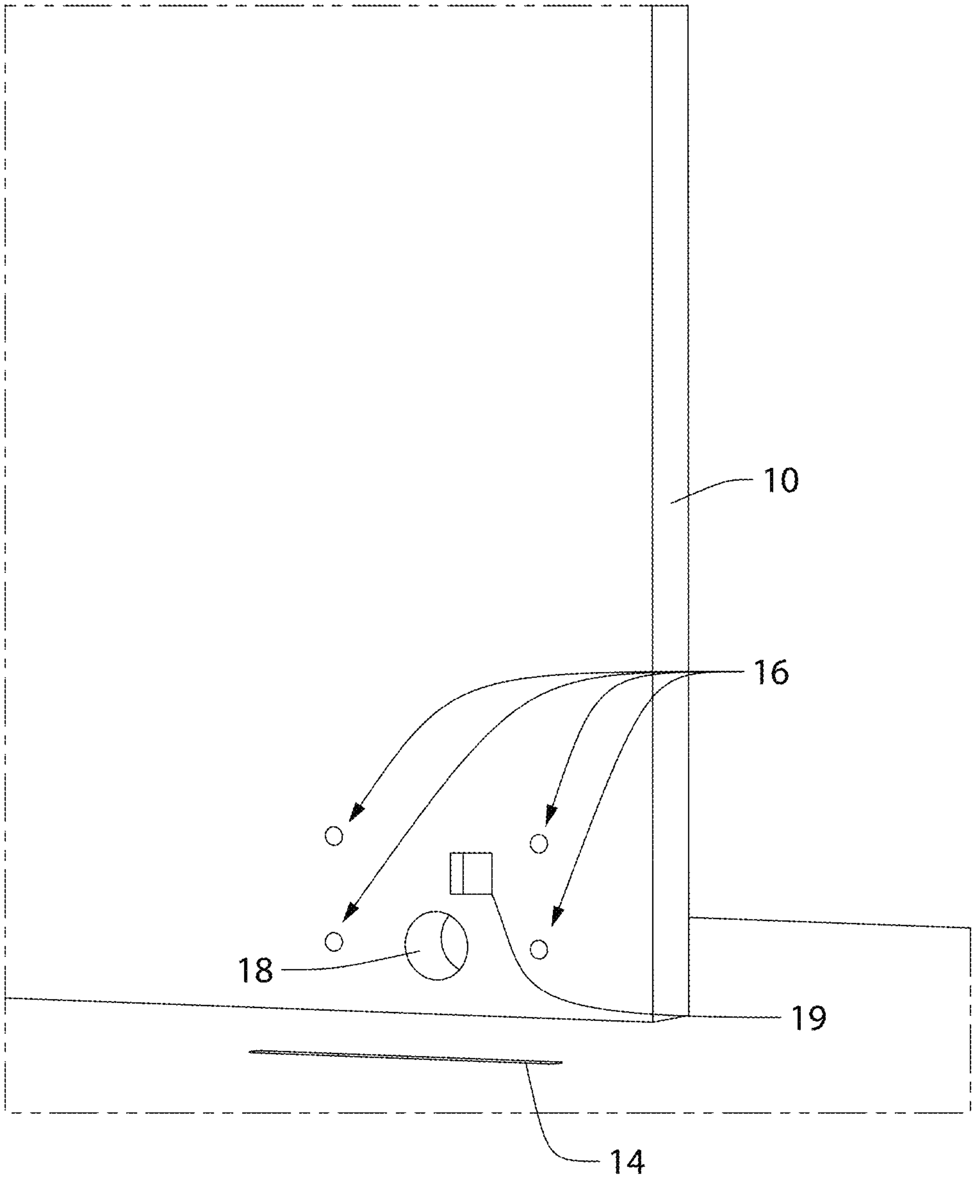
FIG. 4A shows the holes formed into the lower portion of the door to accommodate the studs in the door assembly and the key cylinder/cam therethrough prior to mounting of the door assembly thereat.

It should be noted that holes need to be formed within the lower end of the door 10 prior to securing the door assembly 28 thereon. To that end, FIG. 4A depicts holes 16 for receiving the studs 28D therethrough and a larger hole 18 is formed to allow passage of the cam 28G and key cylinder 28C therethrough.

The door assembly 28 construction distributes the load, compensates for potential existing distortions within the door 10, as well as for varying door thicknesses.

It should also be noted that the presence of the outdoor plate 28B having the key faceplate 28C" therein provides first responders with a quick way to verify that is the room, in a corridor or rooms, where the shelter-in-place alert emanated. The unique appearance of the plate 28B/faceplate 28C" can be easily seen at the base of the door 10 when first responders first appear on the scene. Moreover, the presence of the key faceplate 28C" also reminds first responders of the NFFF national campaign of "try before you pry", namely, they should not try to the force the door open using the conventional door knob/lock ". Instead, it reminds the first responders to use the key (e.g., the 1620 key, etc.) to unlock the DSL 22 installed on the inside of the door.

Door Shelter Lock Assembly-DSL 22

Figure 3:
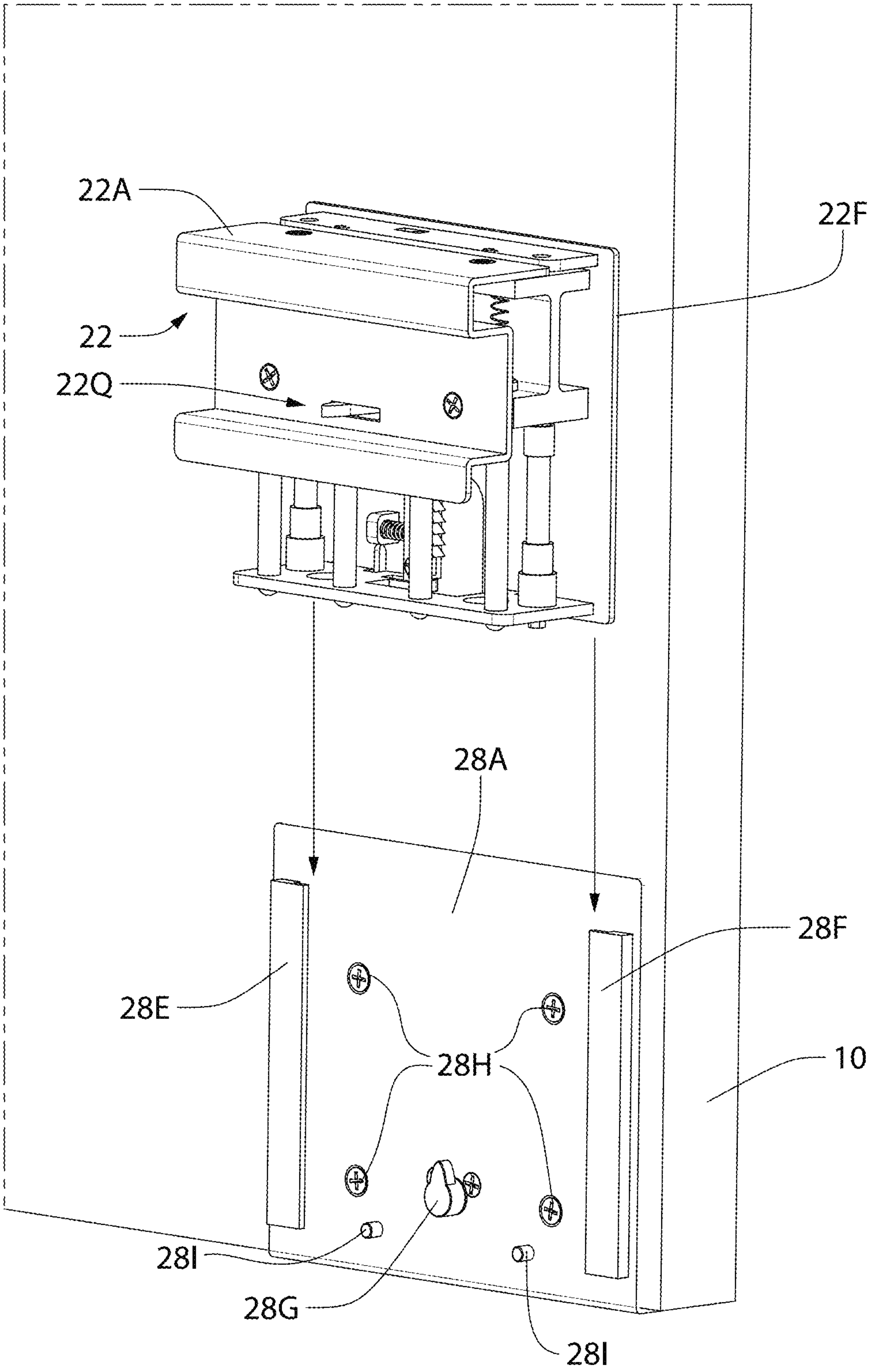
FIG. 3 is an isometric view of the lower portion of the inside of the door showing the DSL being installed into the mounting plate of the door assembly.

FIG. 3 depicts the door shelter lock (DSL) 22 just before it is inserted into the mounting plate 28A of the door assembly 28.

Figure 3A:
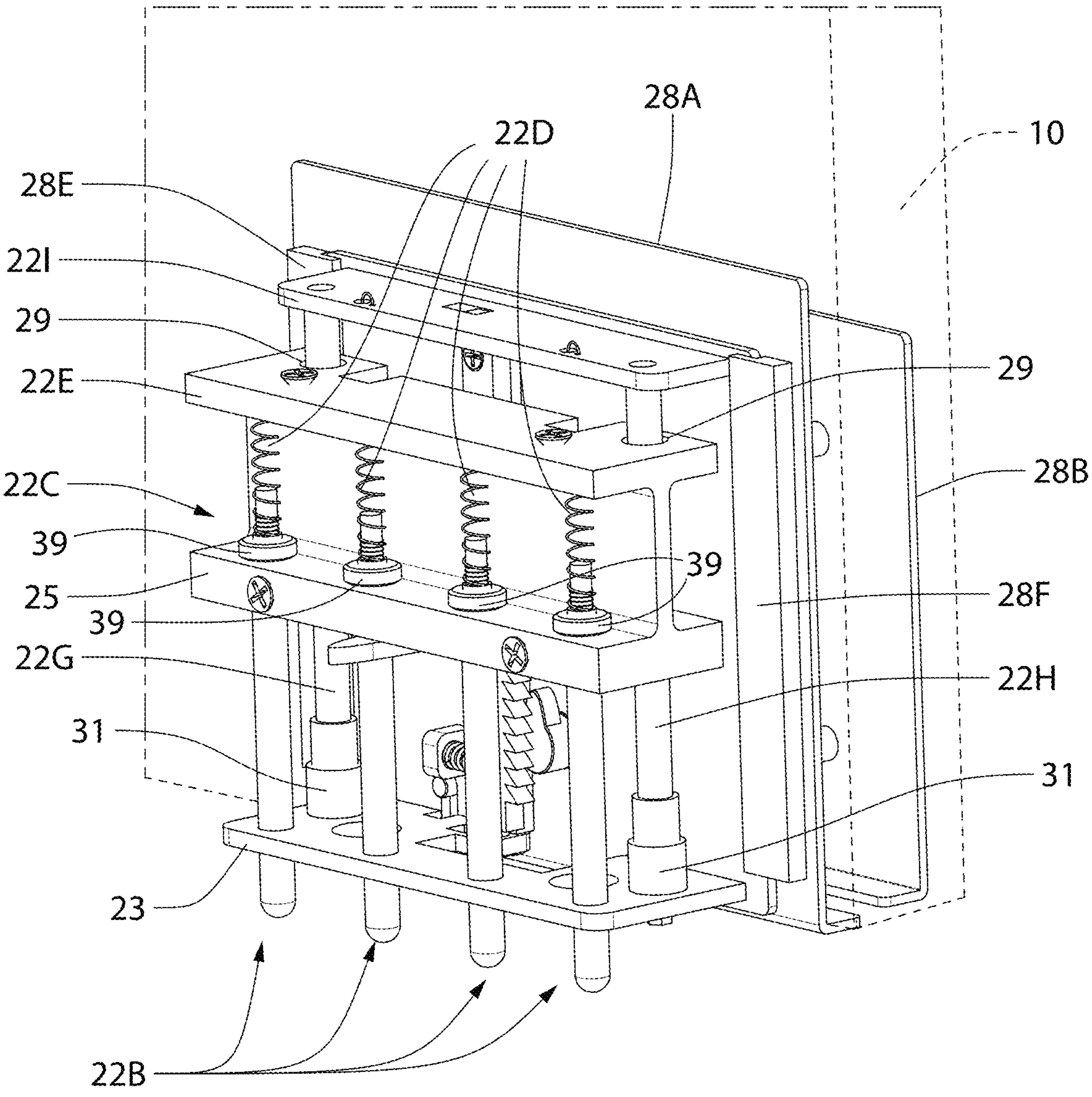
FIG. 3A is a top isometric view of the DSL installed in the door assembly with the activator omitted for clarity.
Figure 3B:
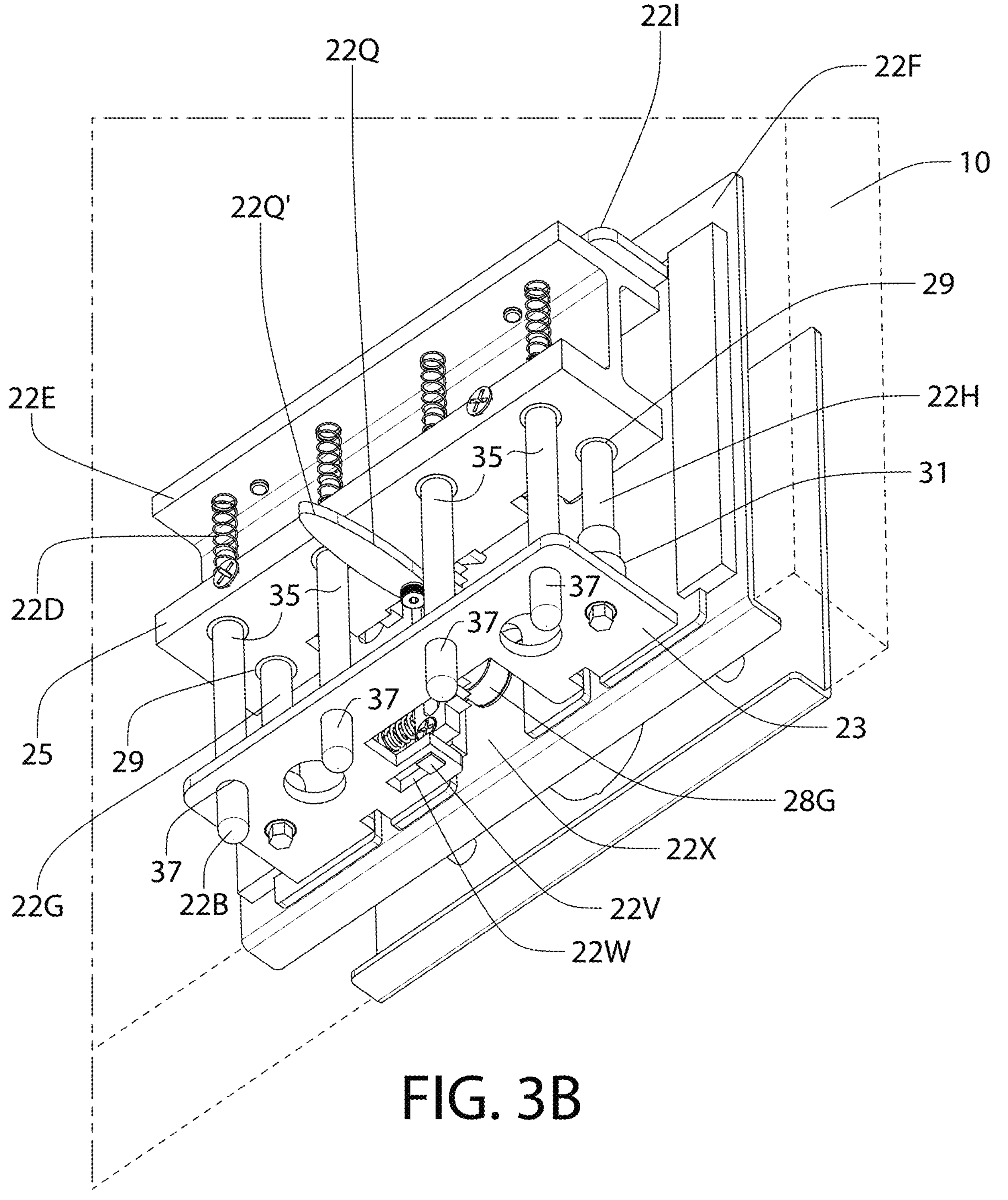
FIG. 3B is a bottom isometric view of the DSL installed in the door assembly with the activator again omitted for clarity.
Figure 7:
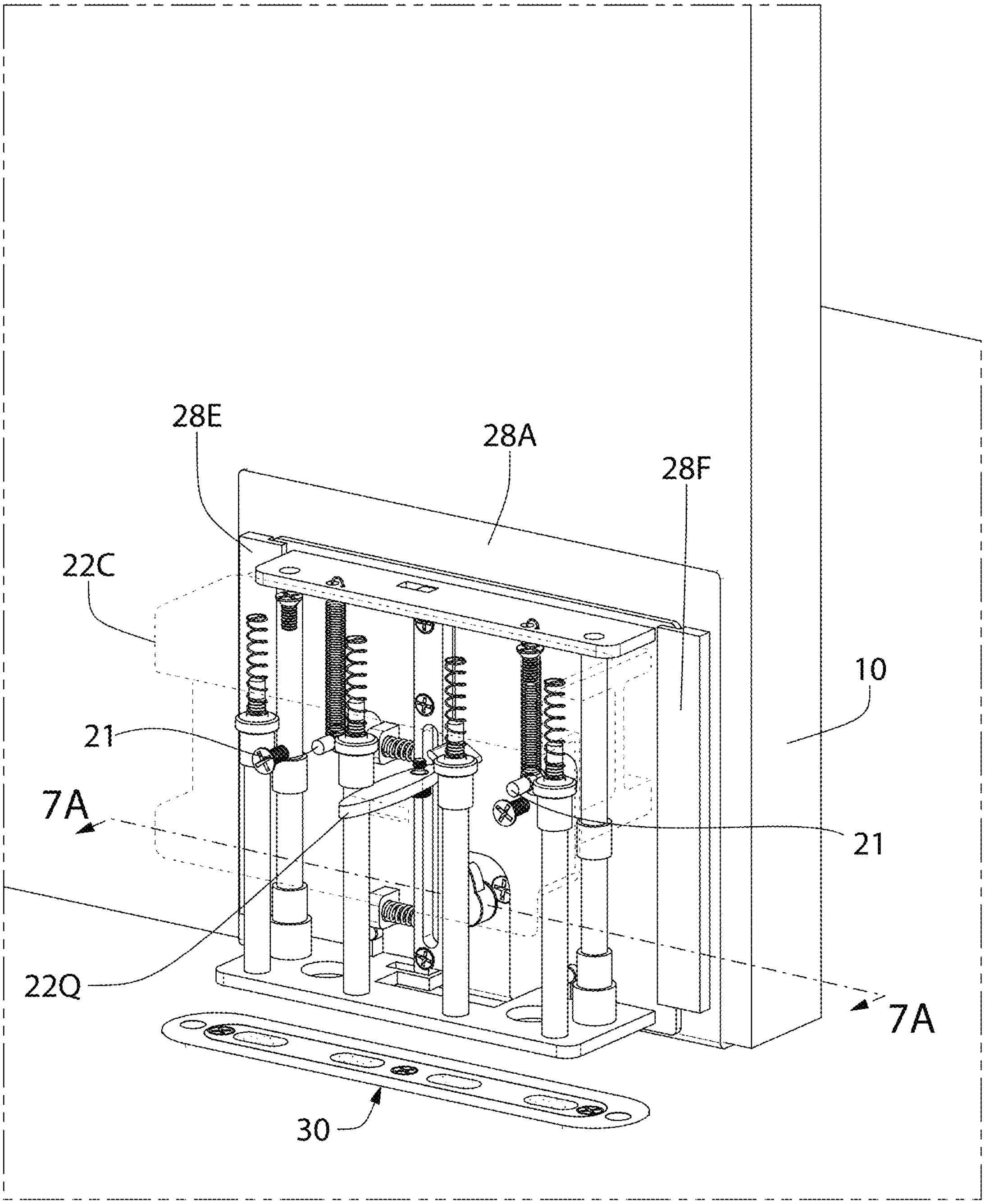
FIG. 7 shows the DSL positioned in the mounting plate at the lower portion of the inside of the door with the activator omitted and the locking pin carrier (main block) shown in phantom for clarity in the unlocked position with the locking pins positioned out of the floor strike, whereby the door is able to be opened.
Figure 8:
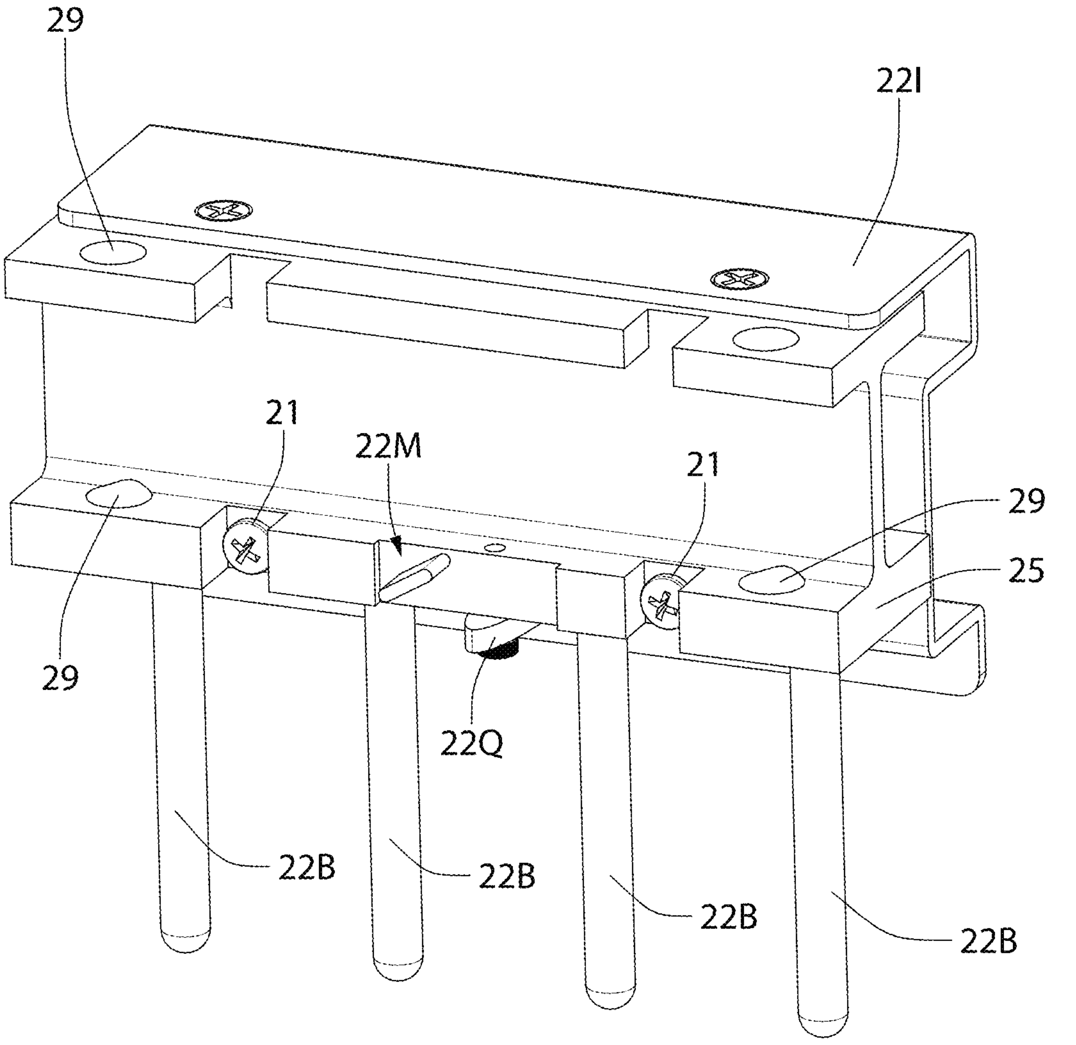
FIG. 8 is an isometric back view of the DSL, omitting the sawtooth brake, and release mechanism locking pin carrier springs, the locking pin springs and the lower flange of the DSL for clarity.

To discuss the details of the DSL 22, as shown most clearly in FIG. 3A, the activator 22A has been removed for clarity. The DSL 22 comprises a top flange 22I secured to the lock body 22F and a bottom flange 23 secured to the lock body 22F. Slide rods 22G and 22H are secured between the top flange 22I and the bottom flange 23. A main block (also referred to as a "locking pin carrier" for reasons to be discussed below) 22C comprises an "I-beam" shape with a top flange 22E and a lower flange 25. Apertures 29 in the flange 22E (FIGS. 3A and 8) of the main block 22C and apertures 29 in the bottom flange 25 (FIGS. 3B and 8) of the main block 22C allow the main block 22C to slide up and down the slide rods 22G/22H, with stops 31 provided on the lower ends of the slide rods 22G/22H against which the bottom flange 25 contacts when the main block 22C is moved downward. In addition, the main block 22C is biased upward by slide rod springs 22J and 22K (see FIGS. 5, 5A and 6), each of which has an upper end secured within the top member 23 and a lower end that is secured to a respective screw 21 (see FIGS. 6, 7 and 8). Access to these screws 21 to secure the lower ends of the slide rod springs 22J/22K into the main block 22C are via openings 21C (see FIG. 3C) in the lock body 22F. The slide rod springs 22J/22K pass through cutouts 21 (see FIG. 8) in the top 22I/bottom flanges 25. The slide rod springs 22J/22K bias the main block 22C in an unlocked or upward position (see FIG. 7). The top member 22I acts as a handle to allow the user to insert the lock body 22F into the vertically-oriented tracks 28E/28F of the inside mounting plate 28A.

A plurality (e.g., four) of locking pins 22B pass through apertures 35 in the lower flange 25 of the main block 22C and through apertures 37 in the bottom member 25 of the DSL 22. Locking pin nuts 39 (FIG. 3A) of the locking pins 22B prevent the pins 22B from completely passing through the lower flange 25 of the main block 22C. Pin springs 22D are secured at their upper ends to the top flange 22E of the main block 22C and at their lower ends by the respective locking pin nuts 39 (see FIG. 3A). The pin springs 22D apply a downward bias to the pins 22B but should the lower end of any one pin 22B encounter an obstruction as its passes into the floor strike 30 (as will be discussed below with regard to FIGS. 14A-14B), the obstructed pin 22B will rise up against the bias of its corresponding pin spring 22D. Thus, for example, should any one pin 22B not be aligned with the floor strike 30 and encounter an obstruction (e.g., the floor itself 12), the pin 22B will not interfere with the motion of the remaining pins 22B that pass into the floor strike 30. That is another key advantage of the DSL 22 in that it permits at least one pin 22B to pass into the floor strike 30, whereby just a single pin 22B positioned in the floor strike 30 will act to prevent the door 10 from being opened, while protecting the other misaligned pins 22B from being damaged by impact with an obstruction, e.g., the floor 12 itself.

Figure 10:
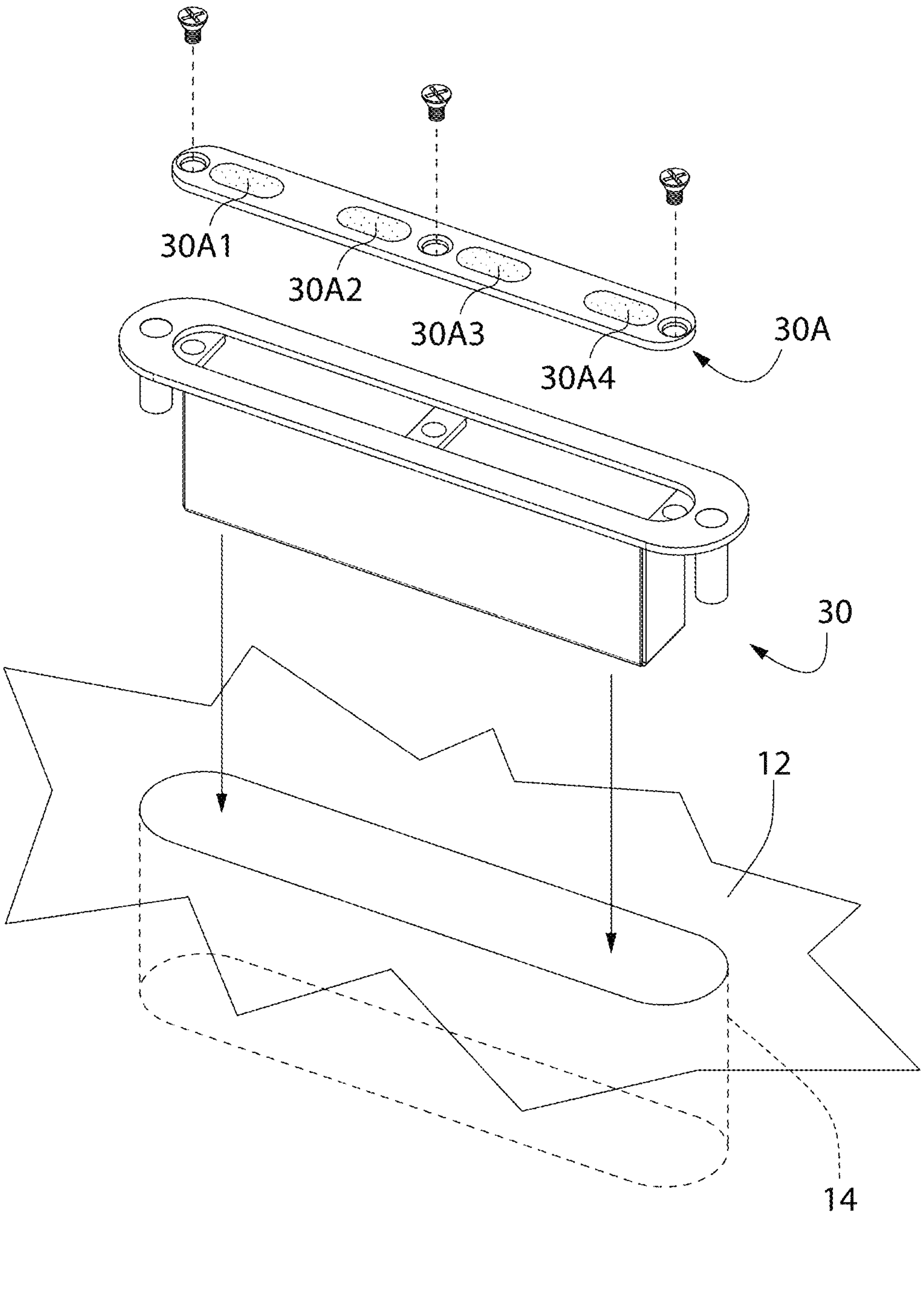
FIG. 10 is an exploded isometric view showing a first embodiment of the floor strike being positioned within the corresponding well in the floor.

It should be noted that to eliminate or minimize any obstructions or liquids (including floor wax) collecting within the floor strike 30 itself during non-use, a thin cap or cover 30A can be secured to the opening of the floor strike 30. Such a cover may be mandatory in hospital environments, in accordance with the American Hospital Association, which requires a seamless flooring where there are no gaps or seams within the floor 12. FIG. 10 provides an exploded view of the preferred cap 30A/floor strike 30 of the present invention 20. In particular, the cap 30A comprises a plurality of oval openings (30A1, 30A2, 30A3 and 30A4) that are filled with an epoxy that hardens and which can be sanded to form a smooth level surface (indicated by stippling) with the cap 30A structure. The cap 30A is then secured to the opening of the floor strike 30 with fasteners (e.g., screws) as shown in FIG. 10.

When the DSL 22 is installed in the mounting plate 28A and activated, the locking pins 22B can easily penetrate the epoxy in oval openings 30A1, 30A2, 30A3 and 30A4. Once the dangerous situation is resolved and the DSL 22 restored to the storage unit 24, the used cap 30A can be removed and replaced with a new cap 30A having the hardened epoxy within the oval openings 30A1, 30A2, 30A3 and 30A4.

Figure 10A:
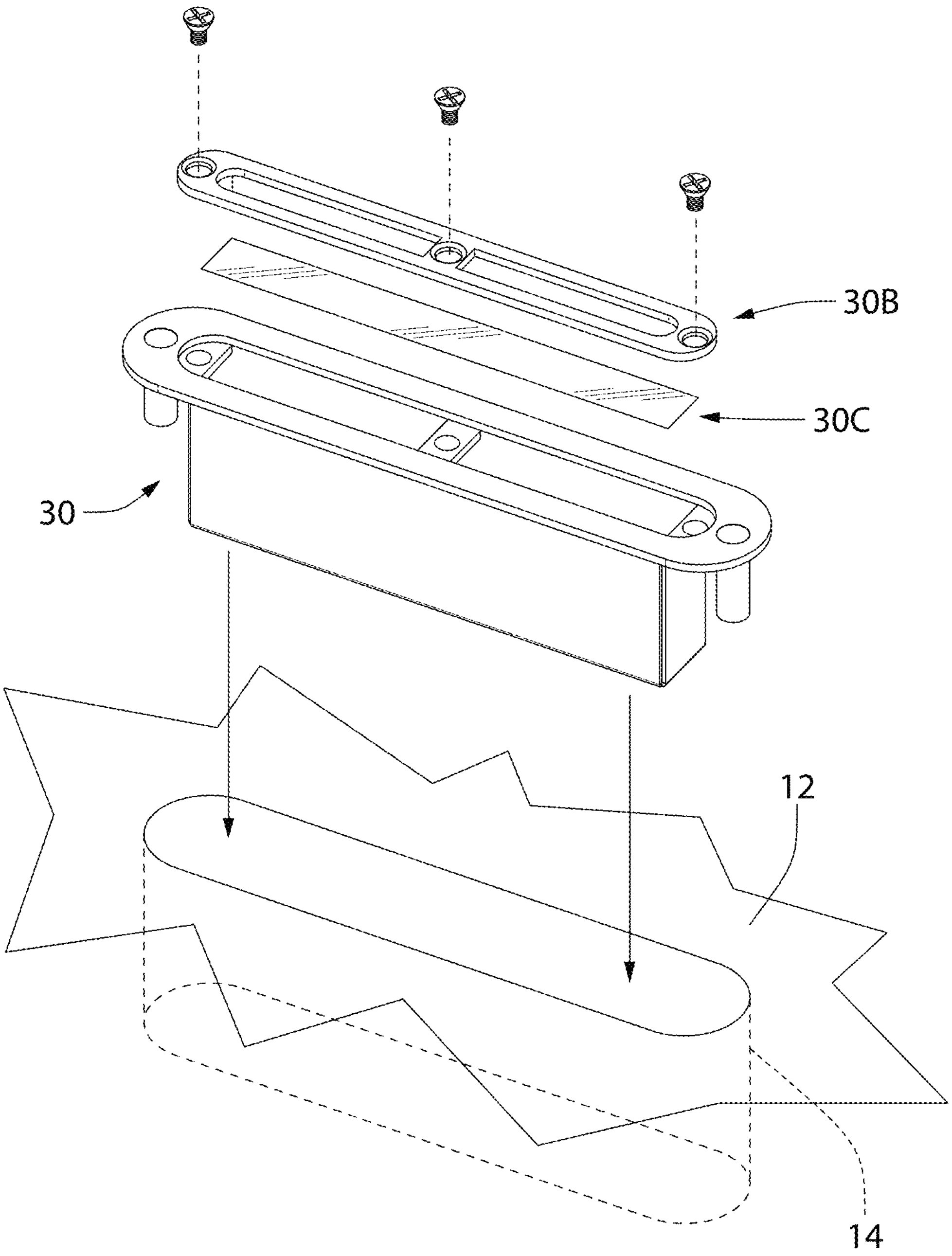
FIG. 10A is an exploded isometric view showing an alternative floor strike being positioned within the corresponding well in the floor.

An alternative cap 30B is shown in FIG. 10A. In this cap, a large opened slot in the cap 30B is formed and a thin strip 30C (e.g., a polycarbonate strip and may be transparent or translucent or opaque) can releasably secured between the cap 30B and the opening to the floor strike 30. The thin strip 30C keeps foreign materials, including liquids, out of the floor strike 30 but is easily penetrable by the locking pins 22B when the DSL 22 is activated. As mentioned above with the cap 30A, once the dangerous situation is resolved and the DSL 22 restored in the storage unit 24, the used cap 30B can be disengaged from the opening to the floor strike 30 and new thin strip 30C secured therein.

Figure 10B:
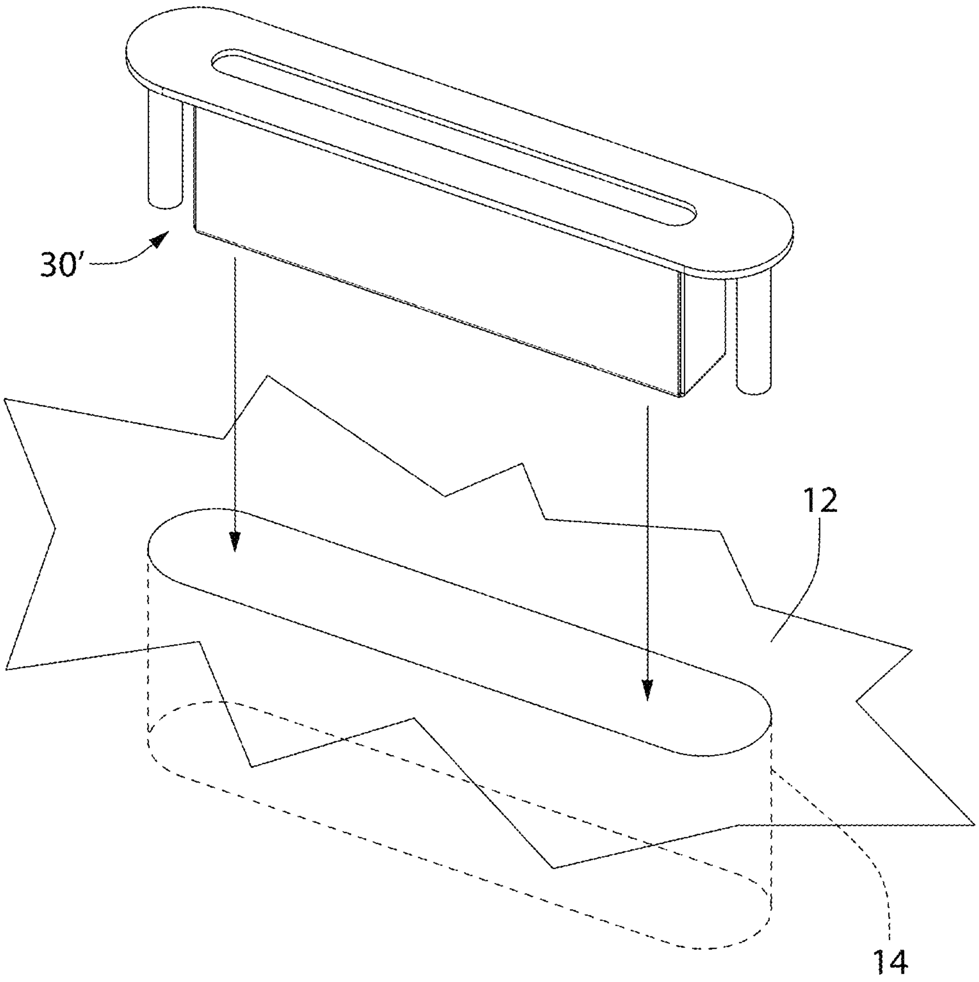
FIG. 10B is an exploded isometric view showing an even further alternative floor strike being positioned within the corresponding well in the floor.

Furthermore, in certain environments, where there is no concern for the accumulation of foreign matter in the floor strike 30, the floor strike 30' can be positioned in the aperture 14 in the floor 12 with no cap 30A or 30B as shown in FIG. 10B.

It should be further noted that when the DSL 22 is inserted into the vertically-oriented tracks 28E and 28F of the inside mounting plate 28A, and slid downward, stop cutouts 33 (FIG. 3C) come to rest on stop pins 28I in the mounting plate 28A. As a result, this positions the lock cam 28G to be adjacent a sawtooth shim 22L2 which acts as a smooth shoulder (see FIG. 5A) of the sawtooth brake 22L, as is discussed in detail next.

As for the activator 22A, it should be noted that it comprises a three-part construction, as best shown in FIG. 1, and having a diamond plate surface, by way of example only. In this example diamond plate was chosen for its slip resistant nature and visibly different appearance from the remainder of the DSL. In particular, the upper portion 22A1 acts as a foot pedal which the user steps on to drive the main block 22C downward to position the locking pins 22B in the floor strike 30; alternatively, the user can also you his/her hand against the upper portion 22A1 to drive the main block 22C downward. The middle portion 22A2 acts as a shield to protect/cover the lock pins 22B and their springs 22D. And the lower portion 22A3 provides a grip for the user to pull the DSL 22 out of the storage unit 24 (or 124), to carry it to the door 10 or to pull the DSL 22 upward out of the inside door assembly mounting plate 28A.

Figure 3C:
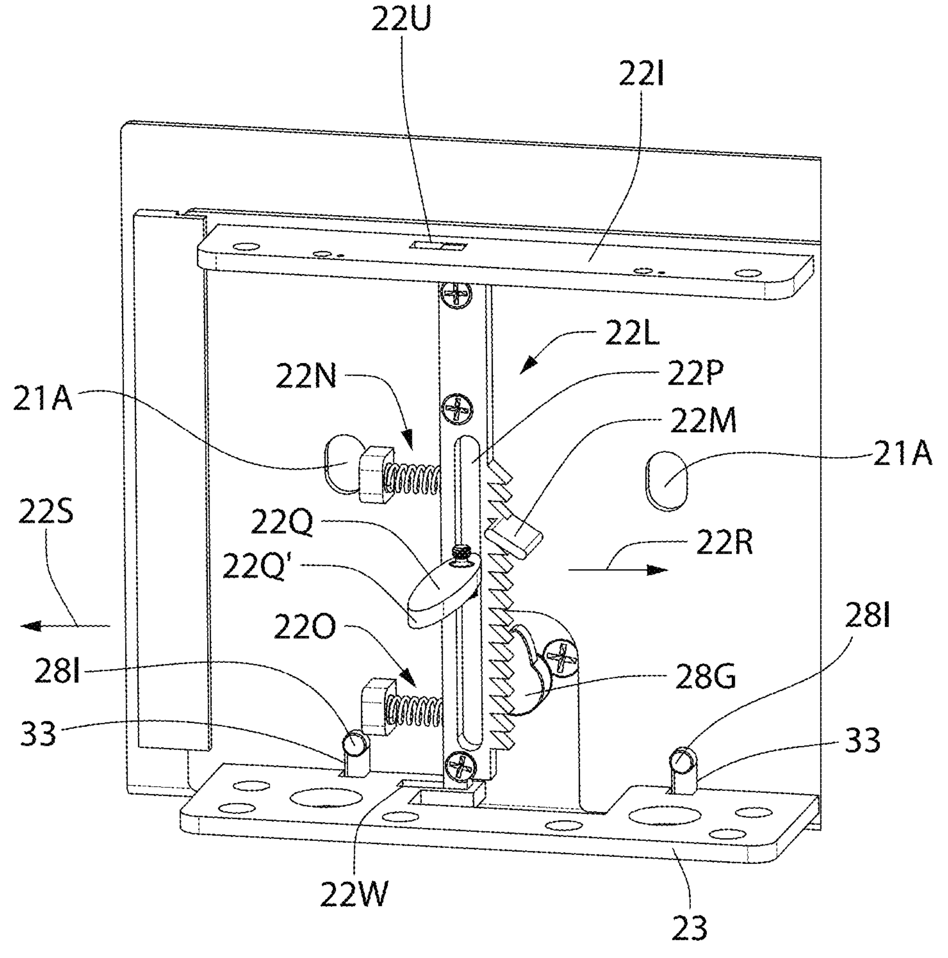
FIG. 3C is a right isometric view of the DSL omitting all components, for clarity, except for the sawtooth brake and brake springs, the lock cam, projection and the brake release.
Figure 3D:
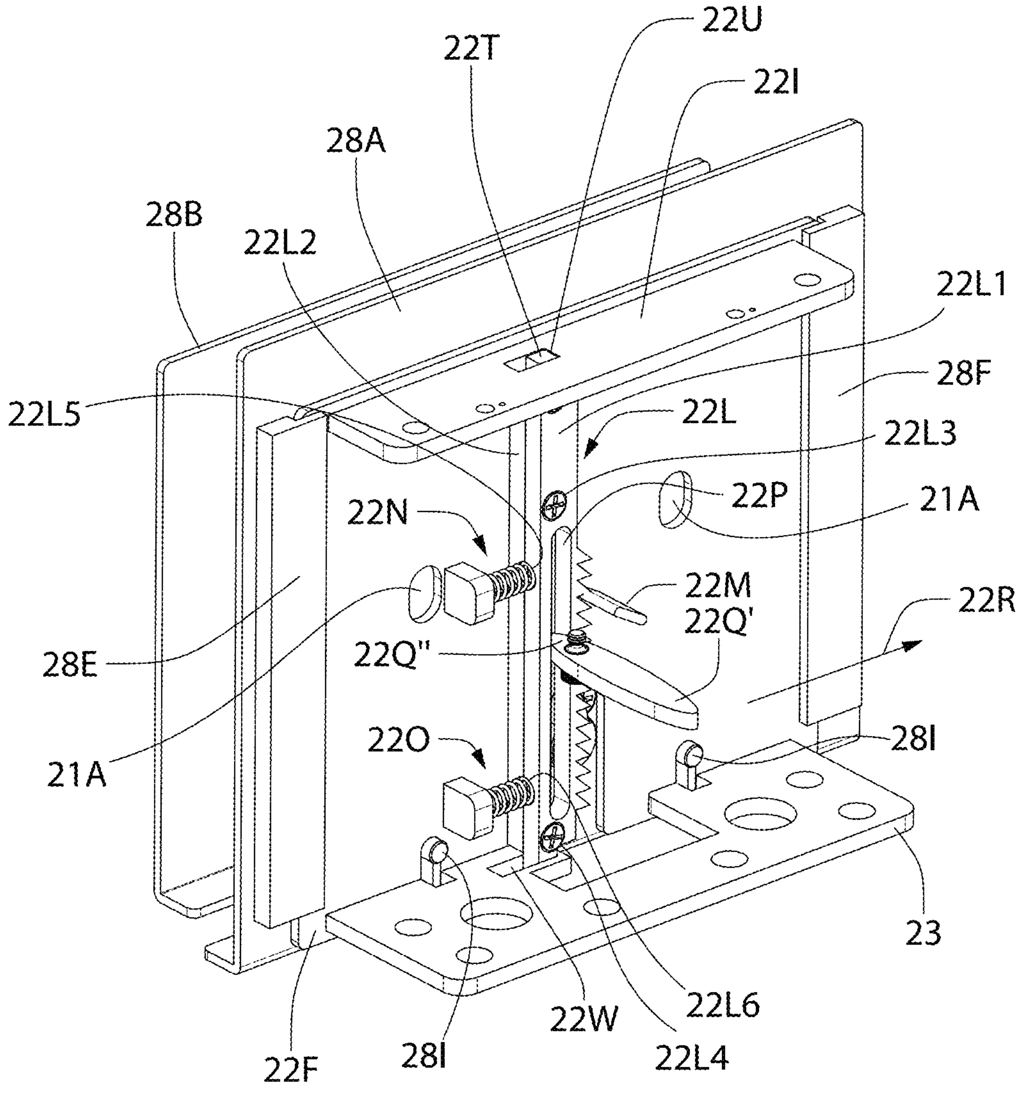
FIG. 3D is a left isometric view, similar to FIG. 3C, showing the interface between the lock cam and the sawtooth brake and many other components omitted for clarity.
Figure 3E:
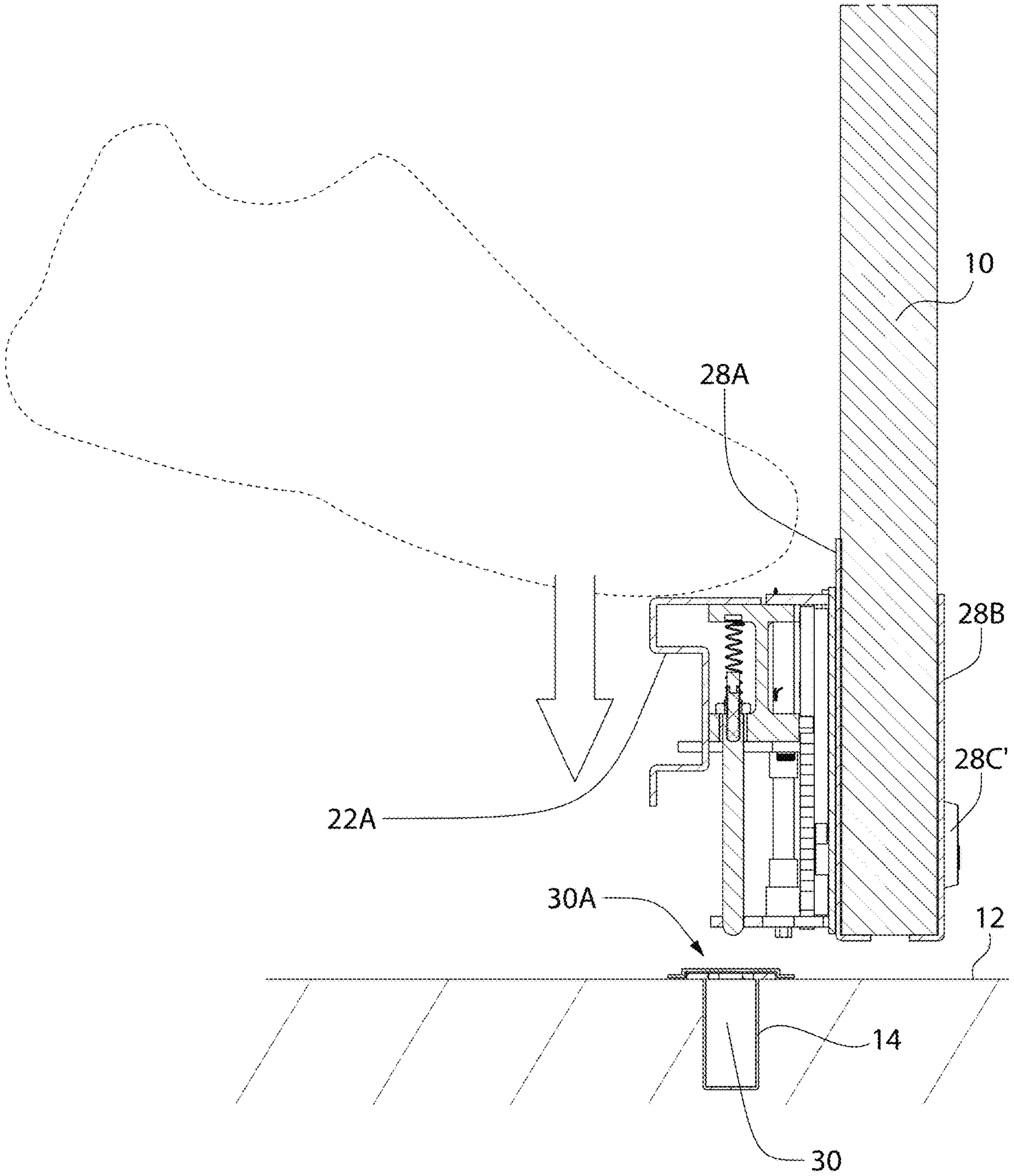
FIG. 3E is cross-sectional side view of the DSL, installed at the lower portion of the inside of the door, as the user's foot initially displaces the locking pin carrier of the DSL downward by making contact with the activator.
Figure 3F:
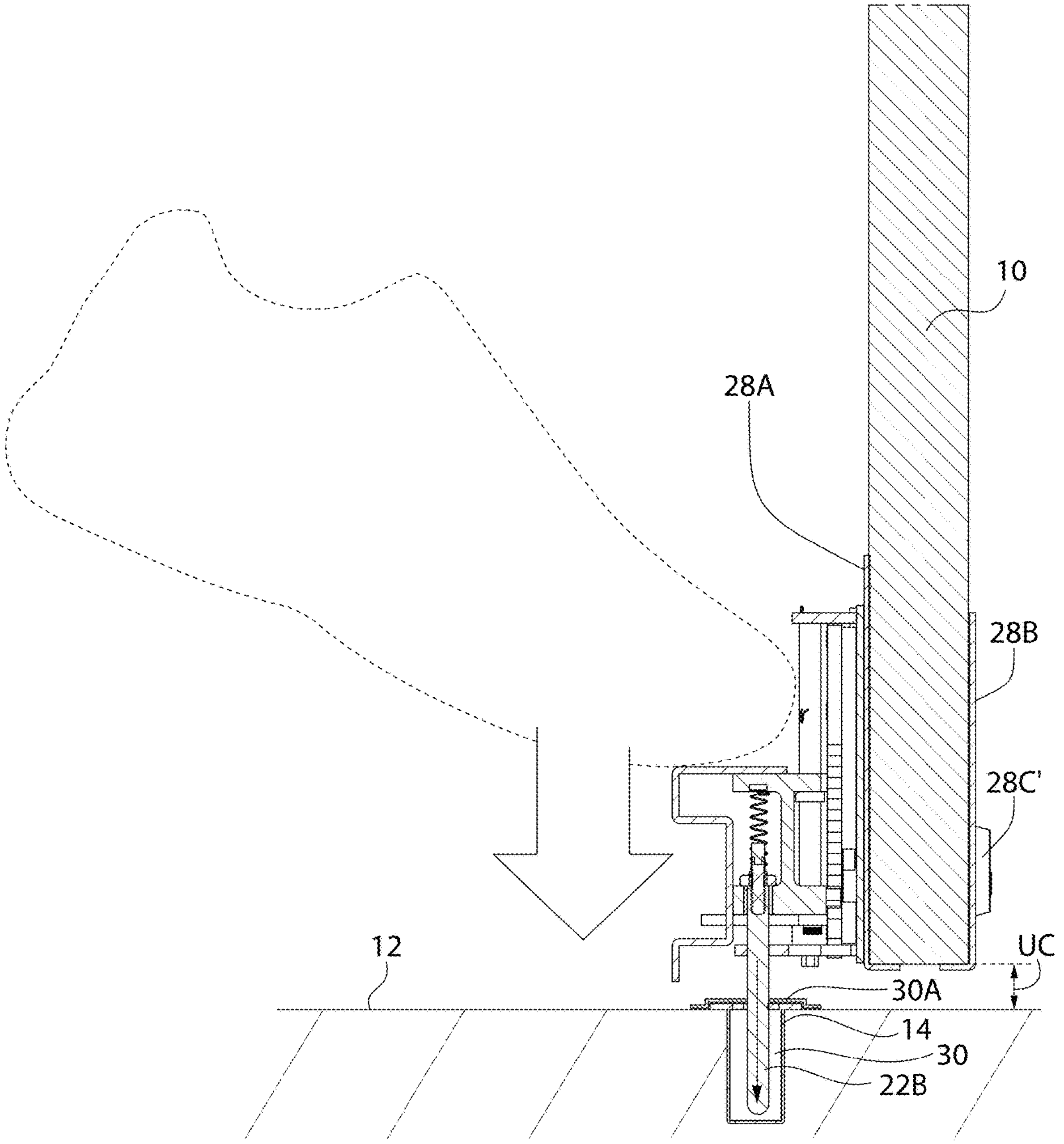
FIG. 3F shows the locking pin carrier of the DSL resting on stops and releasably locked after the lower ends of the locking pins have ruptured the floor strike cover and are then positioned within the floor strike.
Figure 13:
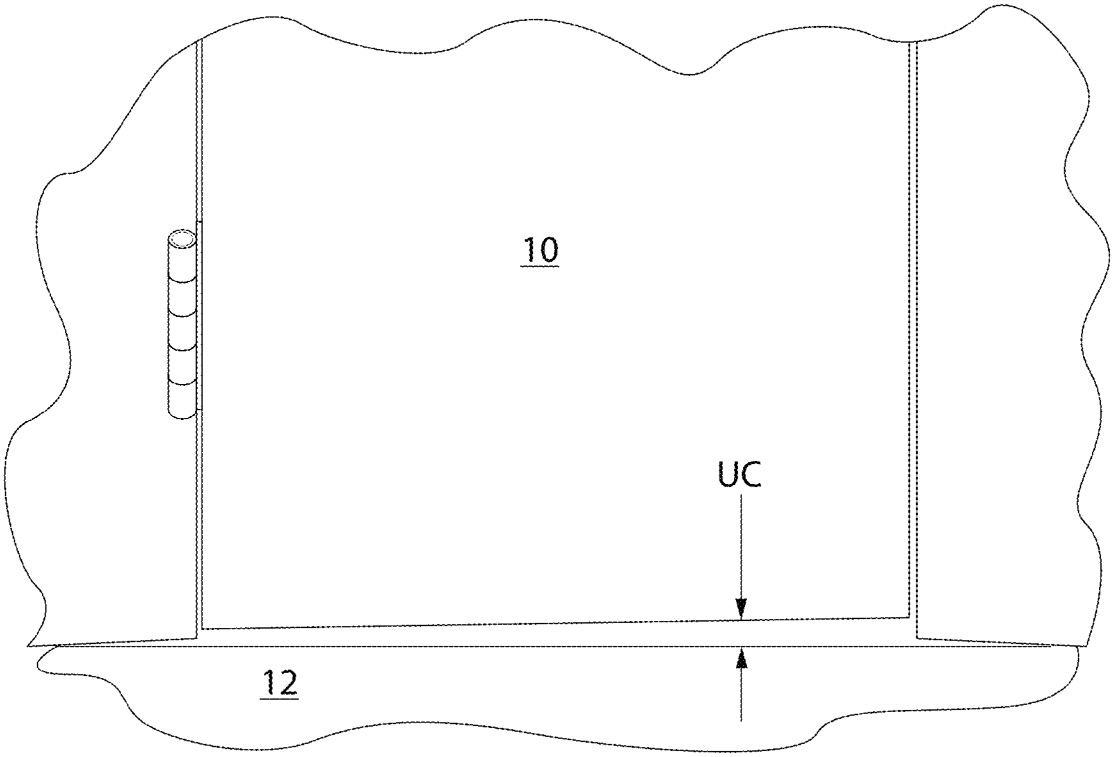
FIG. 13 is a functional diagram depicting an example of a door having a varying door undercut (UC)

To accommodate the wide range of door undercuts UC (FIG. 13 and FIG. 3F) a sawtooth brake 22L is positioned adjacent the main block (or locking pin carrier) 22C. The sawtooth brake 22L is provided with a plurality of teeth 22L1 (most clearly seen in FIG. 6A) over which rides a projection 22M (see FIGS. 7A and 8) which is fixedly secured to the backside of the bottom flange 25 of the main block 22C, as the main block 22C slides downward. When the main block (or locking pin carrier) 22C stops its downward motion, the projection 22M releasably locks into one of those plurality of teeth. The teeth of the sawtooth brake 22L are designed so that the main block 22C can be lowered into predetermined increments (e.g., 0.1875 inches); this provides for incrementally compensating for varying door undercuts and unknown debris. As a result, each of the teeth provides a "locked" position of the DSL 22. FIGS. 3C-3D show more clearly the interaction of the projection 22M and the sawtooth brake 22L, with most of the DSL 20 hardware omitted for clarity. The sawtooth brake 22L is biased by brake springs 22N and 220 such that they place the smooth shoulder 22L2 of the sawtooth brake 22L into contact with the lock cam 28G, as shown most clearly in FIGS. 5A and 7A. So as the main block 22C is driven downward (e.g., every 3/16" of downward travel moves to the next tooth on the sawtooth brake 22L), the projection 22M slides over the various teeth of the brake 22L, coming to rest under one tooth and thereby locking the main block 22C at a certain height with the pins 22B positioned within the floor strike 30. Thus, the user applies a momentary downward pressure (e.g., 5 pounds) on the activator 22A (e.g., typically by stepping down on it with his/her foot); see FIGS. 3E-3F depicting a user's foot (shown in phantom) providing an initial pressure (FIG. 3E), followed by complete downward pressure (FIG. 3F), thereby releasably locking the device 22. If no obstructions are encountered by the plurality of locking pins 22B as they travel downward, the main block (or locking pin carrier) 22C will come to rest against stops 31, while the lower ends (e.g., 1 inch in extent) of the locking pins 22B will now reside within the floor strike 30, thus preventing the door 10 from being opened. With those pins 22B positioned therein, they effectively lock the door 10 closed and can withstand a significant force (e.g., 19,000 pounds) applied against the door 10 from the outside, by way of example, a perpetrator striking the door with an object. As a result, the DSL 22 provides a significant mechanical advantage, namely, an initial input of 5 pounds of downward pressure results in a door lock that can withstand a significant force (e.g., 19,000 pounds) applied thereagainst. This locking pin carrier (main block) 22C and locking pins 22B biased downward against the bottom flange 25 of the locking pin carrier 22C by springs 22D ensure if the DSL 22 is installed on a door having a significant door undercut UC (e.g., 1.5 inches), the locking pins 22D will not only span the door undercut UC but that a significant portion (e.g., 1 inch) of the lower end of each locking pin 22D is positioned within the floor strike 30.

Figure 14A:
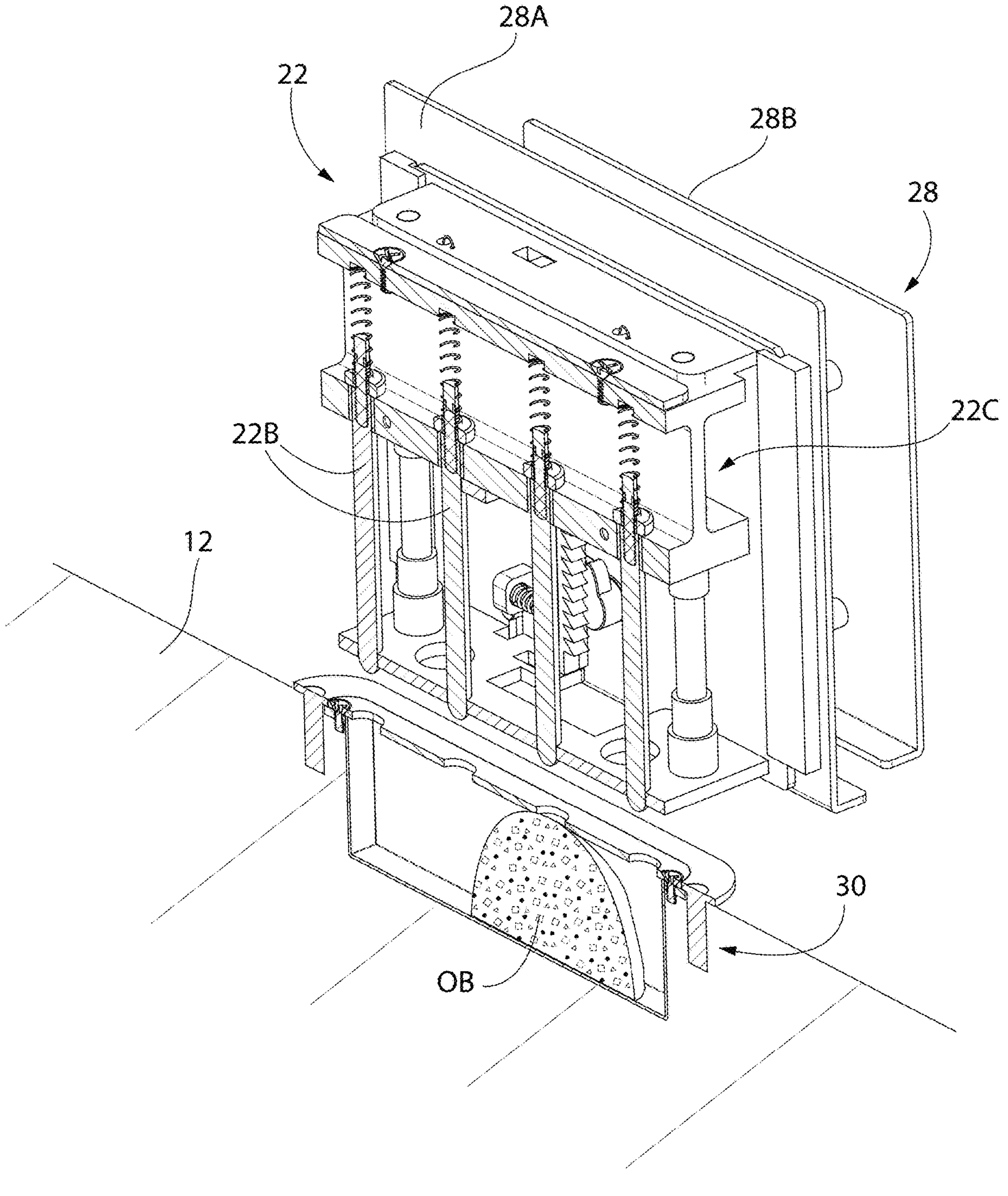
FIG. 14A is a partial cross-sectional view of the locking pin carrier, locking pins and floor strike depicting an example of an obstruction (OB) in the floor strike, with the door omitted for clarity.
Figure 14B:
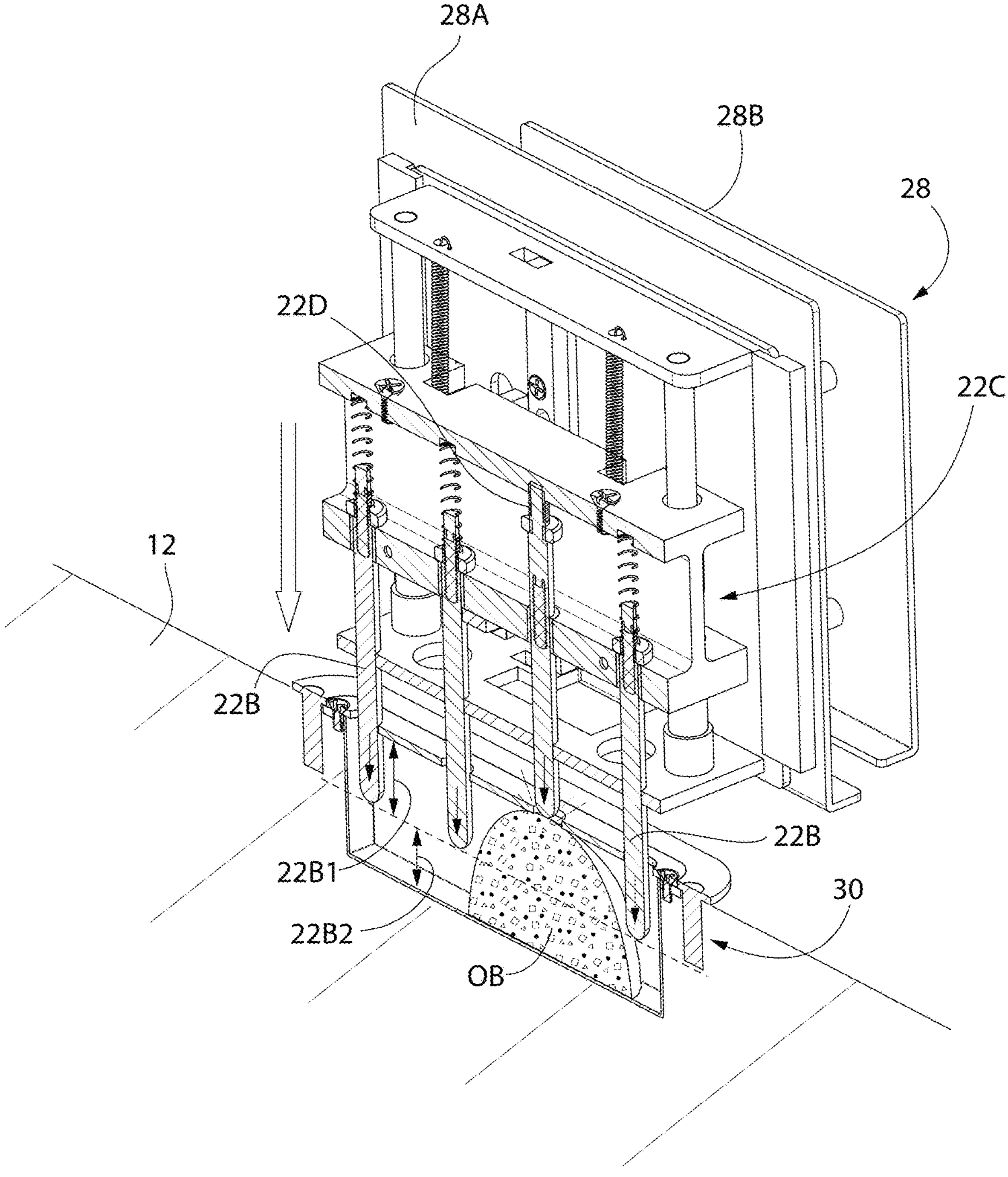
FIG. 14B is similar to the view of FIG. 14A but shows how the locking pin encountering the obstruction operates while simultaneously depicting how the other non-obstructed locking pins are able to still able to position their lower ends into the floor strike to prevent the door from opening.

The DSL 22 is also designed to operate should any locking pin 22D encounter an obstruction. FIGS. 14A-14B depict how the DSL 22 operates should one of the locking pins 22D encounter an obstruction. The following scenario of an obstruction (FIG. 14A) being present in the floor strike 30 is by way of example only. In particular, when the user steps downward on the actuator 22A, if one of the locking pins 22D contacts an obstruction (FIG. 14B), the upper end of that particular pin 22D will compress its corresponding locking pin spring 22D against the upper flange 22E of the locking pin carrier 22C stopping the downward motion of the carrier 22C and causing the projection 22M to engage one of the teeth of the sawtooth brake 22L, thereby stopping the downward motion of the locking pin carrier 22C and "locking" the DSL 22. However, the remaining unobstructed locking pins 22D remain biased downward and as long as a minimum length (e.g., 0.25 inches) of their lower ends are positioned within the floor strike 30, the door 10 is prevented from being opened. The double-headed arrow 22B1 shows the portion of the lower end of the unobstructed locking pins 22B that provide sufficient depth into the floor strike 30 to maintain the door 10 in locked condition versus the unobstructed depth 22B2 of the lower end of the locking pins 22B.

It should be further noted that as long as long as one locking pin 22B is present within the floor strike, the door 10 will remain locked and cannot be opened. Moreover, as long as the minimum length of just one locking pin 22D is able to be positioned within the floor strike 30, the door 10 is prevented from opening.

Another key distinction of the DSL 22 is that the incremental design of the sawtooth brake 22L and its interaction with the locking pin carrier 22C is that with minimal downward movement of the locking pin carrier 22C by the user, this will still position the plurality of the locking pins 22D, or just even one locking pin 22B, into the floor strike 30, thereby locking the door 10 closed. In contrast, if other conventional locks are only partially-engaged, they do not operate properly and the door is not locked closed.

Figure 15A:
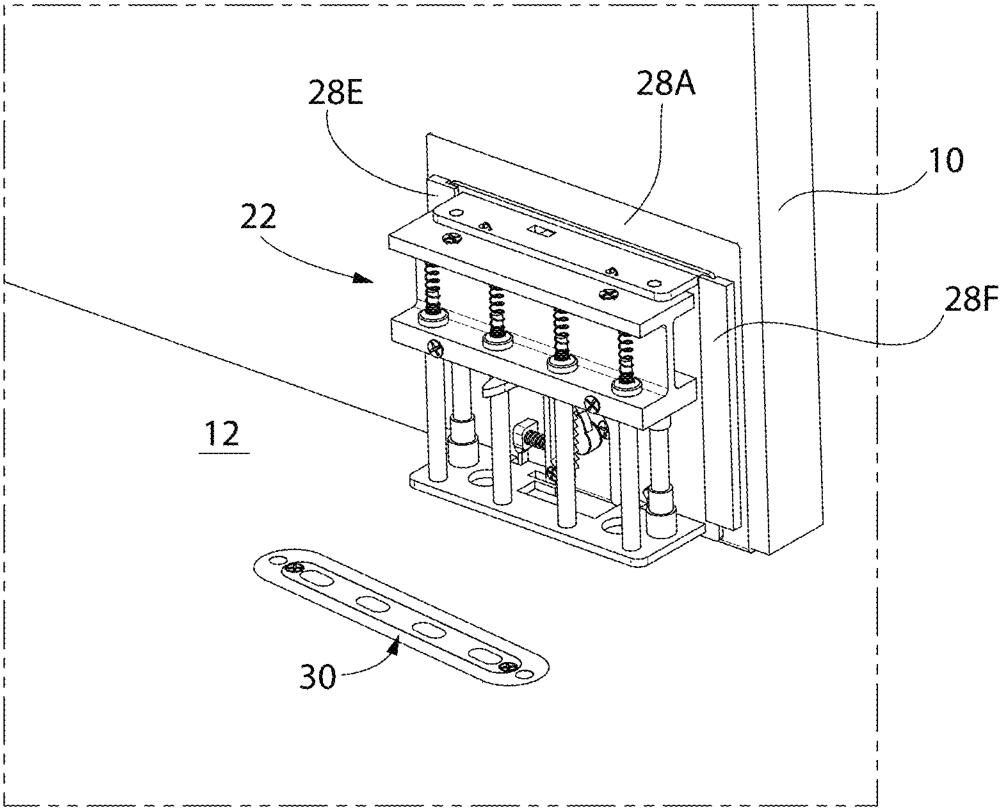
FIG. 15A depicts the DSL inserted into the mounting plate but with the door in an open position (note: the DSL is not aligned with the floor strike)

The DSL 22 is also designed to accommodate the situation where the users install the DSL 22 on the door 10 when the door 10 is still open and not in a completely closed condition and then step on the activator 22A. This can happen when users may be panicked and forget to have the door 10 closed first, such that the floor strike 30 is not positioned under the installed DSL 22. FIGS. 15A-15D depict that scenario. FIG. 15A shows the DSL 22 in an unlocked condition installed in the mounting plate 28A, with the door 10 slightly ajar such that the locking pins 22D are not aligned with the floor strike 30. If the user then steps down on the activator 22A (see arrow 202 in FIG. 15B), the plurality of locking pins 22B encounter the floor 12, resulting in all of them compressing their springs 22D up against the upper flange 22E of the locking pin carrier 22C. This will lock the locking pin carrier 22C against the releasable brake 22L from any further downward motion. However, each of the spring 22D biases (e.g., approximately two pounds) act to generate a momentary upward force (e.g., approximately eight pounds) on the upper flange 22E that momentarily overcomes the weight of the DSL 22 (e.g., approximately five pounds) such that the backplate 22F of the DSL 22 moves slightly upward (see arrow 204 in FIG. 15C). The door 10 can then be quickly moved into a closed position as shown in FIG. 15D. And once the door 10 is completely closed and the locking pins 22D aligned over the floor strike 30, the DSL 22 will immediately slide downward (see arrow 206 in FIG. 15D) in the mounting plate 28A and the locking pins 22B will immediately be biased downward into the floor strike 30, thereby preventing the door 10 from being opened.

If a perpetrator somehow was cognizant of the presence of the plurality of locking pins 22B in the floor strike 30 (e.g., the door undercut UC was large enough that a portion of the pins would be visible) and got down on the floor 12 to tamper with them in an attempt to somehow lift or remove them, such a scenario would benefit first responders for several reasons. Firstly, by the perpetrator lying down on the floor 12, this will make him a perfect target for first responders to more easily apprehend or neutralize him. Secondly, trying to lift or remove one locking pin 22B is difficult enough, let alone a plurality (e.g., four) of them, since as mentioned previously, the presence of just one locking pin 22B within the floor strike 30 prevents the door 10 from being opened. Thirdly, if the perpetrator has some other tools with him to attempt to lift or remove the pins 22B, he will have had to put down his weapon (a gun or rifle, etc.) to use the tools, or at least place his focus on the locking pins 22B and not his weapon. Fourthly, the mere fact that he would take the time to attempt such a feat, would provide more time for first responders to arrive and apprehend or neutralize him.

Unlocking the DSL 22

Figure 5:
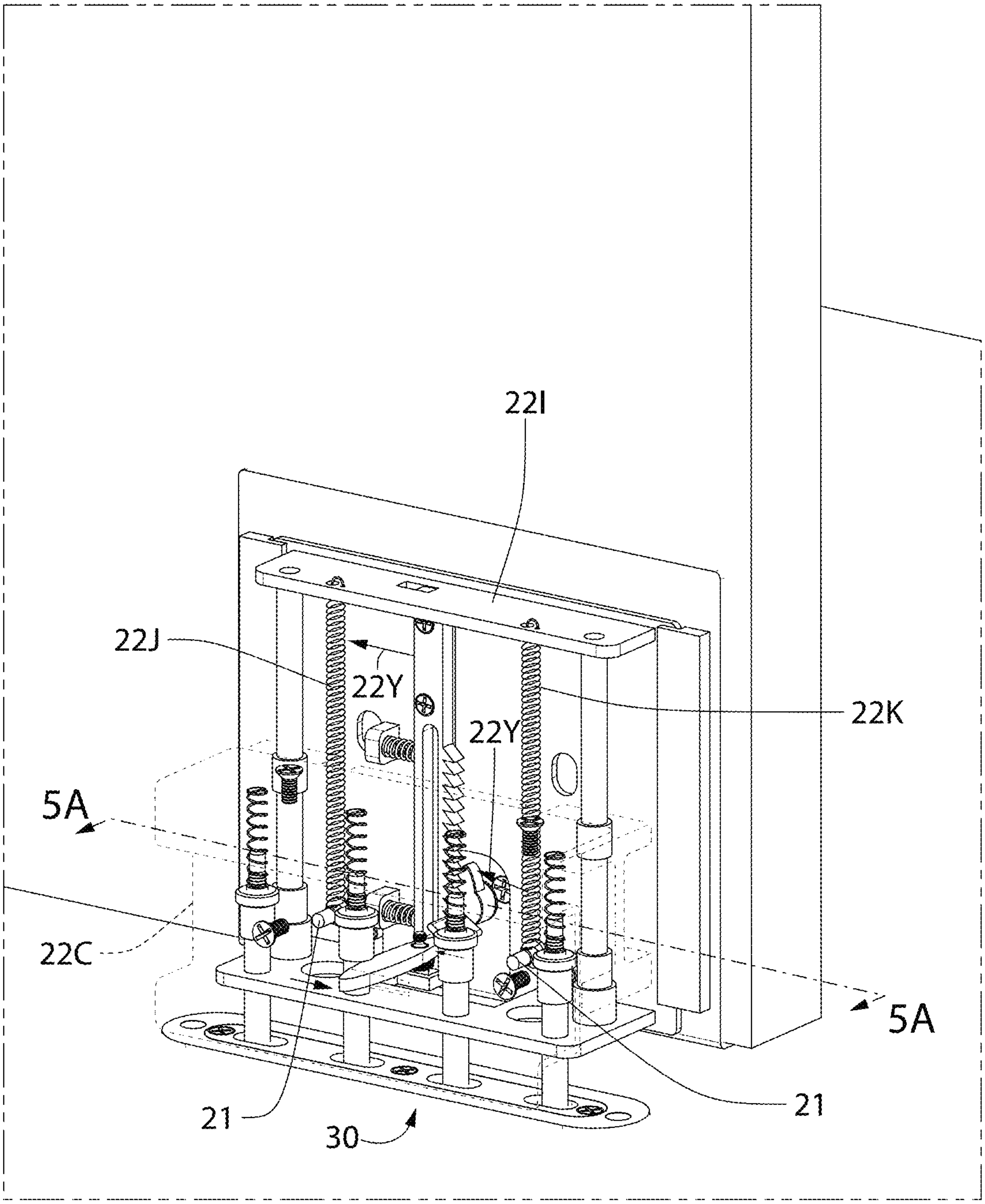
FIG. 5 shows the DSL stored into the mounting plate at the lower portion of the inside of the door with the activator omitted and the locking pin carrier (also referred to as the "main block") shown in phantom for clarity, with the DSL shown in a "locked" position, with the locking pins positioned within the floor strike.
Figure 5A:
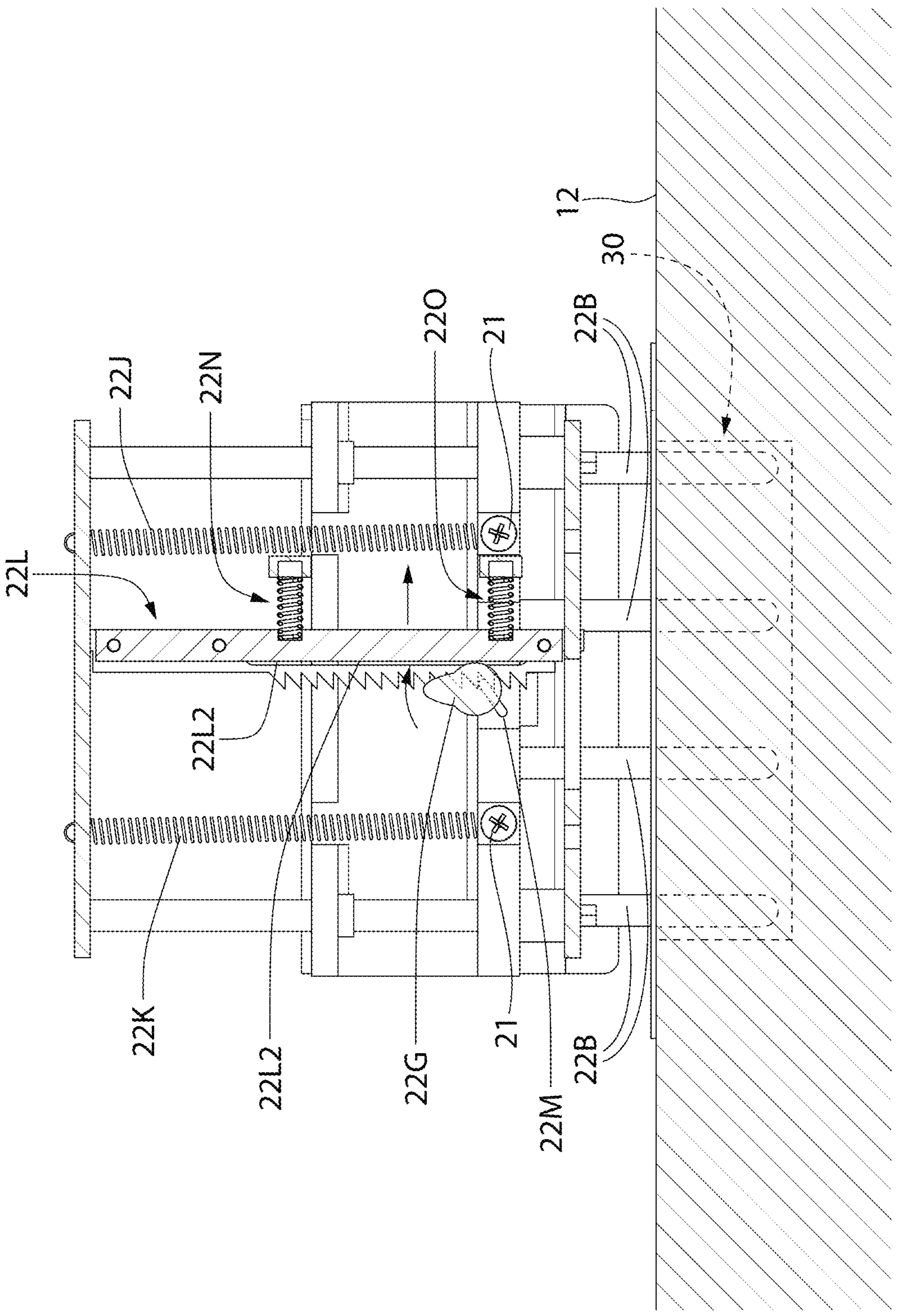
FIG. 5A depicts the rear side of the DSL, showing the locking pin carrier springs, the sawtooth brake, the cam and the brake springs with the DSL in a locked position/state.

In order to release the DSL 22 into an unlocked condition, it is necessary to move the sawtooth brake 22L towards the right (with reference to FIG. 6A) against the bias of the brake springs 22N and 22O. That small displacement of the sawtooth brake 22L to the right releases the engagement of the projection 22M from the tooth it was previously locked under and the main block (locking pin carrier) 22C immediately slides upward (due to the main block slide rod springs 22J/22K), drawing the pins 22B immediately upward ("unlocked condition") and out of the floor strike 30; the door 10 is now free to swing open. There are two ways to accomplish this immediate upward movement of the pins 22 out of the floor strike 30. One is by inserting a key (not shown) into the key insertion aperture 28C" (FIG. 2A) and then rotating the key (not shown) such that the lock cam 28G displaces the sawtooth brake 22L to the right (with reference to FIG. 6A). FIG. 5 depicts an arrow 22Y which shows the direction the cam 28G turns (to the left) to displace the sawtooth brake 22L away from the projection 22M in that same direction 22Y.

It should be noted that the key cylinder 28C is designed so that the key can be turned in either direction, i.e., clockwise or counterclockwise, to disengage the sawtooth brake 22L quickly, and thereby save time in quickly unlocking of the DSL 22 by authorities.

The second way is by the user inside the room using a brake release 22Q (FIGS. 3C) and moving the proximal end 22Q' (FIGS. 3C-3D) to the right (against the bias of the springs 22N/22O) in accordance with the arrow 22R (FIG.

Figure 6:
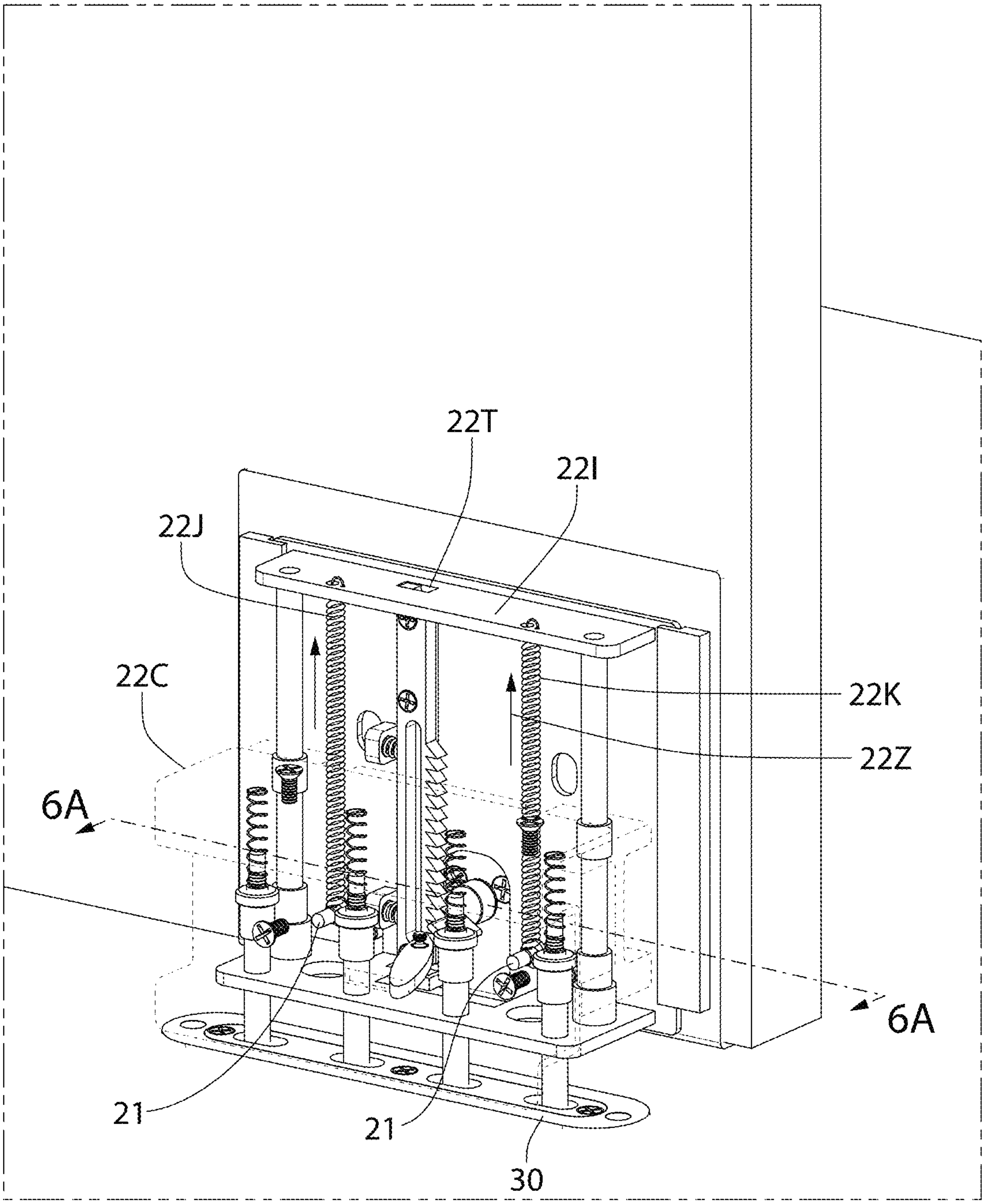
FIG. 6 shows the DSL stored into the mounting plate at the lower portion of the inside of the door with the activator omitted and the locking pin carrier shown in phantom for clarity and with the locking pins positioned in the floor strike, the DSL is in a locked state.
Figure 6A:
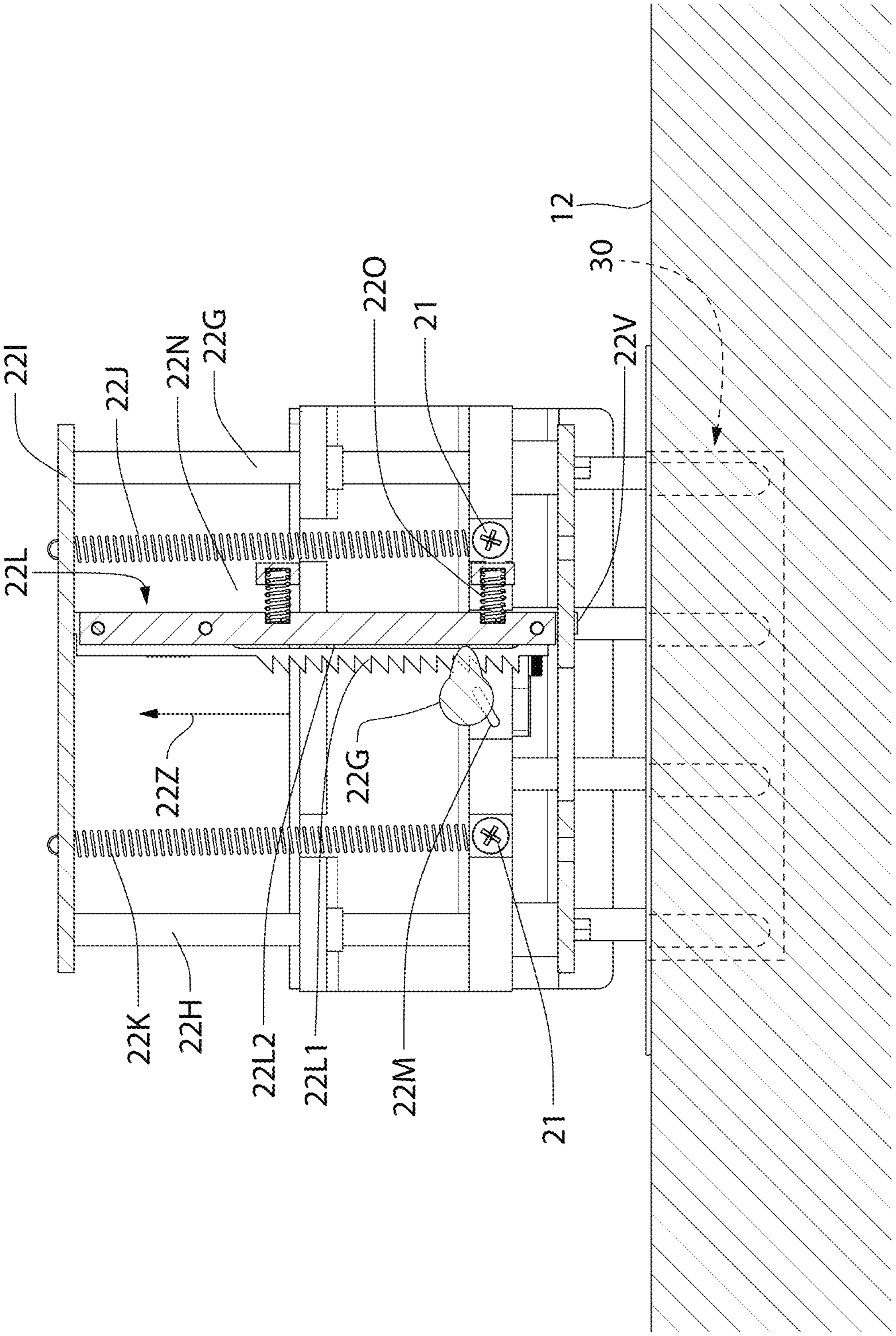
FIG. 6A is a cross-sectional back view of the installed DSL taken along line 6A-6A of FIG. 6.
Figure 7A:
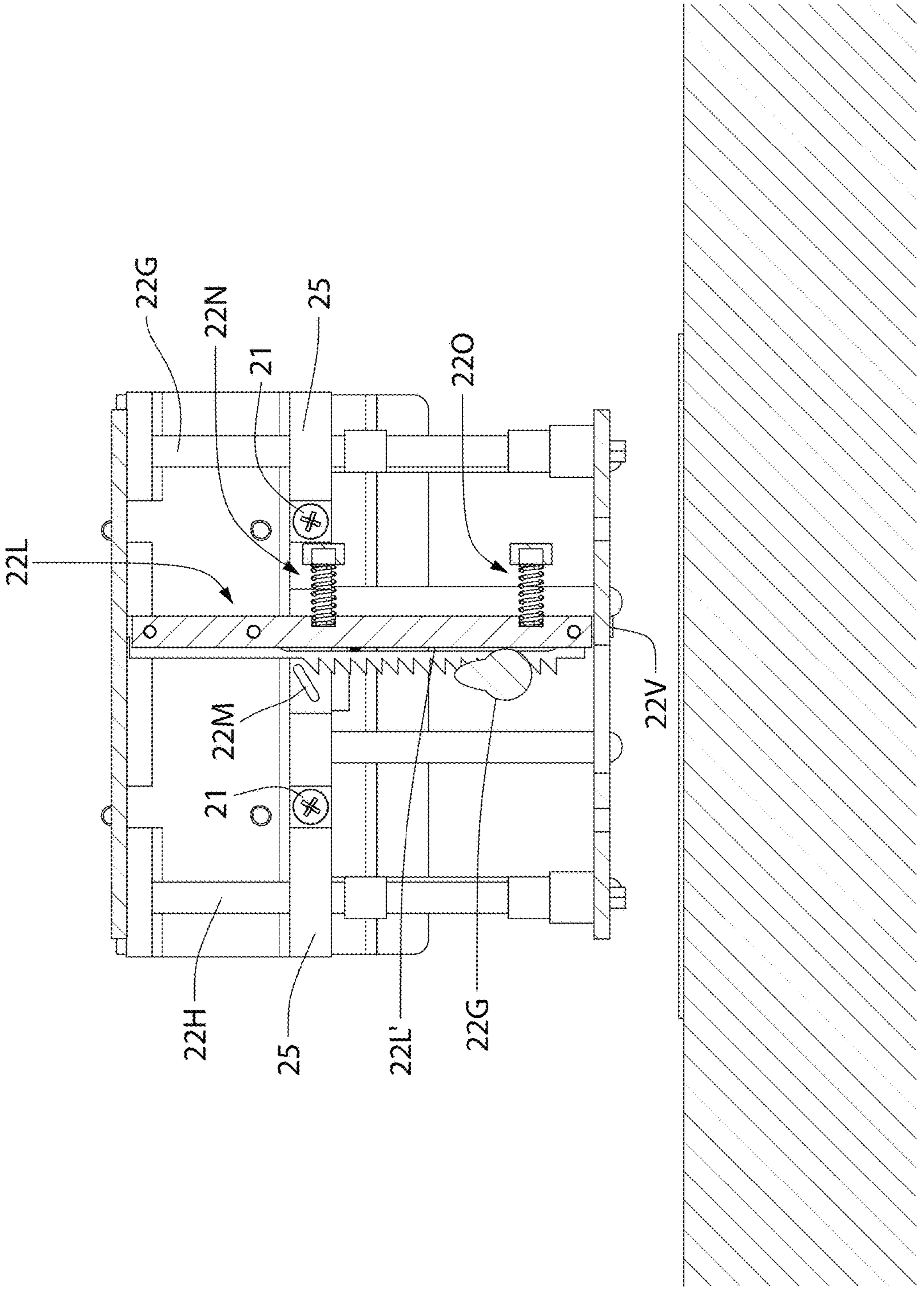
FIG. 7A is a cross-sectional view of the installed DSL taken along line 7A-7A of FIG. 7 again showing the DSL in the unlocked position.

3C) which causes a distal end 22Q" (FIG. 3D) to contact and then momentarily displace the sawtooth brake 22L to the left in the direction of the arrow 22S, thereby releasing the projection 22M and allowing the main block (locking pin carrier) 22C to immediately slide upward; see arrow 22Z (FIGS. 6 and 6A). It should be noted that the distal end 22Q" rides in a slot 22P (FIG. 3C) in the sawtooth brake 22L, to permit the main block 22C to displace upward/downward without damaging the brake release 22Q. Using the brake release 22Q it only takes 2 seconds to unlock the DSL 22.

It should be noted that because the main block (locking pin carrier) 22C can be depressed down in 3⁄16" increments as discussed above (i.e., the sawtooth brake teeth) of downward travel, any downward movement will result in some portion of the lock pins 22B being positioned in the floor strike 30 (even if the main block 22C is not completely depressed downward) and thereby locking the door 10 in the locked condition. And because the slot 22P is elongated, the brake release 22Q is operable at any level of where the main block (locking pin carrier) 22C is locked.

Figure 9:
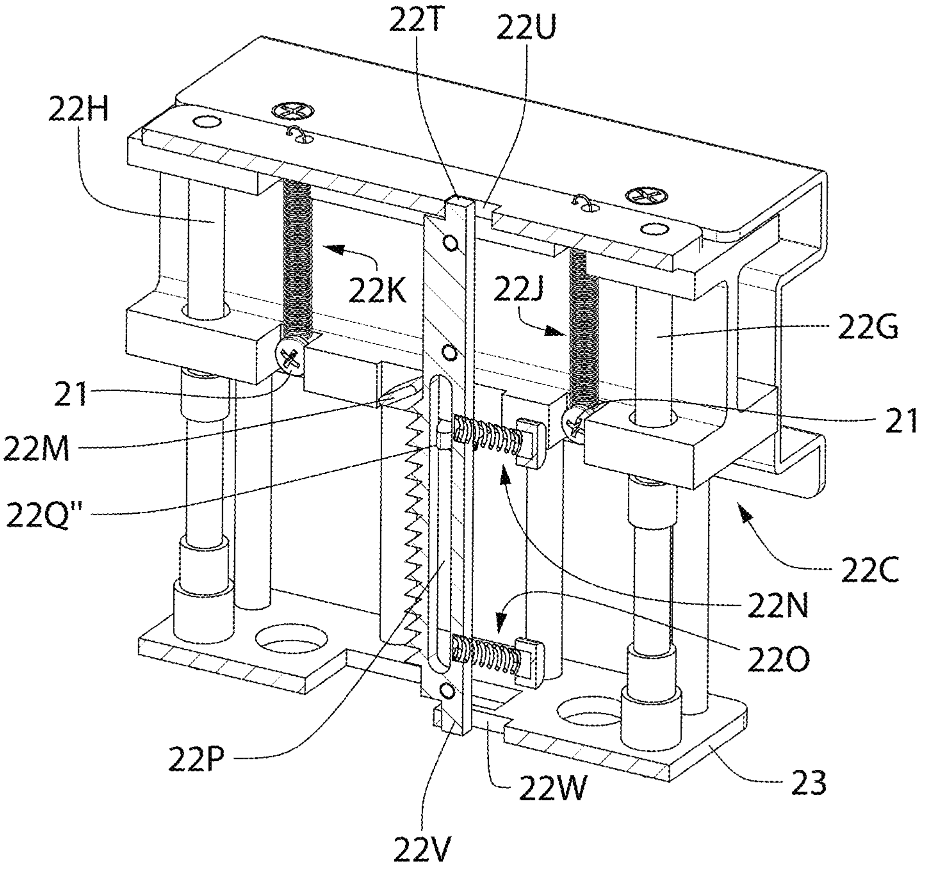
FIG. 9 is an isometric back view of the DSL, depicting the sawtooth brake, release mechanism and locking pin carrier springs while omitting the other hardware of the DSL for clarity purposes and with the top and bottom sawtooth springs shown in cross-section.

It should be further noted, that the sawtooth brake 22L is a two-part construction, namely, a front portion 22L1 and a rear shim portion 22L2 (FIG. 3D). The front portion 22L1 comprises the teeth for interacting with the brake finger 22M. The rear shim portion 22L2 provides the surface against which the cam 28G rides for displacing the front portion 22L1 out of contact with the brake finger 22M to release the DSL 22 from its locked condition. The two portions 22L1/22L2 are secured together with upper and lower screws 22L3/22L4. Together these two portions also form a respective cavity 22L5/22L6 to receive a corresponding end of the brake springs 22N/22O. The upper end 22T of the front portion 22L1 is movably confined within a slot 22U in the top flange of the DSL 22 and a lower end 22V positioned within a slot 22 W within the bottom flange 23, all of which are most clearly shown in FIGS. 3D and 9.

There is also a third way to allow the door 10 to be free to open. With the DSL 22 in the locked condition (with the pins 22B positioned down within the floor strike 30), the user can simply slide the DSL 22 upward and out of the inside mounting plate 28A. The door 10 can now swing open. As the result, the user will then be holding the DSL 22 with the main block 22C still in a downward ("locked") position and the pins 22B protruding.

It should also be noted that the user inside the room can still manually maintain the door 10 in a locked condition, even if the key is used to release projection 22M, or if the brake release 22Q is displaced (thus, keeping the projection 22M from contacting the teeth in the sawtooth brake 22L). The user accomplishes this by holding down the activator 22A, thereby forcing the locking pins 22B into the floor strike 30, even though the projection 22M is not engaged with the sawtooth brake 22L. As long as the user maintains this downward pressure (e.g., 5 pounds) on the activator 22A, the door 10 will remain locked. Thus, as mentioned earlier, the DSL 22 provides a significant mechanical advantage: the user maintaining a continuous downward pressure of 5 pounds can keep the door 10 locked and thereby withstand a significant force (e.g., 19,000 pounds) applied thereagainst.

Alternatively and as mentioned previously, if the user wishes to open the door to let a trusted person in, the user can simply lift the entire DSL 22 unit upward (e.g., using the grip portion 22A3 of the activator 22) out of the inside mounting plate 28A without having to release the sawtooth brake 22L. The springs 22D of the different pins 22B remain compressed so that once the person enters, the door can be reclosed and the DSL 22 re-installed into the inside mounting plate 28A, with the pins 22B being re-positioned in the floor strike 30. Some other advantages of simply lifting the DSL 22 upward, out of the inside mounting plate 28A are the following: If the perpetrator is able to gain access to the room through a different pathway (e.g., a window, another unlocked door, etc.) and the user(s) needs to exit the room quickly, and during the frenzy, he/she forgets to release the projection 22M, he/she can just lift the DSL 22 upward, out of the inside mounting plate 28A and open the door to escape. Not only that, but by simply lifting the DSL 22 out of the inside mounting plate 28A, the user is then holding the DSL 22 with the plurality of pins sticking out. He/she can use the DSL 22 as a weapon against the perpetrator, hitting him with the DSL 22 or stabbing him with the pins 22B. Thus, this demonstrates, once again, that the user has the ultimate control of the DSL 22.

Furthermore, it should further be noted that installation of the DSL 22 at the door is a downward movement while removal of the DSL 22 at the door is an upward movement. Thus, downward movement "locks" one in the room while upward movement allows one in the room to exit.

Key aspects of the DSL 22 is that it minimizes the number of moving parts. The DSL 22 weighs no more than five pounds. Furthermore, all of the components comprise hardened materials, e.g., aluminum (e.g., main block/locking pin carrier 22C) or stainless steel (e.g., slide rods 22G/22H, lock pins 22B, etc.) or naval bronze (e.g., lock cam 28G, locking pin nuts 39, etc.).

It should be appreciated that the system and method 20 of the present invention allows a singular event to contact two agencies, i.e., police department and the fire department. Currently, alert systems only alert one of these agencies. Moreover, as mentioned previously, a recommended tactical response plan allows only police department ESU (emergency service unit) personnel as being authorized to open any closed door.

Where an emergency occurs that results in more than one DSL 22 being installed at different doors in a facility, each of their respective storage units 24 will signal authorities at a different time. Such information can be used by authorities to provide a "linear track" showing how the perpetrator is moving from one location to another in the facility. As such, the system and method of the present invention 20 provides authorities with "real reconnaissance for responding with proportionate assets."

Figure 11:
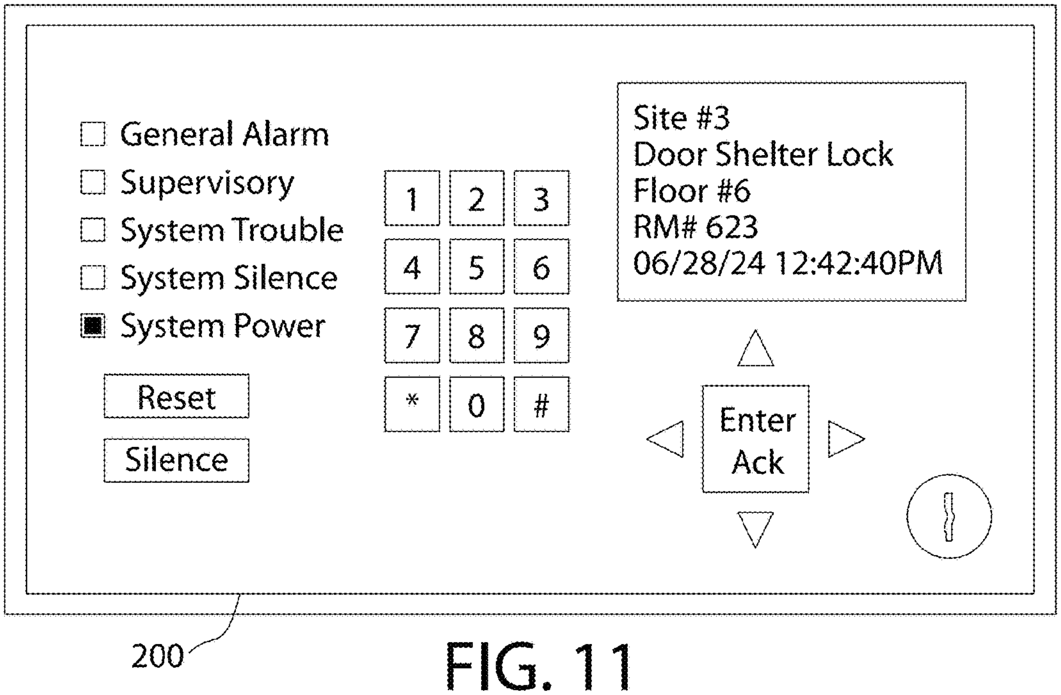
FIG. 11 depicts an exemplary fire alarm panel as part of a building management system (BMS) that includes a "DSL" alert indicating the precise location of the deployment of the DSL.

In the same instance, the DSL 22 is removed from the wall-mounted storage unit 24/124, a fire alarm panel 200 (FIG. 11) and prior designated responders are notified of the potential shelter event and the "installation" of the DSL 22.

The DSL 22 is capable of being unlocked/opened/removed with one hand even if it has received significant force from the corridor side of the door.

Now having location-specific knowledge, authorized and trained staff can utilize their standard building-wide key to enter the room.

As such, using the DSL 22 of the system and method 20 of the present invention, occupants are able to quickly and safely secure the room/space without placing themselves at the door for any length of time. In other words, once the occupant(s) installs the DSL 22 at the door, they may move quickly away from the door 10.

Thus, in view of the foregoing, the DSL 22 is not a standard lock, but rather a component of the system and method 20 of the present invention the latter of which can also be considered an overall event management system.

Installation Overview, By Way of Example Only

The DSL of the present invention 20 can be installed on any door with a bottom rail of 3" or taller.

Installation Methodology, by way of example only.

1. Slide jig into place and secure with 2 #10 screws
2. Using the drill bushings, make holes on both sides of the door for mounting and cylinder operation
3. Remove jig and install router guide
4. Level floor adjustment pads
5. Choose bit appropriate to flooring material
6. Plunge rout for slot
7. Remove jig, clean all holes and floor
8. Mount the present invention base plate and exterior cylinder release
9. Locate adjacent card reader (if present)
10. Interface tamper switch
11. Mount tamper resistant/evident case (i.e., the storage unit 24) which may be mounted on an adjacent wall, on the door itself, etc.
12. Test the fully engaged configuration
13. Store/stow the present invention in its housing.

Transmitter/Reader 26 in the Door Assembly 28

A further alternative to the present invention 20 involves including a transmitter/reader 26 as part of the door assembly 28. Having a transmitter/reader 26 as part of the door assembly 28 can be used for high security locations to validate that the DSL 22 has been mounted on the door 10. The transmitter/reader 26 may be hard-wired or wireless with a door-mounted battery. In particular, FIGS. 4-4A depict the inclusion of a transmitter/reader 26 installed in the inside mounting plate 28A of the door assembly 28. FIG. 4 shows the DSL 22 being installed into the inside mounting plate 28A.

A provision 19 can be made on the inside of the door 10 to accommodate the presence of a second transmitter/reader (similar to the transmitter 26/126 discussed previously) therein. If this second transmitter is to be used, a cutout 19 (FIG. 4A) in the door 10 must be made prior to installation of the door assembly 28. As can also be see in the FIG. 4A is the cutout 18 for the key cylinder 28C and the cutouts 16 for securing the studs 28D/fasteners (not shown) therein. Like the transmitter/reader 26/126 in the storage unit 24/124, this second transmitter/reader in the inside mounting plate 28A can also detect a variety of data (e.g., the presence or absence of the DSL 22 in the inside mounting plate, any labels (e.g., RFID) on the DSL 22, etc., and then wirelessly transmit that data to the BMS or authorities.

Figure 4B:
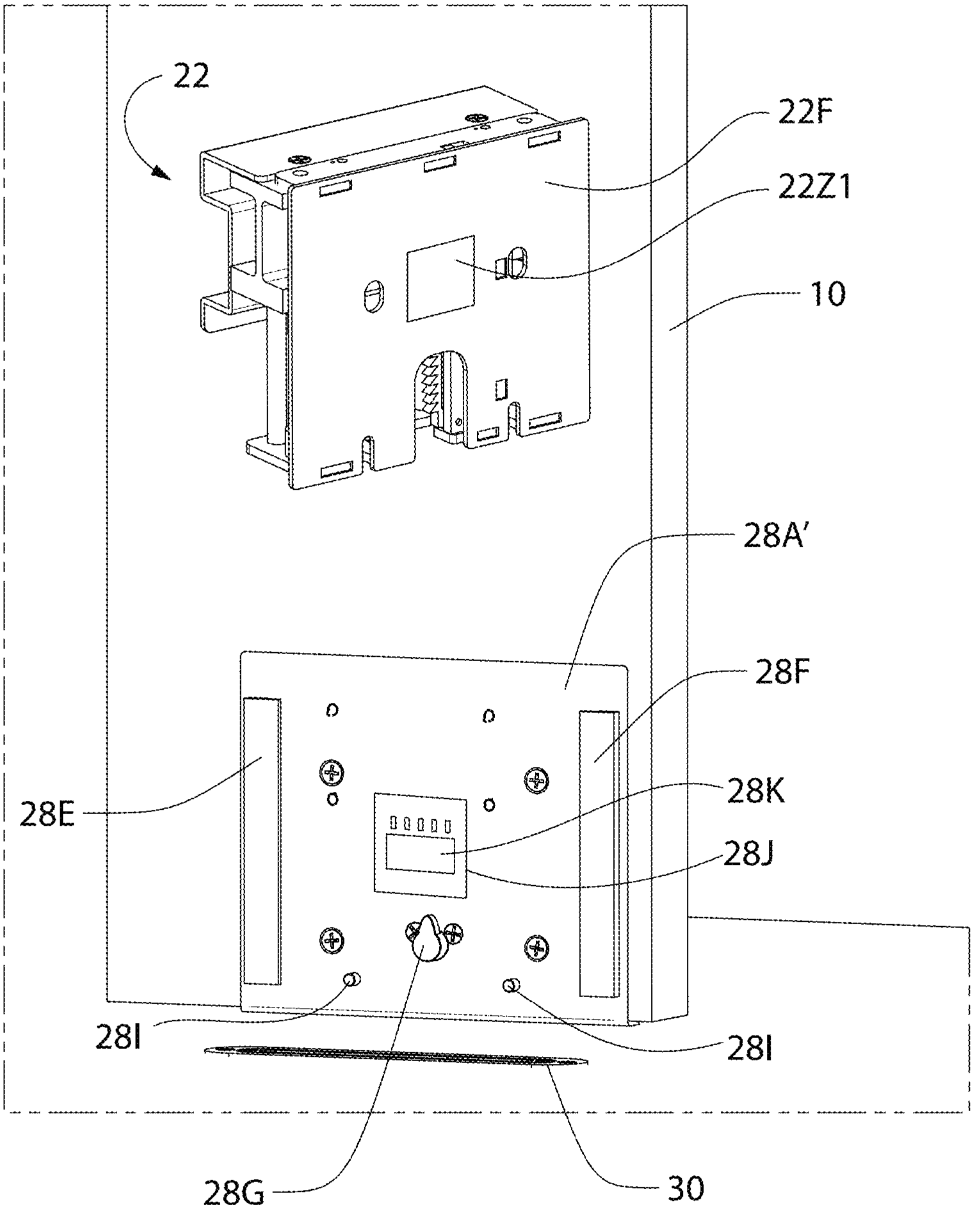
FIG. 4B depicts the use of another transmitter/reader positioned in the door and visible through an aperture in the door assembly mounting plate for reading a label (e.g., an RFID label) positioned on the backplate of the DSL which is shown turned-around only for clarity.

FIG. 4B depicts an example of this second transmitter/reader 28K. In particular, where this second transmitter/reader 28K is used in cutout 19, a mounting plate 28A', similar to mounting plate 28A but having a cutout 28J to provide an unobstructed reader field of view. Thus, the transmitter/reader 28K may comprise an RFID reader which can read an RFID label 22Z1 positioned on the backside of the backplate 22F of the DSL 22 which is shown turned around for clarity. Thus, when the DSL 22 is installed in the mounting plate 28A' the RFID reader 28K can provide data to authorities besides just verifying the installation of the DSL 22 at the door 10.

It should be understood that it is within the broadest scope of the present invention 20 that a similar RFID reader can be installed in the storage unit backplate 24B/124B for detecting the presence (or absence) and identity of the DSL 22 within the storage unit 24/124. As such, where readers are used in the storage units 24/124 and at the door 10, DSL 22 mismatches can be detected. This is important in high security environments where "serialized" DSL 22 units can be tracked and prevent misuse of the DSL 22 (e.g., perpetrator using the DSL 22 to intentionally trap a victim within a room).

Communications Feature of the Present Invention 20

The key differentiator and most significant aspect to demonstrating compliance to the intent of the NFPA and other applicable codes and standards (see "Appendix-Portions of NFPA Code and NYC Building Code") and the FDNY "Certificate of Approval" for all building occupancy types is the system's ability to provide remote indication of occupant presence and their potential for sheltering in place.

Firefighter and other responders must have knowledge of the specific locations where doors were secured by a locking system, which includes a "makeshift barricade" by room occupants. Without this strategic information event response efforts could be wasted and occupant extraction significantly delayed. The Department of Homeland Security states that a person who is bleeding can die from blood loss within five minutes, therefore it is important to quickly stop the blood loss.

The system and method 20 is designed to interact with any existing fire alarm and/or security system and must be integrated as per FDNY/DHS SafetyAct designation requirements.

As discussed in detail above, a shelter event is initiated when the wall-mounted storage unit cover 24A/124A is lifted/opened, simultaneously signaling a potential occupant sheltering as well as a potential assailant. That signal 26A is then transmitted into one of the existing building systems. Since there has never been a shelter device monitored, deployment of the DSL 22 must be listed as a new component. Accordingly, FDNY has designated the acronym "DSL" so that it may be standardized on for multi-agency response. See FIG. 11 as an exemplary fire alarm panel 200 as part of a building management system (BMS) that includes a "DSL" alert indicating the precise location of the deployment of the DSL. The communication system for the transmitted signal 26A is typically tied into a Class 3 system which includes the fire alarm panel 200. Thus, when the storage unit lid 24A/124A is opened, first responders will be alerted that the DSL 22 has been accessed, possibly deployed and the time of this occurrence. And because a Class 3 system has smoke detection capabilities, first responders will also know where there may be smoke or fire being used as a weapon.

By way of example only, there are approximately twenty approved Central Station Signaling Companies (also referred to as "security alarm businesses") authorized to monitor Class 3 Fire Alarms in NYC. These companies receive alarms in the form of various codes such as "111" for smoke or "122" for panic/duress. That said, there are currently no codes designated for a "shelter event" and/or would a single alarm be transmitted to both Police Departments and Fire Departments.

Figure 12:
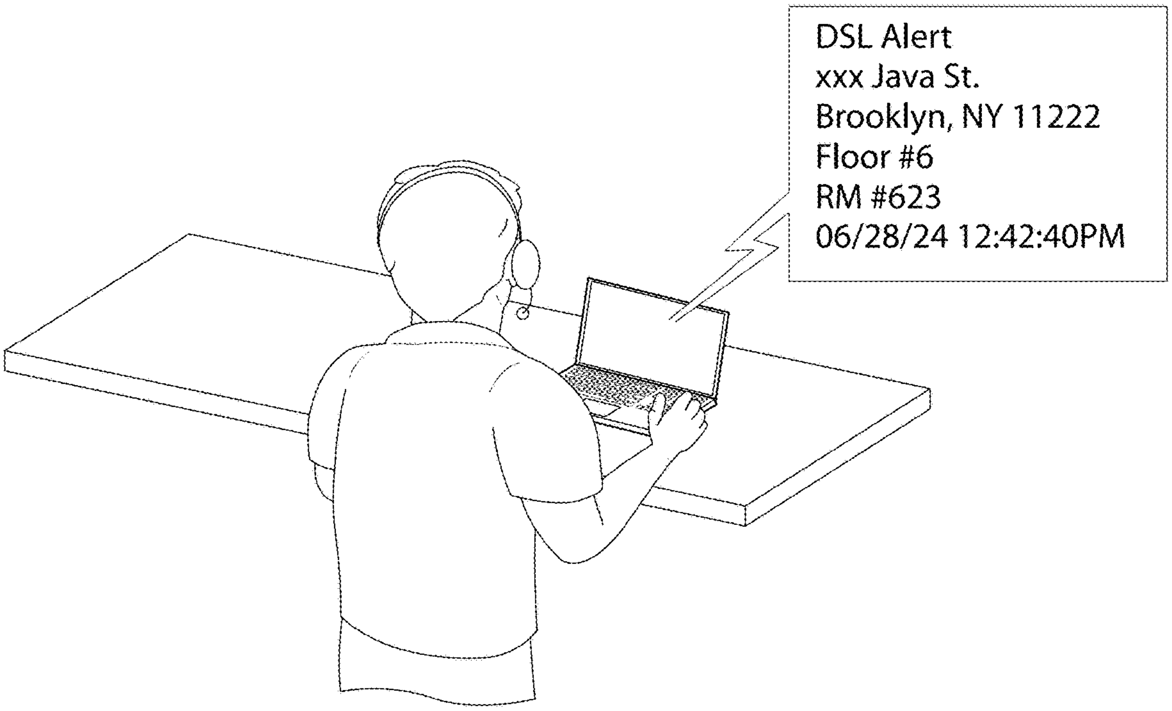
FIG. 12 depicts an attendant at a central station, or a fire department or a police department receiving the DSL alert providing the precise location of the deployment of the DSL.

As there is already a system in place to monitor smoke alarms, pull stations, fire dampers, etc. including their locational information, it is relatively easy to add addressable "nodes" on the existing system. This will allow for singular reporting of multiple alarm types with existing protocols. As such, with the integration of the system and method 20 of the present invention therein, there is now a code designated for a "shelter event" and a single alarm is now sent to both Police Departments and Fire Departments. FIG. 12 depicts any one of a building management system (BMS), a central station, a fire department, a police department, a card access management system, etc., that receives the alert signal 26A and informs both the police department (PD) and the fire department (FD) with precise location information.

The primary goals of the integration of the system and method 20 of the present invention:

Reduce an Active Assailant's ability to use smoke/fire as a weapon;

Reduce the hazard to firefighters by keeping them out of the line-of-fire;

Ensure that both FD & PD are equally notified of the event from its inception;

Provide advanced and event tactical information with the geocoordinates and timeline of each DSL alarm received;

Allow for reduced medical (EMS) response time allowing responders to enter the facility as soon as it is safe to do so.

Requirements:

1. Storage unit 24/124 shall be monitored via magnetic contact and third-party system (UL Class 3 Fire Alarm Panel)

2. Opening of the storage unit 24/124 shall be a "recorded DSL"

a. If there is only one DSL, it shall be the buildings option to intercept the alarm in the event of it being a staffing issue, prank, domestic event.

b. If there are multiple DSL alarms triggered within a given time-period, this will be automatically transmitted to the facility's central station monitoring company.

3. The Central Station, shall notify both Police Department (PD) & Fire Department (FD) based upon preestablished coding implemented prior to system commissioning a. FD shall be alerted:

i. The geocoordinates of potential occupant(s) sheltering;

ii. The potential hazard of an assailant;

b. PD shall be alerted;

i. Potential Active Assailant or other violent event;

ii. The geocoordinates of potential occupant(s) sheltering;

Key Occupant Preserver™ (System 20) Alarm Functions

1. The system 20 utilizes its storage unit 24/124 open/close state as a means to sense/validate a location being occupied:

a. Storage unit cover 24A/124A is held shut by at least 5 pounds of force;

b. The only way for the cover 24A/124A to go from its closed state to its opened state is by human intervention;

c. Human intervention automatically implies that the room is occupied;

d. Once the storage unit 24 detects that its cover 24A/124A is in the open state it transmits this event in a wired or wireless manner.

2. The system 20 may use various means to detect the cover 24A/124A state including:

a. Mechanical plunger i. Physically compressed by the cover 24A/124A b. Magnetic Contact i. Cover 24A mounted magnet activates storage unit 24/124 reed switch c. RFID i. Individual serialized tags on the cover 24A/124A are validated by the storage unit 24/124A reader ii. It should be noted that a reader requires DC power to function 3. The system may monitor the location and locked state of the Door Shelter Lock Assembly (DSL 22)

a. If the DSL 22 is appropriately stored in the storage unit 24/124.

b. If the DSL 22 is inserted into the preinstalled inside mounting plate 28A c. If the DSL 22 is both inserted into the inside mounting plate 28A and DSL 22 lock is engaged d. If the DSL 22 is in its intended/registered room location 4. Remote alarm interface types a. No prior building installed infrastructure and/or standalone installation site i. At a minimum a local audio/visual indicator must be activated b. Prior installed card access i. Hard wire to card reader tamper input ii. Integrate to security system to provide locational information based upon preregistered reader information c. Prior installed addressable fire alarm i. Hard wired in accordance with brand specific requirements ii. Integrate to provide locational information based upon system floorplan d. Meshed and/or WiFi isolated networks, such as that disclosed in U.S. Pat. No. 7,965,178 (Schmutter, et al.), which is incorporated by reference in its entirety.

i. Wireless communication with keep-alive validation of each DSL 22/storage unit 24/124 ii. Dedicated rule-based dataset with multiple means of validation iii. Intuitive user interface incorporated with locational information for each DSL "Node" displayed on floorplan iv. Allows for multiple user levels and direct interface to various responding departments/agencies 5. Remote alarm locations a. In the corridor directly outside the occupied location b. Adjacent staffed designated area c. Building security, safety or other management office d. Fire alarm, security or other BMS panel e. Off-site monitoring or other responder/police/security agency Key Features of the Present Invention 20

1. A universal locking system designed for use during a terrorist or other event 2. A system that alerts fire, police and authorized individuals of its removal from its housing 3. The DSL 22 has merit independent of a terrorist situation due to its unique design to compensate for misalignment and relatively few moving parts 4. An overall assembly that:

A. Has an inside & outside portion permanently affixed to the door;

B. Has a door shelter lock assembly stored in a tamper evident alarmed wall/door mounded storage unit;

C. Is capable to provide remote indication once removed from its housing;

D. Is capable to provide indication once deployed;

E. Impact resistant for dropping during installation;

F. Compensates for up to 1.5" of vertical or horizontal misalignment of door, jamb or floor.

5. Door portion

A. Accommodate a door of nominal thickness of 1.75" or more i. Due to manufacturing irregularities and/or prior door damage, the actual thickness of a door may be only 1.62", system is designed to accommodate those thickness irregularities ii. Has provisions for "stand-off" extension to cladded or thicker doors B. Has return angles that go under the door for stability and alignment C. Interior has flanges to accept the lock assembly D. Exterior portion has no exposed fasteners 6. A lock system mitigates and manages door gaps from .250"-1.500" while maintaining the same amount of pin engagement.

A. Vertical traveling main block 22C comprised of

I. 2 support rods and associated lift springs for self-raising

II. Assembly design to remain stable under load and/or multiple door impacts

III Means to support the locking pins 22B

IV Means to house the patch pin springs 22D

V. Means to secure the brake finger (also referred to as the "projection") 22M.

VI. Means to secure the internal brake release 22Q

B. The utilization of multiple/redundant pins accounts for lateral movement from hinge or other issues 7. A DSL 22 with 3 or more pins 22B that ensures strike engagement even if partially blocked A. Pins 22B ride in the vertical-traveling main block 22C B. Each locking pin 22B I. Rounded front cone for easy strike engagement II. Wide flange to prevent overtravel III. Has tension spring 22D to allow for partial strike blockage and varying door undercuts IV. Counterbored recess to ensure spring capture V. Stainless steel where each pin 22B is capable of withstanding pedestrian impact and the four combined pins, impacts of 19,000 pounds or more VI. Engraved rings demonstrating floor engagement can be used as an optional engagement indication.

8. A lock system that clears itself of debris when it is unlocked/disengaged

9. An unlocking system that allows the lock to be disengaged from either side of the door with minimal moving parts, and:

A. Unlocks at and height of the overall 2.500" of vertical travel

B. Requires minimal turning force for the key/cylinder 28C

C. Has a unique cam 28G design

I. Effectively captures the cylinder tailpiece

II. Remains securely in the inner door portion and permanently affixed to the door and separate from the remaining locking assembly III. Has a protruding "ellipse" that allows the cam to "depress" the sawtooth vertical brake rod 22L D. Has a unique brake rod 22L I. "Sawtooth" design allows the lock assembly to be lowered AND secured in 0.187" increments II. Is fully captured on both ends to prevent misalignment and maintain position during potential impacts III. Has two horizontal springs 22N/220 to maintain tension on the "brake finger" (projection) 22M.

IV. Tooth design for minimal force to lower/engage the main block 22C

V. Vertical stability to ensure that once the CAM 28G or internal release 22Q move it 0.200" it will allow the main block 22C to raise freely VI. Has smooth protruding rear surface designed for the CAM 28G to freely rotate against E. Unique inside release lever 22Q I. Travels vertically with the main block 22C II. Minimally protruding into the room to prevent damage and/or user confusion III. Housing design prevents overtravel in either direction IV. Minimal force required to disengage 10. Floor strike 30

A. Standard designed for wood, tile or masonry surface

B. Custom carpet and other applications

C. Incorporates an escutcheon flange and lines walls

D. Is epoxied into place, by way of example only; can be appropriately fastened to the floor by any means 11. Installation jig-allows a lay person to install the door assembly 28 with consistency A. Door portion assembly 28

I. Slides under the door and clamps into place

II. Temporary screws on for alignment

III. Has drill bushings for all mounting holes on both sides of the door

B. Floor strike

I. Once the door has been drilled, a new jig is secured to the door to ensure strike placement II. Plunge router or other similar machine shall utilize the jig III. Jig ensures that the full strike depth including the escutcheon flange are accommodated leaving room for epoxy placement.

Patient Room Response Scenarios

BACKGROUND

A typical patient room with an inswing door equipped with standard passage (nonlocking) hardware. Preinstalled the interior mount 28 and exterior emergency override key cylinder 28C as well as the wall mounted tamper-evident storage unit 24/124 of the system 20 of the Occupant Preserver™

Events

1. Daily a. Patients, family and staff enter and exit the room freely

2. Patient self-injury a. Staff enter freely for patient response and treatment

3. Patient Panic

Patient suspects danger, observes the wall mounted storage unit and attempts to utilize the Occupant Preserver™ as a means to safeguard themselves a. Remote alarm is triggered b. Staff is alerted with locational information that a DSL 22 of the Occupant Preserver™ was deployed c. Staff responds in accordance with their training d. In the event that the patient actually deployed the DSL 22 of the Occupant Preserver™ Staff/Responders would utilize their override key to gain entry 4. Individual Perpetrator (e.g., a former staff-member) with prior knowledge of the Occupant Preserver™ system and meth od 20:

a. Perpetrator removes the Occupant Preserver™ from the storage unit b. Remote alarm is triggered c. Staff is alerted with locational information that a DSL 22 of the Occupant Preserver™ was removed from its storage unit 24/124.

d. Staff responds in accordance with their training e. In the event that the DSL 22 of the Occupant Preserver™ was deployed, Staff/Responders would utilize their override key to gain entry 5. Active Shooter Event a. Gunman enters the ward b. Closest staff-member shouts "gun!" and send remote panic alarm c. Staff members determine to Run, Hide, Fight d. Where feasible, staff evacuate e. Staff utilize their training and make best efforts to gather patients and family members to one of the designated shelter-in-place areas f. Staff deploy the DSL 22 of the Occupant Preserver™ g. Remote alarms sound and signal location information h. Proportional response is determined i. Gunman targets any exposed potential victims j. Gunman attempts entry to various rooms k. Gunman is deterred by DSL 22 of the Occupant Preserver™ l. Staff continue their individualized decision to Run, Hide, Fight m. Gunman is caught, killed or commits suicide n. Responders sweep the floor, prioritizing locations based upon the remote alarms received via Occupant Preserver™ system and method 20.

Design overview of the Occupant Preserver™ System and Method 20

1. A universal door shelter lock (DSL) 22 that mounts to any type of construction door, clamping and reinforcing the door from both sides 2. A system designed to be compliant with the intent of NFPA, CMS and TJC (Centers for Medicare and Medicaid Services and The Joint Commission) codes & standards (also see "Appendix-Portions of NFPA Code and NYC Building Code")

a. Allows the occupant to participate in their own decision to Run, Hide, Fight i. Wall mounted requiring the ANSI "Knowing-Act" to remove the device from its storage unit and deploy ii. Even if placed on the door, will not actually lock unless the occupant knowingly depresses the foot pedal b. Notifies First Responders of potential occupant(s) sheltering-in-place i. Remote audio/visual alarm ii. Location identification iii. Alert locations include 1. Nurse stations or other staffed locations 2. Building security desk/offices 3. Fire Command c. Provides Responders and authorized staff intuitive key override to gain entry not requiring any special knowledge d. Allows security staff to an improved tool to better determine proportional event response plan i. Isolated deployment may indicate an individual perpetrator 1. Provides the response team an element of surprise ii. Large scale or building wide event 1. Means to better extract sheltered occupants 3. A design to prevent unauthorized use a. Tamper-evident wall-mounted storage unit 24/124 b. Storage unit and device monitoring c. Remote alarm indicating device deployment 4. A design that distributes potential impacts across the door 5. A design comprised of four locking pins to mitigate misalignment and/or debris 6. An overall ratcheted locking system that will secure in 3/16-inch increments a. Vibration resistant b. Resilient to multiple floor irregularities 7. A floating pin design that will allow for 1 or more of the pins to secure while the rest "overcome" debris 8. Intuitive foot pedal a. Requiring less than 10 pounds of force to depress and engage locking feature b. Capable of being operated by hand or foot 9. A user-friendly key cylinder for authorized override/unlocking of the door 10. In the potential event of unauthorized override use, the occupant can choose to remain sheltered and utilize any available resource to apply a downwards force of 10 pounds 11. A keying system allowing each building its own unique keyway to inhibit unauthorized use of the override feature.

Other Scenario Examples

1. Entrapment of one or more building occupants a. Perpetrator enters a room and utilizes the DSL 22 of the Occupant Preserver™ as a means to lock in their potential victim(s) as well as lock out any potential responding personnel b. Once the DSL 22 of the Occupant Preserver™ is deployed, they will proceed with their intended motive under the assumption that they will be undisturbed c. Unbeknownst to the assailant, the tamper resistant Occupant Preserver™ housing 24/124 was tied into the building's cardswipe system and triggered a tamper alarm.

d. By incorporating the existing infrastructure, the exact location of the event was instantaneously known providing the response team the "element-of-surprise"

e. Security/Police can develop a proportionate response plan based upon recent/adjacent video and/or other factors f. Security/Police will determine the appropriate time to utilize the corridor override function and gain entry to the space 2. Shelter-in-place one or more building occupants a. One or more individuals will seek refuge within an Occupant Preserver™ protected room b. The occupant(s) will determine their need to secure themselves and prevent unauthorized entry to the room c. DSL 22 of the Occupant Preserver™ deployment i. Remove DSL 22 from the tamper-evident housing 24/124

1. This will trigger a remote alarm alerting Emergency Responders ii. Slide DSL 22 into door mounted receiver channel 28A iii. Step down on the DSL activator 22A as indicated iv. DSL 22 of the Occupant Preserver™ will secure the door d. Shelter-in-Place
  i. For the duration of the event
  ii. Evacuation
    1. Directed by Security/Police or others
    2. Situation changes i.e., smoke or other apparent factors
  iii. Unauthorized use of override key
    1. Occupant can inhibit the override and still maintain effective security.
e. Occupant Preserver™ system and method 20 usage to be incorporated into ongoing active-shooter training The Occupant Preserver™ system and method 20 provide for all of the following:

door assembly 28 stabilizes door without permanently affixing the DSL 22 to the door;

the DSL 22 can be installed in the mounting plate without engaging the pins in the floor strike 30;

the ability for a person to use their hand or foot to lower the DSL 22, once installed in the mounting plate 28A, regardless of the door being open or closed;

the ability of the locking pins 22B to individually or collectively engage the floor strike 30;

the ability of the main block 22 having the I-beam construction to stabilize the pins and comprise a projection 22M that locks into individual teeth along the length of the sawtooth brake 22L at any height, thereby compensating for varying door undercuts;

the ability for an anxious responder to rotate the key in either direction in the key aperture 28C" and unlock it;

the design of the sawtooth shim 22L2 allowing the cam 28G to displace the sawtooth brake 22L to disengage it from the projection 22M at any height of the main block 22C;

the design of the brake release 22Q to release the main block 22C at any height;

the ability of the overall DSL 22 assembly to withstand 19,000 pounds of force by distributing such forces across the door 10, the DSL 22 and floor strike 30;

the ability of the responders to extract the key cylinder 28C in the event of key damage within the cylinder;

the ability for the occupant to raise the entire DSL 22 out of the mounting plate 28A even in the unusual occurrence where the DSL 22 suffers multiple strikes resulting in one or more the locking pins becoming deflected;

the ability for the occupant to rescue an additional person from outside the door, or the ability for the occupant to escape the sheltered area either by using the brake release 22Q or simply lifting the DSL 22 upward, thereby ensuring that the occupant is never entrapped by DSL 22 which is unlike currently-taught barricade methodologies offered by CISA and other government agencies;

the ability to have a tamper-resistant storage unit 24/124 mounted to the wall with no access to the fasteners and with only a singular method to open or remove the cover 24/124A;

the ability to have tamper-evidence by mounting the state of the cover 24A/124A and transmitting a signal to the authorities when it is removed;

the ability to serialize the DSL 22 and validate its presence in the storage unit 24/124;

the ability to monitor and serialize the DSL 22 when installed at the door 10;

the removal of site-specific variables whereby the DSL 22 provides constant/reliable training that the occupants can implement anywhere in a facility or any facility outfitted with DSLs 22, regardless of the door or room construction;

the ability of a first responder to use the system/method 20 in tactical decision making;

it has been well-documented that the first thirty seconds of an assailant event is critical and that providing the occupant(s) the ability to isolate themselves from the assailant within that time period can save lives;

it has also been further documented that it is critical to provide the occupants with the ability to modify the Run, Hide or Fight model so that they can expeditiously vacate from the shelter area if necessary;

it is well documented that the misinformation of the overall incident location as well as the individual occupant shelter location has resulted in extended delay by first responders. The invention of the present application eliminates both of these negative results;

the ability to have a downward stop in the DSL 22 to prevent its components from overextending;

the ability of the DSL 22 to withstand extreme downward pressure by occupant action;

the ability of the DSL 22 to withstand being dropped and still be operable;

the ability of the I-beam design of the main block 22C whereby the bottom flange 25 moves along the vertical slide rods 22G/22H and provides additional support to the locking pins 22B while bringing the fulcrum as close to the floor strike 30 as possible to withstand maximum load;

the ability of the I-beam design of the main block 22C whereby the top flange 22E and lock pin springs 22D allow travel of the individual pins and have the vertical force be absorbed and distributed by the top flange 22E to DSL body;

the ability of a person to be able to step down on the activator 22A with the DSL 22 positioned in the mounting plate 28A over the floor 12, not over the floor strike 30, without damaging the locking pins 22B;

the slide rods 22G/22H with the apertures in the main block 22C along with the lock pin springs 22D ensure that the locking pins 22B will be disengaged with the DSL 22 in the fully open position.

Thus, the invention 20 of the present application is a system and method for a universal locking system that mounts to any type of construction door, clamping and reinforcing the door from both sides. The system and method is compliant with the intent of CMS, NFPA, TJC codes & standards, allowing the occupant to participate in their own decision to run, hide or fight. Wall mounting the DSL 22 in a storage unit 24/124 and allowing the occupant to remove the DSL 22 and install it at the door complies with the ANSI "Knowing Act" and requires the occupant to activate the DSL 22. Removal of the DSL 22 from the wall mounting, immediately alerts first responders of potential sheltering-in-place while providing a remote audio/visual alarm, while identifying location of the device. Alert locations include nurse stations, staff locations, building securing desk/offices and fire command. A key override is provided so that responders/authorities can gain entry without requiring any special knowledge of the locking configuration. The system and method 20 provide security staff with an improved tool to better determine proportional event response plan, with isolated deployment possibly indicating an individual perpetrator. The system and method 20 provide the response team an element of surprise and can operate in large scale or building-wide event. And the system and method 20 also provide means for better extracting sheltered occupants.

The FDNY and NYPD have found the system and method 20 of the Occupant Preserver™ so profoundly unique so as to form a one hundred man complement to create a training video for all fire fighters and police department personnel. The FDNY, for the first time, and based on this invention's ability to prevent a potential assailant from using smoke or fire as a weapon, invited the Applicant to install the Occupant Preserver™ system 20 throughout their main training headquarters. After such installation, NYPD Shield, the FBI and CISA (Cybersecurity and Infrastructure Security Agency, part of DHS-Department of Homeland Security), as well as others, have conducted training drills and have reenacted such unfortunate events as the Virginia Tech and Bronx Lebanon incidents. It was documented by these agencies that the communication provided by the Occupant Preserver™ system and method 20, along with the ease of installation of the DSL 22 by the occupants and the expedited response time for the agencies such as NYPD ESU, that this invention 20 would have had a significant and positive impact and would have saved lives in the Virginia Tech and Bronx Lebanon incidents. Based upon these results and the confidence of the training system associated with the Occupant Preserver™ system and method 20, this has resulted in agency adoption and training of all personnel so that they may integrate this system and method 20 into their tactical response plans for handling a violent event, or active assailant, in a building.

REFERENCE NUMBERS

10 door
12 floor
14 hole in floor to receive floor strike
15 wall
16 holes in door for standoffs
18 hole in door for cam and key mechanism
19 cutout in door (provisional for a second transmitter)
20 System and Method for Sheltering-in-Place with Advanced Responder Notification and Ready Access
21 screws for lower ends of main block springs 22J/22K
21A openings in backplate 22F to access screws 21
22 door shelter lock assembly (DSL)
22A activator
22A1 foot/handle pedal
22A2 shield
22A3 grip
22B locking pins
22B1 obstructed depth of lower end (FIG. 14B)
22B2 unobstructed depth of lower end (FIG. 14B)
22C main block, also referred to as a locking pin carrier
22D lock pin springs
22E top flange of main block
22F DSL lock body or backplate
22G left slide rod
22H right slide rod
22I top flange of DSL
22J left slide rod spring for biasing the main block (locking pin carrier) upward
22K right slide rod spring for biasing the main block (locking pin carrier) upward
22L sawtooth brake
22L1 brake teeth element
22L2 sawtooth shim acting as smooth shoulder of sawtooth brake
22L3 upper screw to fasten two portions of sawtooth brake together
22L4 lower screw to fasten two portions of sawtooth brake together
22L5 cavity for receiving brake spring 22N
22L6 cavity for receiving brake spring 22O
22M projection
22N top sawtooth brake spring
22O bottom sawtooth brake spring
22Q brake release (release member)
22Q' proximal end of brake release
22Q" distal end of brake release
22P slot in sawtooth brake
22R arrow to right showing proximal end brake release movement
22S arrow to left showing distal end brake release movement
22T upper end of sawtooth brake
22U slot in handle 22I holding upper end of sawtooth brake
22V lower end of sawtooth brake
22W slot in lower flange 23
22X cutout in lower portion of DSL backplate
22Y (FIG. 5) arrows shown to the left for turning cam and displacing brake
22Z arrow showing upward motion of main block
22Z1 RFID label
23 bottom flange of DSL
24 storage unit
24A storage unit cover/lid
24B storage unit backplate
24B1 left track on storage unit backplate
24B2 right track on storage unit backplate
24C cantilevered bottom upon which rests the lid 24A
24D bottom catch on bottom flange of storage unit for lid
24E handle of cover 24A of storage unit
24F operating instruction label
25 bottom flange of main block
26 transmitter
26A alert signal
26B wire harness
28 door assembly
28A inside door assembly mounting plate
28A' inside door assembly mounting plate with aperture 28J for RFID reader 28K
28B outside door assembly plate
28C key cylinder
28C' cylinder ring
28C" key faceplate and insertion aperture
28D studs that pass through door
28E inside door mounting plate left track
28F inside door mounting plate right track
28G cam
28H fasteners for securing inside door assembly mounting plate
28I stop pins in door assembly mounting plate
28J cutout in backplate
28K RFID reader
29 apertures in the top/bottom flanges of the main block for the slide rods
30 floor strike
30' floor strike with no penetrable cap
30A penetrable cap for floor strike with 4 machined ovals filled with epoxy that has dried
30A1, 30A2, 30A3 and 30A4 oval openings in penetrable cap

Figure 15B:
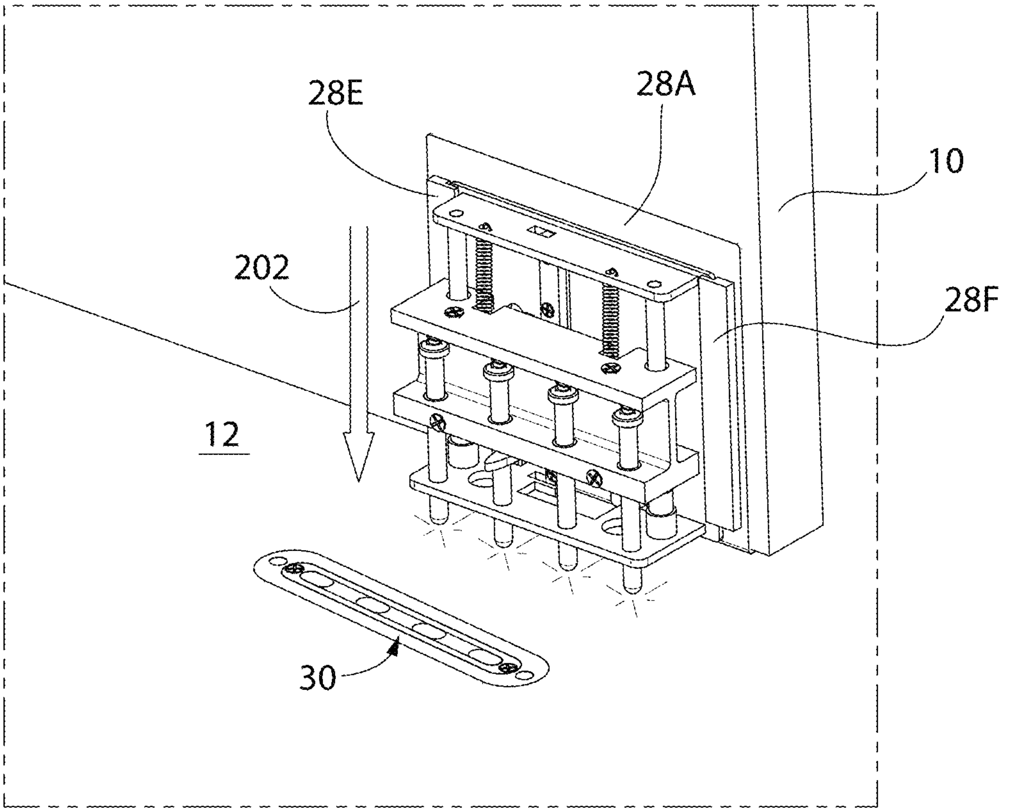
FIG. 15B depicts what happens to the DSL if a person steps downward on the activator of the DSL when the door is open.
Figure 15C:
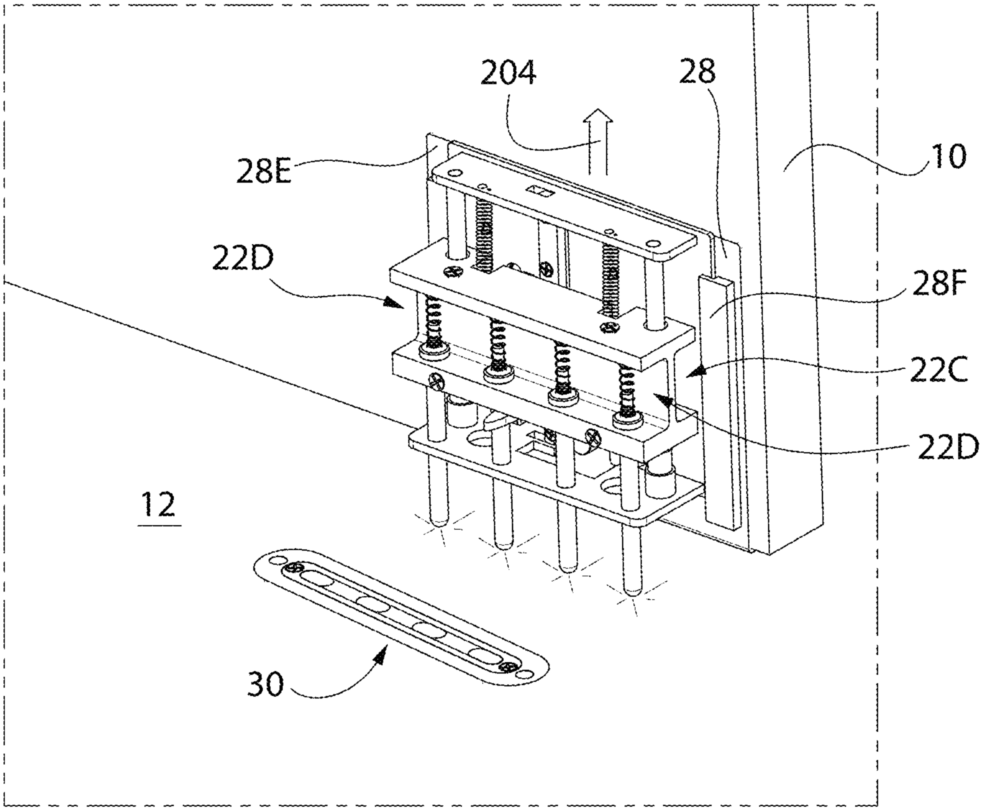
FIG. 15C depicts the locking pin springs overcoming the weight of the DSL and raising it slightly in the mounting plate.
Figure 15D:
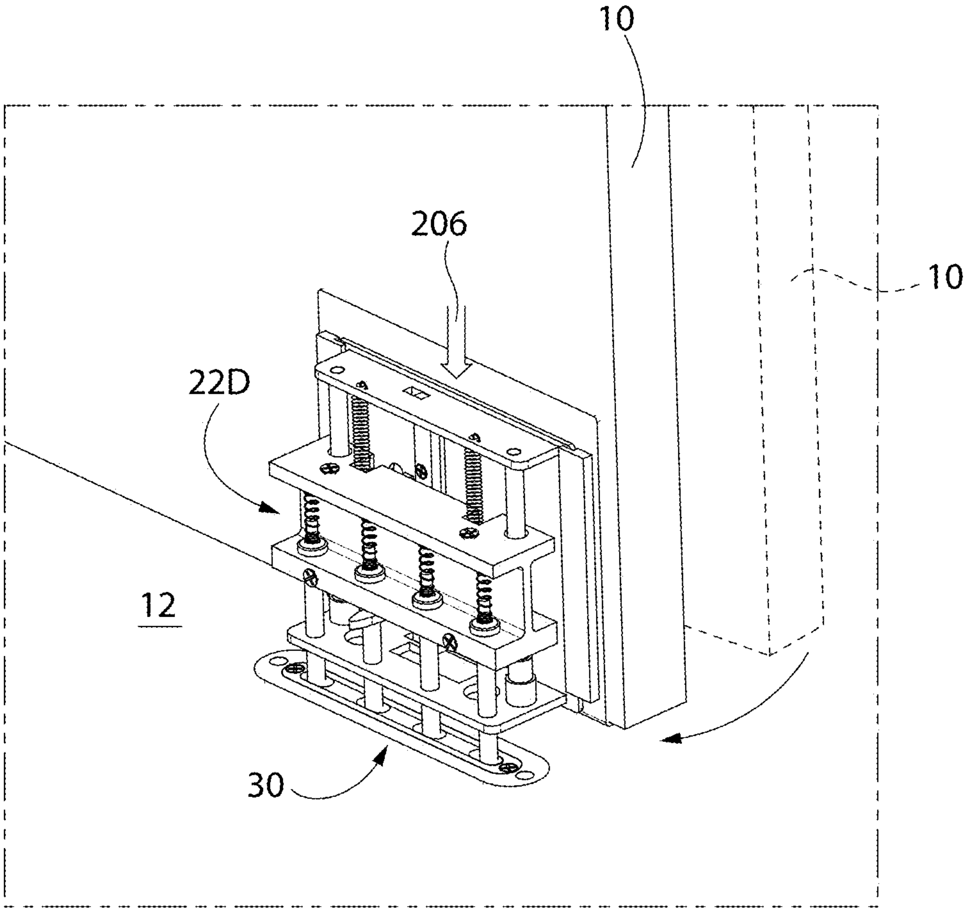
FIG. 15D depicts that the door being moved to the closed position and the lower ends of the locking pins immediately extending downward into the floor strike, thereby preventing the door from being opened.

30B alternative cap for sandwiching a transparent polycarbonate strip
30C polycarbonate strip
31 bottom stops on slide rods
33 cutouts for stops
35 apertures in the bottom flange of the main block for the lock pins
37 apertures in the bottom flange of the DSL for the lock pins
39 locking pin nuts
40A left track in support plate 24B of storage unit 24 for DSL
40B right track in support plate 24B of storage unit 24 for DSL
40C bottom catch in support plate 24B of storage unit 24 for DSL
41 arrow in FIG. 1B showing upward movement of storage unit lid
41A arrow in FIG. 1B showing upward movement of DSL
42 arrow in FIG. 1B showing insertion direction of DSL into door assembly
100A magnet/RFID label in storage unit lid
100B magnetic contact/RFID reader in storage unit wall mount
124 alternative storage unit
124' support member to mount storage unit to wall
124A storage unit cover/lid
124B storage unit backplate or mounting plate
124B1 left track on storage unit mounting plate
124B2 right track on storage unit mounting plate
124C storage unit hinge
126 transmitter
126A alert signal
126B wire harness
200 exemplary fire alert panel of a building management system
202 downward arrow in FIG. 15B showing user activation
204 upward arrow in FIG. 15B showing DSL moving upward
206 downward arrow in FIG. 15B showing DSL moving downward
OB obstruction
UC undercut

Appendix—Portions of Nfpa Code and Nyc Building Code

NFPA (National Fire Protection Association) 101 Life Safety Code®-Chapter 7

7.2.1.5.1 Door leaves shall be arranged to be opened readily from the egress side whenever the building is occupied. (Normal Operation)

7.2.1.5.3 Locks, if provided, shall not require the use of a key, a tool, or special knowledge or effort for operation from the egress side.

Annex 7

A.7.2.1.5.10 Examples of devices that might be arranged to release latches include knobs, levers, and bars. This requirement is permitted to be satisfied by the use of conventional types of hardware, whereby the door is released by turning a lever, knob, or handle or by pushing against a bar, but not by unfamiliar methods of operation, such as a blow to break glass. It is also within the intent of this requirement that switches integral to traditional doorknobs, lever handles, or bars, and that interrupt the power supply to an electromagnetic lock, be permitted, provided that they are affixed to the door leaf. The operating devices should be capable of being operated with one hand and should not require tight grasping, tight pinching, or twisting of the wrist to operate.

A.7.2.1.5.10.3 Examples of devices that, when used with a latch, can be arranged to require not more than one additional releasing operation include night latches, dead bolts, and security chains.

NYC Building Code-Chapter 10

1010.1.9 Door operations, except as specifically permitted by this section, egress doors shall be readily openable from the egress side without the use of a key or special knowledge or effort. NYC Building Code: 1010.1.9.2 Hardware height, Door handles, pulls, latches, locks and other operating devices shall be installed 34 inches (863.4 mm) minimum and 48 inches (1220 mm) maximum above the finished floor. Locks used only for security purposes and not used for normal operation are permitted at any height.

While the invention has been described in detail and with reference to specific examples thereof, it will be apparent to one skilled in the art that various changes and modifications can be made therein without departing from the spirit and scope thereof.

What is claimed is:

1. A shelter-in-place door locking apparatus that can be releasably coupled to a door of a room on a floor at a moment's notice by persons sheltering in place and which accommodates for varying door undercuts and wherein said apparatus is in total control by those persons sheltering in place in the room, said apparatus comprising:

a locking pin carrier comprising a plurality of locking pins whose lower ends are configured to be positioned in a floor strike located in the floor, said locking pin carrier being slideable on support rods fixed between an upper flange and a lower flange both of which are fixedly secured to a body plate that is configured for releasable coupling to the door, said locking pin carrier comprising a projection, said locking pin carrier being biased upward in an unlocked position by springs coupled between said locking pin carrier and said body plate;

a releaseable brake positioned between said upper flange and said lower flange, said releasable brake comprising a plurality of teeth over which said projection slides when said locking pin carrier slides on said support rods away from said upper flange against said bias and towards said lower flange, said teeth forming a plurality of locked positions to accommodate the varying door undercuts, said projection releasably locking into one of said plurality of teeth when said locking pin carrier stops sliding;

said locking pin carrier comprising an upper member and a lower member, each of said locking pins slideable through said lower member and said lower flange and wherein an upper end of each locking pin is biased against said lower member by a spring positioned between said upper member and said upper end of said locking pin, said upper end of each locking pin prevented from passing through said lower member; and a release member movably coupled to said locking pin carrier that can be activated by the persons to release said locking pin carrier from said one of said plurality of locked positions to automatically return said locking pin carrier to said unlocked position.

2. The shelter-in-place door locking apparatus of claim 1 further comprising a door assembly that comprises a first portion for releasably receiving said body plate therein and configured to mount to an inside surface, and proximate a bottom edge, of the door and a second portion configured to be positioned on an outside surface of the door, said second portion including a key cylinder comprising a locking cam that is positioned within said first portion and configured to be in contact with said releasable brake when said body plate is positioned therein.

3. The shelter-in-place door locking apparatus of claim 1 wherein said plurality of teeth allow said locking pin carrier to be releasably locked in approximately 0.187 inch increments to incrementally compensate for varying door undercuts and unknown debris.

4. The shelter-in-place door locking apparatus of claim 1 wherein positioning said lower end of at least one locking pin within said floor strike prevents the door from being opened.

5. The shelter-in-place door locking apparatus of claim 4 wherein the door is prevented from being opened if at least a minimum length of said lower end of said at least one locking pin is positioned within said floor strike.

6. The shelter-in-place door locking apparatus of claim 1 wherein said locking pin carrier can be locked into a second locking position when said apparatus is over the floor and the door is moved over said floor strike, said plurality of locking pins automatically positioning their lower ends into the floor strike to prevent the door from being opened.

7. The shelter-in-place door locking apparatus of claim 1 wherein said floor strike comprises a penetrable cover, said cover preventing debris from accumulating within said floor strike, and wherein said cover is penetrated when said locking pins are positioned in said floor strike.

8. The shelter-in-place door locking apparatus of claim 1 wherein a plurality of springs are coupled on one side of said releasable brake to maintain contact with said projection.

9. The shelter-in-place door locking apparatus of claim 1 wherein said door assembly and said apparatus compensate for up to 1.5 inches of varying door undercuts.

10. A system for providing at a moment's notice a universal tamper-evident, shelter-in-place door locking device at a door to a room on a floor for at least one user in the room and wherein said door locking device accommodates for varying door undercuts while providing the at least one user with total control of the device while automatically providing precise location notification to authorities, said system comprising:

a door assembly that comprises a first portion configured to mount to an inside surface of the door and a second portion configured to be positioned on an outside surface of the door, said second portion including a key cylinder comprising a lock cam that is positioned within said first portion;

a floor strike, positioned within the floor underneath the door when the door is in a closed position;

said door locking device being portable to be moved from a first location within said room to said first portion and configured for coupling to said first portion, said door locking device comprising:

a locking pin carrier comprising a plurality of locking pins whose lower ends are configured to be positioned in said floor strike, said locking pin carrier being slideable on support rods fixed between an upper flange and a lower flange both of which are fixedly secured to a body plate that is configured for releasable coupling to the door, said locking pin carrier comprising a projection, said locking pin carrier being biased upward in an unlocked position by springs coupled between said locking pin carrier and said upper flange body plate;

a releaseable brake positioned between said upper flange and said lower flange, said releasable brake comprising a plurality of teeth over which said projection slides when said locking pin carrier slides on said support rods away from said upper flange against said bias and towards said lower flange, said teeth forming a plurality of locked positions to accommodate the varying door undercuts, said projection releasably locking into one of said plurality of teeth when said locking pin carrier stops sliding;

said locking pin carrier comprising an upper member and a lower member, each of said locking pins slideable through said lower member and said lower flange and wherein an upper end of each locking pin is biased against said lower member by a spring positioned between said upper member and said upper end of said locking pin, said upper end of each locking pin prevented from passing through said lower member; and a release member movably coupled to said locking pin carrier that can be activated by the persons to release said locking pin carrier from said one of said plurality of locked positions to automatically return said locking pin carrier to said unlocked position; and a storage unit at said first location, having a transmitter, that is secured in the room, said storage unit containing said door locking device initially therein, said transmitter being activated to alert authorities when said storage unit is opened to remove said locking device from said storage unit and automatically providing authorities with location data of said transmitter.

11. The system of claim 10 wherein said locking cam is in contact with said releasable brake when said door locking device is positioned within said first portion.

12. The system of claim 10 wherein said plurality of teeth allow said locking pin carrier to be releasably locked in approximately 0.187 inch increments to incrementally compensate for varying door undercuts and unknown debris.

13. The system of claim 10 wherein positioning said lower end of at least one locking pin within said floor strike prevents the door from being opened.

14. The system of claim 13 wherein the door is prevented from being opened if at least a minimum length of said lower end of said at least one locking pin is positioned within said floor strike.

15. The system of claim 10 wherein said locking pin carrier can be locked into a second locking position when said door locking device is over the floor and the door is moved over said floor strike, said plurality of locking pins automatically positioning their lower ends into the floor strike to prevent the door from being opened.

16. The system of claim 10 wherein said floor strike comprises a penetrable cover, said cover preventing debris from accumulating within said floor strike, and wherein said cover is penetrated when said locking pins are positioned in said floor strike.

17. The system of claim 10 wherein a plurality of springs are coupled on one side of said releasable brake to maintain contact with said projection.

18. The system of claim 10 wherein said door assembly and said door locking device compensate for up to 1.5 inches of varying door undercuts.

19. A method for providing at least one user in a room with the ability to shelter-in-place by installing on a door of the room on a floor, at a moment's notice, a portable door locking apparatus that accommodates for varying door undercuts and wherein the at least one user has total control of said door locking apparatus, said method comprising:

mounting a door assembly to the door that comprises a first portion mounted to an inside surface of the door and a second portion positioned on an outside surface of the door and wherein the second portion includes a key cylinder comprising a lock cam;

forming a floor strike in the floor adjacent the inside surface of the door for receiving a free end of at least one of a plurality of locking pins from a portable door locking apparatus therein;

closing the door;

releasably coupling said portable door locking apparatus to said first portion, said portable door locking apparatus comprising:

a locking pin carrier comprising a plurality of locking pins whose lower ends are configured to be positioned in said floor strike, said locking pin carrier being slideable on support rods fixed between an upper flange and a lower flange both of which are fixedly secured to a body plate that is configured for releasable coupling to the door, said locking pin carrier comprising a projection, said locking pin carrier being biased upward in an unlocked position by springs coupled between said locking pin carrier and said body plate;

a releaseable brake positioned between said upper flange and said lower flange, said releasable brake comprising a plurality of teeth over which said projection slides when said locking pin carrier slides on said support rods away from said upper flange against said bias and towards said lower flange, said teeth forming a plurality of locked positions to accommodate the varying door undercuts, said projection releasably locking into one of said plurality of teeth when said locking pin carrier stops sliding;

said locking pin carrier comprising an upper member and a lower member, each of said locking pins slideable through said lower member and said lower flange and wherein an upper end of each locking pin is biased against said lower member by a spring positioned between said upper member and said upper end of said locking pin, said upper end of each locking pin prevented from passing through said lower member; and a release member movably coupled to said locking pin carrier that can be activated by the at least one person to release said locking pin carrier from said one of said plurality of locked positions; and applying a downward force on said locking pin carrier to displace said carrier downward to releasably lock said locking pin carrier with said releasable brake while positioning lower ends of said plurality of locking pins within said floor strike to prevent the door from being opened.

20. The method of claim 19 further comprising the step of the at least one user allowing a trusted person into the room by activating said release member.

21. The method of claim 19 wherein at least one pin encounters an obstruction and wherein said downward displacement of said locking pin carrier terminates but said lower ends of the other ones of said locking pins are positioned within said floor strike.

22. The method of claim 19 wherein said steps of releasably coupling said portable door locking apparatus to said first portion and applying a downward force are conducted before the door is closed, said locking pin carrier releasably locking to prevent any further downward movement;

the at least one user pulling the door closed; and said lower ends of said locking pins immediately entering said floor strike to prevent the door from opening.

23. A method for providing at a moment's notice a universal tamper-evident, shelter-in-place portable door locking device at a door to a room on a floor for at least one user in the room and wherein said door locking device accommodates for varying door undercuts while providing the at least one user with total control of the device while automatically providing precise location notification to authorities, said method comprising:

releasably stowing said portable door locking device within a storage unit secured in the room, said storage unit comprising a transmitter associated with a releasable cover of said storage unit such that when said cover is opened or removed said transmitter generates an alert signal to authorities, said portable door locking device comprising:

a locking pin carrier comprising a plurality of locking pins whose lower ends are configured to be positioned in a floor strike formed in the floor, said locking pin carrier being slideable on support rods fixed between an upper flange and a lower flange both of which are fixedly secured to a body plate that is configured for releasable coupling to the door, said locking pin carrier comprising a projection, said locking pin carrier being biased upward in an unlocked position by springs coupled between said locking pin carrier and said body plate;

a releaseable brake positioned between said upper flange and said lower flange, said releasable brake comprising a plurality of teeth over which said projection slides when said locking pin carrier slides on said support rods away from said upper flange against said bias and towards said lower flange, said teeth forming a plurality of locked positions to accommodate the varying door undercuts, said projection releasably locking into one of said plurality of teeth when said locking pin carrier stops sliding;

said locking pin carrier comprising an upper member and a lower member, each of said locking pins slideable through said lower member and said lower flange and wherein an upper end of each locking pin is biased against said lower member by a spring positioned between said upper member and said upper end of said locking pin, said upper end of each locking pin prevented from passing through said lower member; and a release member movably coupled to said locking pin carrier that can be activated by the at least one person to release said locking pin carrier from said one of said plurality of locked positions to automatically return said locking pin carrier to said unlocked position; and mounting a door assembly to the door that comprises a first portion mounted to an inside surface of the door and a second portion positioned on an outside surface of the door and wherein the second portion includes a key cylinder comprising a lock cam;

forming said floor strike in the floor adjacent the inside surface of the door for receiving a free end of at least one of said plurality of locking pins from said portable door locking device therein;

closing the door by the at least one user;

opening up or removing said cover of said storage unit, by the at least one user, causing said transmitter to immediately emit said alert signal to authorities, and removing said portable door locking device from said storage unit by the at least one user;

releasably coupling said portable door locking device to said first portion by the at least one user; and applying a downward force on said locking pin carrier to displace said carrier downward to releasably lock said locking pin carrier with said releasable brake while positioning lower ends of said plurality of locking pins within said floor strike to prevent the door from being opened.

24. The method of claim 23 further comprising the step of the at least one user allowing a trusted person into the room by activating said release member.

25. The method of claim 23 wherein at least one pin encounters an obstruction and wherein said downward displacement of said locking pin carrier terminates but said lower ends of the other ones of said locking pins are positioned within said floor strike.

26. The method of claim 23 wherein said steps of releasably coupling said portable door locking device to said first portion and applying a downward force are conducted before the door is closed, said locking pin carrier releasably locking to prevent any further downward movement; the at least one user pulling the door closed; and said lower ends of said locking pins immediately entering said floor strike to prevent the door from opening.

27. The method of claim 23 further comprising the step of an authority personnel arriving at a location outside of the door and inserting a key into a keyhole in said key cylinder and unlocking said locking pin carrier into said unlocked position in order to open the door.

28. The method of claim 23 wherein at least one pin encounters an obstruction and wherein said downward displacement of said locking pin carrier terminates but said lower ends of the other ones of said locking pins are positioned within said floor strike.

29. The method of claim 23 wherein said steps of releasably coupling said portable door locking device to said first portion and applying a downward force are conducted before the door is closed, said locking pin carrier releasably locking to prevent any further downward movement; the at least one user pulling the door closed; and said lower ends of said locking pins immediately entering said floor strike to prevent the door from opening.

30. The method of claim 23 further comprising the step of allowing a trusted person into the room by lifting up said portable door locking device from said first portion with said portable door locking device in a locked position.

* * * * *